(12) United States Patent
Kanaya

(10) Patent No.: US 11,633,669 B2
(45) Date of Patent: Apr. 25, 2023

(54) VIDEO MODIFICATION AND TRANSMISSION

(71) Applicant: GREE, Inc., Tokyo (JP)

(72) Inventor: Yosuke Kanaya, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/352,057

(22) Filed: Jun. 18, 2021

(65) Prior Publication Data

US 2021/0394053 A1 Dec. 23, 2021

(30) Foreign Application Priority Data

Jun. 22, 2020 (JP) .............................. JP2020-106956
Jun. 26, 2020 (JP) .............................. JP2020-110272
Jul. 14, 2020 (JP) .............................. JP2020-120525

(51) Int. Cl.
*A63F 13/00* (2014.01)
*A63F 13/355* (2014.01)
(Continued)

(52) U.S. Cl.
CPC .......... *A63F 13/355* (2014.09); *A63F 13/213* (2014.09); *A63F 13/428* (2014.09);
(Continued)

(58) Field of Classification Search
CPC ........ A63F 13/86; A63F 13/35; A63F 13/355; A63F 13/87
See application file for complete search history.

(56) References Cited

U.S. PATENT DOCUMENTS 6,607,444 B2  8/2003  Takahashi et al.
6,821,205 B2  11/2004 Takahashi et al.
(Continued)

FOREIGN PATENT DOCUMENTS

JP      2002-346233 A    12/2002
JP      2015-036033 A    2/2015
(Continued)

OTHER PUBLICATIONS

Mirrativ, Inc., "Game distribution & game commentary & game recording," downloaded from https://apps.apple.com/jp/app/mirrativ-ミラティブ- スマホでかんたん
ゲーム配信 /id1028944599, 7 pp., Nov. 10, 2020 (English translation attached.).

(Continued)

*Primary Examiner* — David L Lewis
*Assistant Examiner* — Eric M Thomas
(74) *Attorney, Agent, or Firm* — Klarquist Sparkman, LLP

(57) ABSTRACT

Methods and apparatus are disclosed for video transmission. In one example, computer-readable storage media store instructions cause a processor to: generate first motion data; distribute, toward terminal devices of a plurality of viewers via a communication line, the first motion data; receive a web page; receive first operation data from a user interface; generate a second video related to a computer-implemented game on the basis of the first operation data by using the received web page; distribute the second video toward the terminal devices of the plurality of viewer; receive viewer data regarding a plurality of viewers; extract a selected game object out of a plurality of game objects to be used in the game; calculate a control parameter related to the selected game object on the basis of the viewer data; generate the (Continued)

second video including the selected game object; and distribute the second video toward the terminal devices.

20 Claims, 31 Drawing Sheets

(51) Int. Cl.
A63F 13/213 (2014.01)
A63F 13/428 (2014.01)
A63F 13/45 (2014.01)
A63F 13/67 (2014.01)
A63F 13/87 (2014.01)
A63F 13/92 (2014.01)
A63F 13/69 (2014.01)

(52) U.S. Cl.
CPC .............. *A63F 13/45* (2014.09); *A63F 13/67* (2014.09); *A63F 13/69* (2014.09); *A63F 13/87* (2014.09); *A63F 13/92* (2014.09); *A63F 2300/5553* (2013.01)

(56) References Cited

U.S. PATENT DOCUMENTS

| | | | |
|---|---|---|---|
| 7,175,530 | B2 | 2/2007 | Takahashi et al. |
| 7,674,166 | B2 | 3/2010 | Takahashi et al. |
| 10,345,897 | B2 | 7/2019 | Verfaillie et al. |
| 10,376,795 | B2 | 8/2019 | Garg et al. |
| 10,390,064 | B2 | 8/2019 | Dury et al. |
| 10,484,439 | B2 | 11/2019 | Oates, III |
| 10,632,372 | B2 | 4/2020 | Gilmore et al. |
| 10,905,953 | B2 | 2/2021 | Kim et al. |
| 11,044,535 | B2 | 6/2021 | Kurabuchi |
| 11,071,919 | B2 | 7/2021 | Willette et al. |
| 2002/0183116 | A1 | 12/2002 | Takahashi et al. |
| 2003/0038805 | A1* | 2/2003 | Wong ............... A63F 13/12 345/473 |
| 2016/0151707 | A1 | 6/2016 | Takaichi et al. |
| 2017/0001122 | A1 | 1/2017 | Leung et al. |
| 2017/0003784 | A1* | 1/2017 | Garg ................. A63F 13/87 |
| 2017/0006074 | A1* | 1/2017 | Oates, III ........... H04N 21/2353 |
| 2019/0009178 | A1 | 1/2019 | Nakagawa et al. |
| 2019/0349625 | A1 | 11/2019 | Watanabe et al. |
| 2021/0121778 | A1 | 4/2021 | Kim et al. |
| 2021/0152894 | A1 | 5/2021 | Kurabuchi |
| 2022/0070513 | A1 | 3/2022 | Shirai et al. |

FOREIGN PATENT DOCUMENTS

| | | |
|---|---|---|
| JP | 2017-188833 A | 10/2017 |
| JP | 2018-005320 A | 1/2018 |
| JP | 2018-520772 A | 8/2018 |
| JP | 6382468 B1 | 8/2018 |
| JP | 2018-175004 A | 11/2018 |
| JP | 6491388 B1 | 3/2019 |
| JP | 2019-071960 A | 5/2019 |
| JP | 6622440 B1 | 11/2019 |
| JP | 2020-044136 A | 3/2020 |
| JP | 6719633 B1 | 7/2020 |

OTHER PUBLICATIONS

Office Action issued in JP 2020-106956, dated Dec. 15, 2020, with English Machine Translation, 8 pages.
Office Action issued in JP 2020-106956, dated Apr. 6, 2021, with English Machine Translation, 8 pages.
Office Action issued in JP 2020-110272, dated Dec. 22, 2020, with English Translation, 6 pages.
Office Action issued in JP 2020-110272, dated May 11, 2021, with English Translation, 6 pages.
Office Action issued in JP 2020-120525, dated Jun. 29, 2021, with English Translation, 4 pages.
Office Action issued in JP 2020-120525, dated Feb. 2, 2021, with English Translation, 8 pages.
Explain how to use a "REALITY Avatar" which enables you to easily debut as a VTuber with a smartphone!, English Translation of web page located at https://www.moguravr.com/reality-avatar-3/, 14 pages.
Limited to today! A game commentary function has been added! English Translation of https://reality-notice.wrightflyer.net/aba0a23e90b9c3df9c819fc58bd39f09a0452aac.html, 4 pages.
Notice of Reasons for Refusal for JP Application No. 2021-107185 (with machine-generated English translation), dated Jun. 21, 2022, 6 pages.
Glory Co., Ltd., "Glory mook," first edition, (with partial English translation) 2010, 5 pages.
Notice of Reasons for Refusal, Japanese Patent Application No. 2021-130153, dated Jul. 29, 2022, 5 pages.
Office action issued in Japan Application No. 2020-106956, dated Nov. 15, 2022, 32 pages (includes English translation).
Office action issued in Japan Application No. 2021-107185, dated Dec. 5, 2022, 6 pages (includes English translation).
Office action issued in Japan Application No. 2021-130153, dated Dec. 16, 2022, 4 pages (includes English translation).

* cited by examiner

1000

| | Game type | Selected game object | Control parameter | Calculation based on viewer data |
|---|---|---|---|---|
| 1 | Fighting game A | The avatar of the distributor (item) | Attach power | - Two avatars with dynamic characteristics: <u>double</u><br>- Four avatars having a weapon 'Japanese sword': <u>four times</u> |
| | | | Defense power | - Two avatars with rare costumes: <u>double</u><br>- Four avatars wearing gold necklaces: <u>four times</u> |
| | | The friend character(s) | Numbers of appearances | - Two viewers have reached Level T of Game A: one "friend character" is added (given)<br>- One viewer is the winner of the fighting game tournament P: one "friend character" is added (given) |
| 2 | Role playing game B | Item, etc | Numbers of items to be added (given), etc. | - Three avatars of wizards: <u>one new "spell" is added</u> (given)<br>- Ten avatars wearing the same headbands: <u>A new killer move is added</u> (given) |
| ... | ... | ... | ... | ... |

FIG. 8

VIDEO MODIFICATION AND TRANSMISSION

CROSS-REFERENCE TO RELATED APPLICATIONS

This application claims priority to Japanese Patent Application No. 2020-106956, filed on Jun. 22, 2020; Japanese Patent Application No. 2020-110272, filed on Jun. 26, 2020; and Japanese Patent Application No. 2020-120525, filed on Jul. 14, 2020, all entitled "Computer Program, Method, and Server Device." These applications are incorporated herein by reference in their entirety as if set forth fully herein.

FIELD

The technology disclosed in the present application relates to a computer program, a method, and a server device that are used for distributing a video related to a game from a terminal device of a distributor to a terminal device of each viewer.

BACKGROUND

As one example of a service used for distributing a video related to a computer game from the terminal device of a distributor to the terminal device of each viewer, a service called mirrativ provided on a website identified by the following URL is known.
https://apps.apple.com/jp/app/mirrativ-ミラティブ-スマホでかんたんゲーム配信/id1028944599

With this service, the distributor uses a terminal device to distribute, to the terminal devices of a plurality of viewers, a video including an animation of an avatar generated on the basis of motion data related to the motion of the distributor and a video related to a computer-implemented game generated on the basis of operation data related to the operation of the distributor.

SUMMARY

Recently an approach for encouraging users to use a video distributing/viewing service is needed. Method and apparatus for distributing and modifying video in a networked computer environment are disclosed. In some examples of a video streaming service used with computer games, each viewer can exchange data with a distributor including game metadata, comments, video data, audio data, image data, location data, and/or video or game commands. Each viewer can also determine to transmit one or more messages or packets encoded with one or more tokens to the distributor. In the disclosed technology field, such tokens may also be referred to as elective tokens or "gifts." Similarly, token data may be referred to as "gift data."

Computer-readable storage media according to one aspect of the disclosed technology can be "computer-readable storage media storing computer-readable instructions, which when executed by a computer having at least one processor, cause the computer to:"

A method according to one aspect of the disclosed technology can be "a computer-implemented method for automatically generating customized video in an interactive network application, the method comprising: with at least one processor: generating first motion data with an image sensor; distributing, toward terminal devices of a plurality of viewers via a communication line, the first motion data or a first video including an animation of an avatar of a first distributor generated on the basis of the first motion data; receiving a web page via the communication line; receiving first operation data from a user interface; generating a second video related to a computer-implemented game on the basis of the first operation data by using the received web page; distributing the second video toward the terminal devices of the plurality of viewer via the communication line; receiving, via the communication line, viewer data regarding at least one viewer of the plurality of viewers; extracting a selected game object out of a plurality of game objects to be used; calculating a control parameter related to the selected game object on the basis of the viewer data; generating the second video including the selected game object; and distributing, via the communication line, the second video toward the terminal devices of the plurality of viewers."

A terminal device according to one aspect of the disclosed technology can be "a terminal device, comprising: at least one processor coupled to a camera and a communication network, wherein the at least one processor is configured to: generate first motion data using the camera; distribute, toward terminal devices of a plurality of viewers via the communication network, the first motion data or a first video including an animation of an avatar of a first distributor generated on the basis of the first motion data; receive a web page via the communication network; receive first operation data from a user interface; generate a second video related to a computer-implemented game on the basis of first operation data by using the received web page; distribute the second video toward the terminal devices of the plurality of viewer via the communication network; receive, via the communication network, viewer data regarding at least one viewer of the plurality of viewers; extract a selected game object out of a plurality of game objects to be used in the game; calculate a control parameter related to the selected game object on the basis of the viewer data; generate the second video including the selected game object; and distribute, via the communication network, the second video toward the terminal devices of the plurality of viewers."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIG. 8 is a view showing an example of calculation data included in an data table.

DETAILED DESCRIPTION

Figure 1:
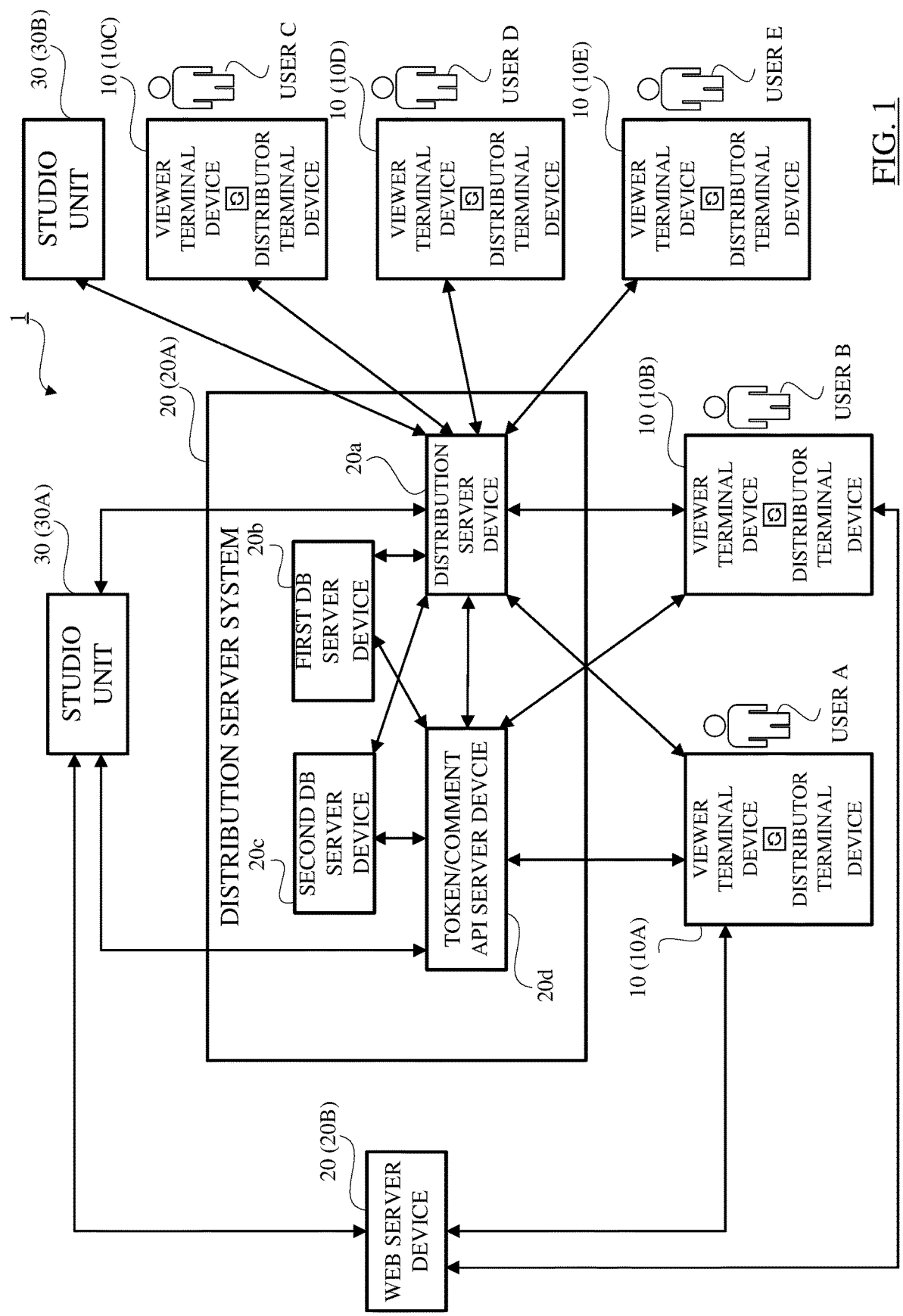
FIG. 1 is a block diagram showing an example of the configuration of the video distribution system 1 according to an embodiment.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded by a video encoder and sent to the viewer terminal device. The video encoder comprises a processor (e.g., a central processing unit or a graphics processing unit) configured to generate video files or streams according to one or more video coding formats. Example of suitable video coding formats include but are not limited to: H.264, H.265, VC-1, MPEG-1, MPEG-2, and MPEG-4. Rendering and encoding the video data at the server allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

In the following, various embodiments will be described with reference to the accompanied drawings. Additionally, common elements as shown in drawings are assigned with a same reference sign. Also, it should be noted that there are cases where an element as shown in one drawing is omitted in another drawing for the purposes of explanation. Further, it should be noted that the accompanied drawings are not necessarily described to scale. Furthermore, the term "application" can also be referred to as "software" or "program", and can be instructions to a computer that are combined so as to be able to obtain certain results.

I. First Embodiment

1. Configuration of Video Distribution System

In a video distribution system 1 disclosed in the present application, briefly, a user who performs distribution (hereinafter referred to as "distributor") can distribute, by using his terminal device, a first video and a second video to a terminal device of a user who views the video (hereinafter referred to as "viewer") via a communication line. The first video is a video including an animation of a distributor's avatar generated on the basis of motion data regarding the motion of the distributor. The second video is a video regarding a game generated on the basis of operation data regarding the operation of the distributor.

FIG. 1 is a block diagram showing an example of the configuration of the video distribution system 1 according to an embodiment. As shown in FIG. 1, the video distribution system 1 can include a plurality of terminal devices 10 connected to a communication line (communication network) not illustrated, and one or more server devices 20 connected to the communication line. Each terminal device 10 can be connected to one or more server devices 20 via the communication line.

Additionally, as the plurality of terminal devices 10, FIG. 1 shows, for example, terminal devices 10A to 10E, but one or more terminal devices 10 other than them can be used similarly. Similarly, FIG. 1 shows as one or more server devices 20, for example, a server system 20A (server system 20A includes a plurality of servers as described later) and a server device 20B (web server device 20B), but one or more server devices 20 other than them can be used similarly. Additionally, the communication line (not shown) can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

In an embodiment, the video distribution system 1 can include one or more studio units 30 connected to the communication line. Each studio unit 30 can be connected to one or more server devices 20 or the plurality of terminal devices 10 via the communication line. Additionally, as one or more studio units 30, FIG. 1 shows, for example, studio units 30A and 30B, but one or more studio units 30 other than them can be used similarly.

1-1. Terminal Device 10

As shown in FIG. 1, the plurality of terminal devices 10 can include one or more distributor terminal devices 10 (here, terminal device 10A) and one or more viewer terminal devices 10 (here, terminal device 10B to the terminal device 10E). By having a common configuration, each terminal device 10 can be a terminal device for distributing a video (distributor terminal device 10) or a terminal device for viewing a video (viewer terminal device 10).

Similarly, the user using the video distribution system 1 (for example, FIG. 1 shows five users A to E as an example but, needless to say, the number of users is not limited to five) can be a distributor in one scene and a viewer in another scene. Therefore, in a certain scene shown in FIG. 1 (hereinafter, sometimes called "first scene"), the user A becomes a distributor (for convenience, the user A in the first scene is sometimes referred to as a "first distributor") (the terminal device 10A of the user A becomes the terminal device 10 of the distributor), and the users B to E become viewers (the terminal device 10B of the user B to the terminal device 10E of the user E become the terminal devices 10 of viewers). On the other hand, in another scene (hereinafter, sometimes called "second scene"), the user B becomes a distributor (the terminal device 10B of the user B becomes the terminal device 10 of the distributor), and the user A and the users C to E become viewers (the terminal device 10A of the user A and the terminal device 10C of the user C to the terminal device 10E of the user E become the terminal devices 10 of viewers). This second scene shall also include a case in which not the user B but any of the users C to E becomes a distributor (for convenience, any of the users B to E in the second scene is sometimes referred to as a "second distributor").

In a case of operating as a terminal device (distributor terminal device) for distributing a video, each terminal device 10 can execute an installed video distribution application (may also be middleware or a combination of an application and middleware. The same shall apply hereinafter). Thus, each terminal device 10 can acquire motion data regarding the motion of the distributor, and can generate the first video including an animation of a virtual character (avatar) changed according to the acquired data. Here, regarding the example shown in FIG. 1, the video generated by the terminal device 10A of the user A in the first scene in which the user A becomes the distributor is referred to as the first video for convenience, and the video generated by the terminal device 10B (or any of the terminal device 10C of the user C to the terminal device 10E of the user E) of the user B in the second scene in which the user B (or any of the user C to the user E) becomes the distributor is sometimes referred to as a third video for convenience hereinafter. It should be understood that the first video and the third video are essentially the similar videos, except that the distributors (motion data of the distributors accordingly), which are the basis of the video, are different. Therefore, in the explanation in the description of the present application, the description of the "first video" can be read as the "third video" in a part referred to as the "first video".

In a case of operating as a terminal device (distributor terminal device) for distributing a video, each terminal device 10 can transmit the generated first video (third video) to the server device 20 (server system 20A) via the communication line. Such the first video (third video) is distributed from the server device 20 (server system 20A) to the terminal device (viewer terminal device) 10 for receiving the video via the communication line. Such the terminal device 10 of the viewer can receive the video by executing the installed video viewing application (may also be middleware or a combination of an application and middleware. The same shall apply hereinafter).

When operating as a terminal device of the distributor, each terminal device 10 can execute a browser function incorporated in the installed video distribution application and/or execute an installed web browser application. This allows each terminal device 10 to receive a web page (for example, an HTML document, including in some examples, HTML documents encoding code such as JavaScript or PHT code) from the server device 20 (web server device 20B) and to execute a game program included in this web page. By executing this game program, each terminal device 10 can generate the second video in which at least one game object is operated on the basis of operation data regarding the operation of the distributor. Here, regarding the example shown in FIG. 1, the video generated in the first scene in which the user A becomes the distributor is referred to as the second video for convenience, and the video generated in the second scene in which the user B (or may be any of the user C to the user E) becomes the distributor is sometimes referred to as a fourth video for convenience hereinafter. It should be understood that the second video and the fourth video are essentially the similar videos (videos regarding the same game), except that the distributors (operation data of the distributors accordingly), which are the basis of the video, are different. Therefore, in the explanation in the description of the present application, the description of the "second video" can be read as the "fourth video" in a part referred to as the "second video".

When operating as a terminal device of the distributor, by executing the above-described video distribution application, each terminal device 10 can transmit the second video (fourth video) generated as described above to the server device 20 (server system 20A) via the communication line. Such the second video (fourth video) is also distributed from the server device 20 (server system 20A) via the communication line to the terminal device (viewer terminal device) 10 for receiving the video, which executes the installed video viewing application.

Furthermore, when operating as a distributor terminal device, by executing the above-described video distribution application, each terminal device 10 can receive, via the server device 20 (server system 20A), from the terminal device 10 of the viewer viewing the first video and/or the second video (third video and/or fourth video) distributed by the terminal device 10 of this distributor, token data indicative of giving a token to this distributor, and/or comment data indicative of transmitting a comment to this distributor. When operating as a distributor terminal device, by executing the above-described video distribution application, each terminal device 10 can distribute comment data, via the server device 20 (server system 20A), to the terminal device 10 of the viewer viewing the first video and/or the second video (third video and/or fourth video) distributed by the terminal device 10 of this distributor.

On the other hand, when operating as a terminal device (viewer terminal device) for viewing a video, by executing the installed video viewing application, each terminal device 10 can receive, via the server device 20 (server system 20A), the first video and/or the second video (third video and/or fourth video) distributed by the terminal device 10 of the distributor.

When operating as a distributor terminal device, by executing the video viewing application, each terminal device 10 can transmit, via the server device (server system 20A) to the terminal device 10 (terminal device 10A of the user A as the distributor in the first scene in the example shown in FIG. 1) of this viewer, token data indicative of giving a token to the distributor distributing the video, and/or comment data indicative of transmitting a comment to this distributor.

Additionally, the above-described video distribution application and the video viewing application can be installed and executed in each terminal device 10 as one integrated application or as separate applications.

Each terminal device 10 is any terminal device capable of executing such operation, and can include a smartphone, a tablet, a mobile phone (feature phone), and/or a personal computer, without being limited thereto.

1-2. Server Device 20

FIG. 1 shows the server system 20A and the web server device 20B as an example of one of the plurality of server devices 20.

The server system 20A can distribute, to each terminal device (terminal device of each viewer) 10, the video (first video and/or second video in the first scene, and third video and/or fourth video in the second scene) transmitted by each terminal device (terminal device of each distributor) 10 (terminal device 10A of the user A, who is the distributor, in the first scene and any of the terminal device 10B of the user B to the terminal device 10E of the user E, which is the distributor, in the second scene). Furthermore, the server system 20A can transmit, to the terminal device 10 of a certain distributor, token data indicative of giving a token to the distributor and/or comment data indicative of transmitting a comment to the distributor having been transmitted by each terminal device (terminal device of each viewer) 10.

In order to execute such an operation, the server system 20A can, in an embodiment, include a distribution server device 20a, a first database (DB) server device 20b, a second DB server device 20c, and a token/comment API server device 20d that are connected to one another via the communication line (including a wireless line and/or a wired line not illustrated).

The distribution server device 20a can distribute, to the terminal device 10 of each viewer, the first video and/or the second video (third video and/or fourth video) transmitted by the terminal device 10 of each distributor. The distribution server device 20a can receive comment data regarding the first video and/or the second video (third video and/or fourth video) to the terminal device 10 of each viewer via the token/comment API server device 20d from the terminal device 10 of each distributor, and distribute the comment data to the terminal device 10 of each viewer. The distribution server device 20a can receive token data and/or comment data regarding the first video and/or the second video (third video and/or fourth video) transmitted from the terminal device 10 of each viewer, and transmit the received token data and/or comment data to the token/comment API server device 20d.

The distribution server device 20a can manage (acquire) various user data (data on the distributor regarding the first video and the third video) of each distributor (for example, user A to user E) regarding the first video and the third video transmitted by the terminal device 10 of each distributor, and store the user data of each distributor in the first DB server device 20b. Furthermore, the distribution server device 20a can manage (acquire) various user data (data on the distributor regarding the second video and the fourth video) of each distributor regarding the second video and the fourth video transmitted by the terminal device 10 of each distributor (for example, user A to user E), and store the user data of each distributor in the second DB server device 20c. Furthermore, when receiving an inquiry from the terminal device 10 of the distributor in a certain scene (for example, the first scene described above) (for example, in the first scene, the terminal device 10A of the user A), the distribution server device 20a can read data (viewer data) of each viewer (user B to user E) in the scene (first scene) from the first DB server device 20b and/or the second DB server device 20c, and transmit it to the terminal device 10 of the distributor. Here, the data (viewer data) of each viewer includes various user data (data on various distributors regarding each distributor) of each distributor described above stored in the first DB server device 20b and/or the second DB server device 20c.

The first DB server device 20b can store token data and/or comment data (including both those transmitted from the terminal device 10 of each viewer and those transmitted from the terminal device 10 of each distributor) regarding the first video and the third video received from the token/comment API server device 20d. The first DB server device 20b can store various user data (data on the distributor regarding the first video and the third video) on each distributor (for example, user A to user E) regarding the first video and the third video received from the distribution server device 20a.

The first DB server device 20b can read data (viewer data) on each viewer (for example, in the first scene, users B to E) who has received an inquiry by the distribution server device 20a, and transmit the viewer data to the distribution server device 20a.

The second DB server device 20c can store token data and/or comment data (including both those transmitted from the terminal device 10 of each viewer and those transmitted from the terminal device 10 of each distributor) regarding the second video and the fourth video received from the token/comment API server device 20d. The second DB server device 20c can store various user data (data on the distributor regarding the second video and the fourth video) on each distributor (for example, user A to user E) regarding the second video and the fourth video received from the distribution server device 20a. The second DB server device 20c can read data (viewer data) on each viewer (for example, in the first scene, users B to E) who has received an inquiry by the distribution server device 20a, and transmit the viewer data to the distribution server device 20a.

When receiving (or automatically) an inquiry from the terminal device 10 of each distributor about the token data and/or the comment data on the first video and/or the second video (third video and/or fourth video) received from the distribution server device 20a, the token/comment API server device 20d can transmit, to the terminal device 10 of the distributor, the token data and/or the comment data to the distributor. Furthermore, the token/comment API server device 20d can store, in the first DB server device 20b, token data and/or comment data (including both those transmitted from the terminal device 10 of each viewer and those transmitted from the terminal device 10 of each distributor) regarding the first video (third video) received from the distribution server device 20a. Furthermore, the token/comment API server device 20*d* can store, in the second DB server device 20*c*, token data and/or comment data (including both those transmitted from the terminal device 10 of each viewer and those transmitted from the terminal device 10 of each distributor) regarding the second video (fourth video) received from the distribution server device 20*a*.

The token/comment API server device 20*d* can receive, from the terminal device 10 of each distributor, comment data regarding the first video and/or the second video (third video and/or fourth video) to the terminal device 10 of each viewer, and transmit the comment data to the distribution server device 20*a*. Furthermore, the token/comment API server device 20*d* can store, in the first DB server device 20*b*, comment data regarding the first video (third video) received from the terminal device 10 of each distributor. Furthermore, the token/comment API server device 20*d* can store, in the second DB server device 20*c*, comment data regarding the second video (fourth video) received from the terminal device 10 of each distributor.

The example shown in FIG. 1 shows a configuration in which for the purpose of load dispersion and the like, the server system 20A has four server devices including the distribution server device 20*a*, the first DB server device 20*b*, the second DB server device 20*c*, and the token/comment API server device 20*d*. However, at least one server device of these four server devices may be integrated with at least one of the remaining server devices. Each operation of the four server devices described above is an example, and for example, the operation of at least one server device may be replaced with the operation of another server device.

Next, the web server device 20B can transmit, to the terminal device 10 of each distributor having accessed, a web page (document created according to HTML, for example, HTML5) in which a game program is incorporated. This game program can execute various operations related to the distribution of the video, including the operations exemplified below, on the terminal device 10 having received and decoded the game program.

Operation of executing the game;
Operation of transmitting the game screen (second video or fourth video) generated with the execution of the game to the server system 20A (distribution server device 20*a*)
Operation of acquiring, from the server system 20A (token/comment API server device 20*d*), the token data and/or comment data transmitted to the distributor 1-3. Studio Unit 30

The studio unit 30 can be placed in a studio room, a room, a hall, or the like that is a place where the distributor (performer) distributes a video. The studio unit 30 can perform the same function as that of the terminal device 10 and/or the server device 20 as described above.

2. Hardware Configuration of Each Device

Next, an example of the hardware configuration of each of the terminal device 10, the server device 20, and the studio unit 30 will be described.

2-1. Hardware Configuration of Terminal Device 10

Figure 2:
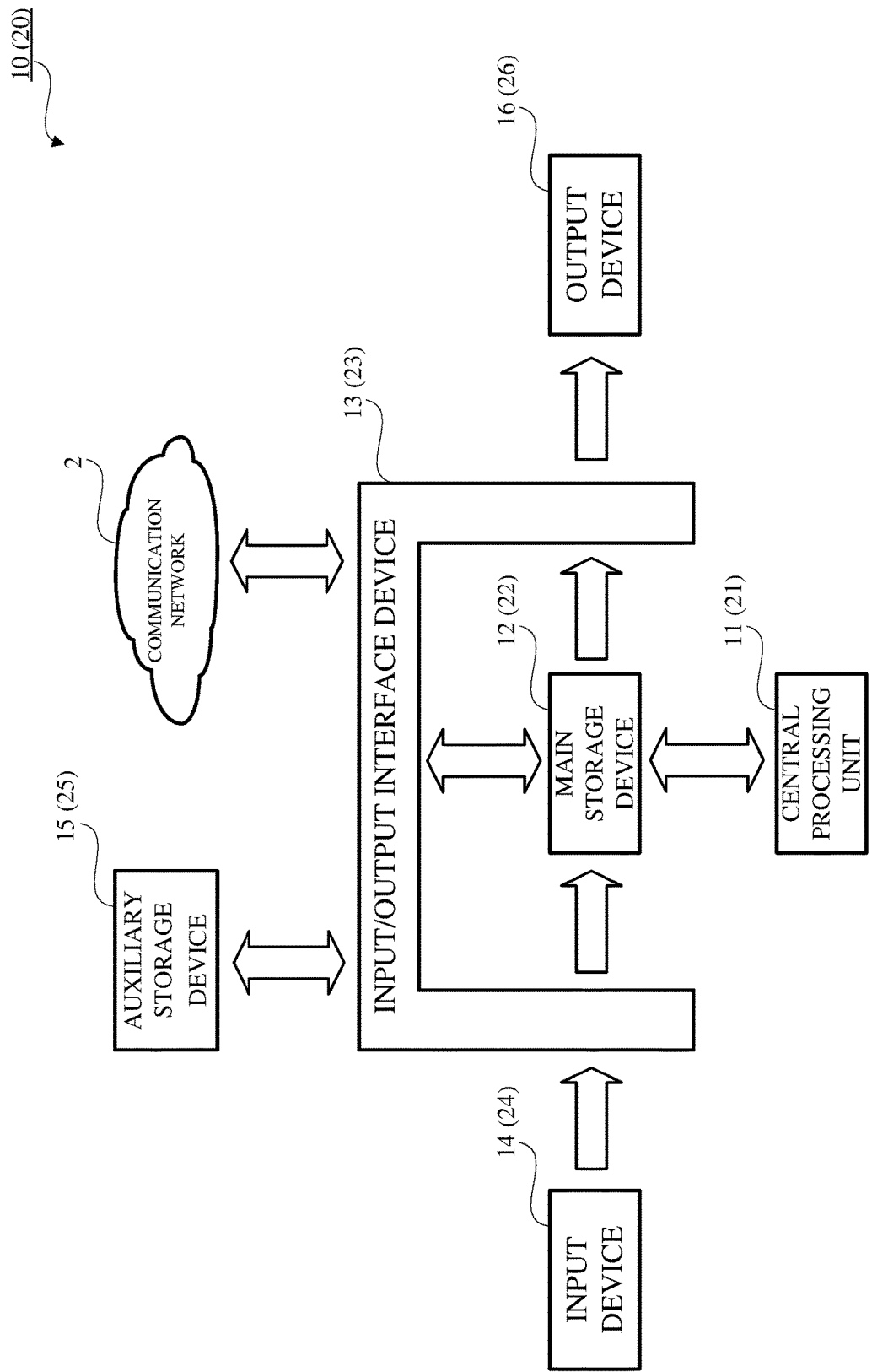
FIG. 2 is a block diagram schematically showing an example of the hardware configuration of the terminal device 10 (server device 20) shown in FIG. 1 (and FIGS. 9 and 17)

An example of the hardware configuration of each terminal device 10 will be described with reference to FIG. 2. FIG. 2 is a block diagram schematically showing an example of the hardware configuration of the terminal device 10 (server device 20) shown in FIG. 1 (in FIG. 2, reference numerals in parentheses are given in relation to the server device 20, as will be described later).

As shown in FIG. 2, each terminal device 10 can mainly include a central processing unit 11, a main storage device 12, an input/output interface 13, an input device 14, an auxiliary storage device 15, and an output device 16. These devices are interconnected via a data bus and/or a control bus.

The central processing unit 11, which is referred to as a "CPU", can perform operations on instructions and data stored in the main storage device 12, and store the results of the operations in the main storage device 12. The central processing unit 11 can control, via the input/output interface 13, the input device 14, the auxiliary storage device 15, the output device 16, and the like. The terminal device 10 can include one or more such central processing units 11.

The main storage device 12, which is referred to as a "memory", can store an instruction and data received via the input/output interface 13 from the input device 14, the auxiliary storage device 15, and a communication line 2 (server device 20 or the like), as well as a calculation result of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a capacity larger than that of the main storage device 12. The auxiliary storage device 15 can store an instruction and data (computer program) constituting the above-mentioned specific application (video distribution application, video viewing application, and the like) and a web browser application. By being controlled by the central processing unit 11, the auxiliary storage device 15 can transmit these instructions and data (computer program) to the main storage device 12 via the input/output interface 13. The auxiliary storage device 15 can include a magnetic disk device and/or an optical disk device, without being limited thereto.

The input device 14 is a device that fetches data from the outside, and can include a touch screen, a button, a keyboard, a mouse, and/or a sensor, without being limited thereto. The sensor can include a sensor including one or more cameras or the like and/or one or more microphones or the like, without being limited thereto, as described below.

The output device 16 can include a display device, a touch screen, and/or a printer device, without being limited thereto.

With such hardware configuration, the central processing unit 11 can sequentially loads, into the main storage device 12, an instruction and data (computer program) constituting a specific application stored in the auxiliary storage device 15, and calculate the loaded instruction and data. Thus, the central processing unit 11 can control the output device 16 via the input/output interface 13 or transmit/receive various data to/from another device (e.g., server device 20, other terminal device 10, studio unit 30, and/or like) via the input/output interface 13 and a communication network 2.

Thus, by executing the installed specific application, the terminal device 10 can execute at least one operation of the following operations exemplified below, for example (including various operations described in detail later).

Operation used for distributing the first video and/or the second video (third video and/or fourth video)

Operation used for receiving the token data and/or the comment data transmitted from another terminal device 10 to the own terminal device 10

Operation used for receiving the first video and/or the second video (third video and/or fourth video) distributed by anther terminal device 10

Operation used for transmitting token data and/or comment data to another terminal device 10

The terminal device 10 can include one or more microprocessors and/or graphics processing units (GPU) in place of the central processing unit 11 or together with the central processing unit 11.

2-2. Hardware Configuration of Server Device 20

An example of the hardware configuration of each server device 20 will be described similarly with reference to FIG. 2. The hardware configuration of each server device 20 (each of distribution server device 20a, first DB server device 20b, second DB server device 20c, token/comment API server device 20d, and web server device 20B) can be, for example, one identical to the hardware configuration of each terminal device 10 described above. Therefore, reference numerals for the components of each server device 20 are shown in parentheses in FIG. 2.

As shown in FIG. 2, each server device 20 can mainly include a central processing unit 21, a main storage device 22, an input/output interface 23, an input device 24, an auxiliary storage device 25, and an output device 26. These devices are interconnected via a data bus and/or a control bus.

The central processing unit 21, the main storage device 22, the input/output interface 23, the input device 24, the auxiliary storage device 25, and the output device 26 can be substantially identical to the central processing unit 11, the main storage device 12, the input/output interface 13, the input device 14, the auxiliary storage device 15, and the output device 16, respectively, included in each terminal device 10 described above.

With such hardware configuration, the central processing unit 21 can sequentially loads, into the main storage device 22, an instruction and data (computer program) constituting a specific application stored in the auxiliary storage device 25, and calculate the loaded instruction and data.

Thus, the central processing unit 21 can control the output device 26 via the input/output interface 23 or transmit/receive various data to/from another device (e.g., other terminal device 10, studio unit 30, and/or like) via the input/output interface 23 and the communication network 2.

Thus, the server device 20 can execute at least one operation of the following operations exemplified below, for example (including various operations described in detail later).

Operation used for distributing, to the terminal device 10 of each viewer, the first video and/or the second video (third video and/or fourth video) transmitted by the terminal device 10 of each distributor Operation used for transmitting, to the terminal device 10 of the distributor, token data and/or comment data transmitted by the terminal device 10 of each viewer to the terminal device 10 of a certain distributor Operation used for transmitting, to the terminal device 10 of each viewer, comment data transmitted from the terminal device 10 of each distributor to the terminal device 10 of each viewer Operation used for managing and storing token data and/or comment data transmitted by the terminal device 10 of each viewer to the terminal device 10 of a certain distributor Operation used for managing and storing various user data (including data on distributor) of each distributor (for example, user A to user E) regarding the first video and/or the second video (third video and/or fourth video) by each distributor Operation used for transmitting, to the terminal device 10 of each distributor, data (viewer data) on each viewer of the first video and/or the second video (third video and/or fourth video) by each distributor The server device 20 can include one or more microprocessors and/or graphics processing units (GPU) in place of the central processing unit 21 or together with the central processing unit 21.

2-3. Hardware Configuration of Studio Unit 30

The studio unit 30 is mountable by an data processing device such as a personal computer and, although not illustrated, can mainly include a central processing unit, a main storage device, an input/output interface, an input device, an auxiliary storage device, and an output device, as with the above-described terminal device 10 and the server device 20. These devices are interconnected via a data bus and/or a control bus.

The studio unit 30 having such a hardware configuration can perform the same function as that of the above-described terminal device 10 and/or the server device 20.

3. Functions of Each Device

Next, an example of the function of each of the terminal device 10, the server device 20, and the studio unit 30 will be described.

3-1. Functions of Terminal Device 10

Figure 3:
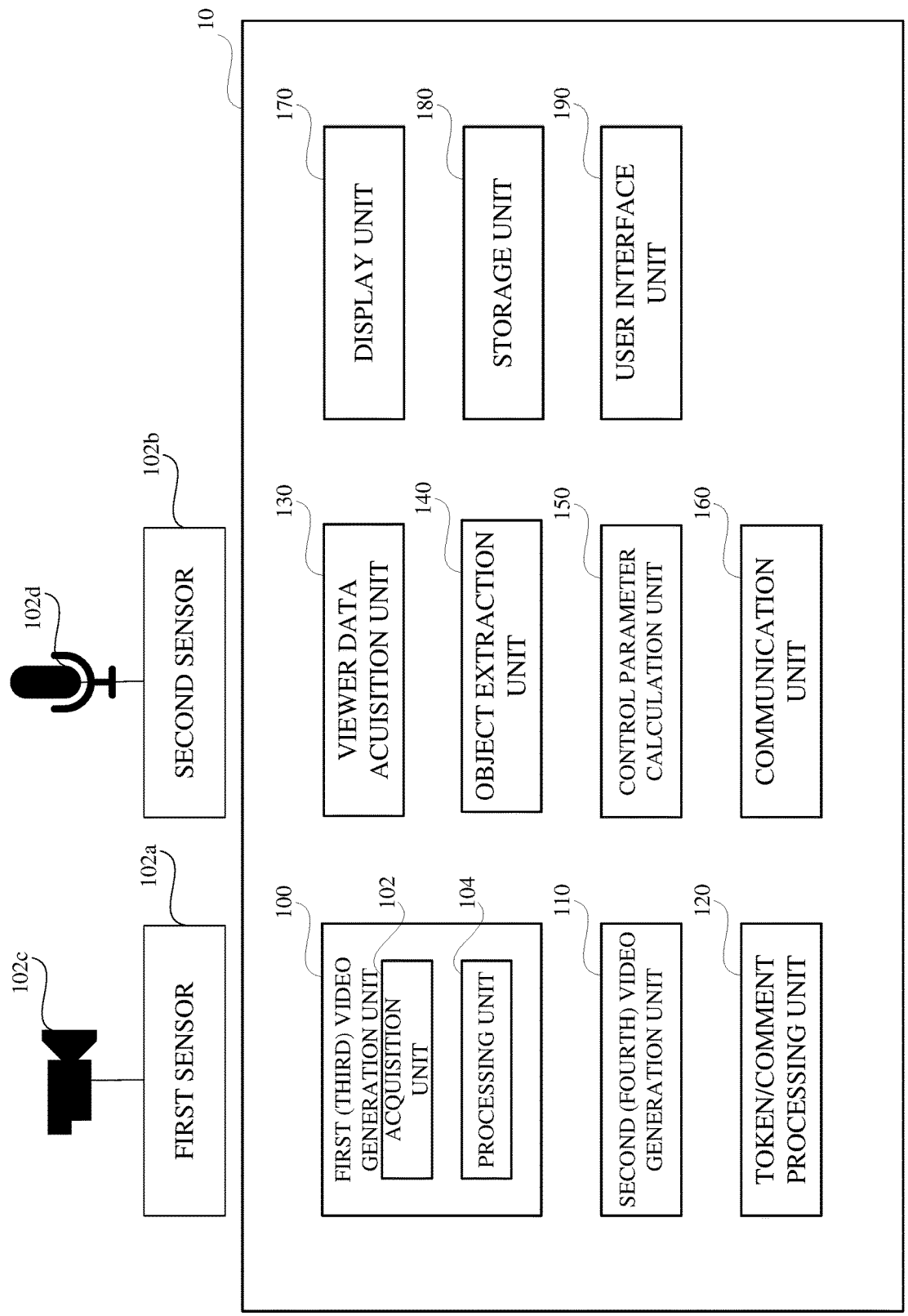
FIG. 3 is a block diagram schematically showing an example of a function of the terminal device 10 shown in FIG. 1

An example of the function of the terminal device 10 will be described with reference to FIG. 3. FIG. 3 is a block diagram schematically showing an example of a function of the terminal device 10 shown in FIG. 1.

As shown in FIG. 3, the terminal device 10 can mainly include a first video generation unit 100 (third video generation unit 100), a second video generation unit 110 (fourth video generation unit 110), a token/comment processing unit 120, a viewer data acquisition unit 130, an object extraction unit 140, a control parameter calculation unit 150, a communication unit 160, a display unit 170, a storage unit 180, and a user interface unit 190.

(1) First Video Generation Unit 100 (Third Video Generation Unit 100)

The first video generation unit 100 can generate the first video including an animation of an avatar of a distributor on the basis of motion data regarding the motion of the distributor. In order to realize this, the first video generation unit 100 can include an acquisition unit 102 and a processing unit 104, for example. As described above, the first video and the third video are essentially the similar videos, except that the distributors (the distributor of the first video is the user A, and the distributor of the third video is any of the users B to E), which are the basis of the video, are different. That is, in the first scene, the video distributed by the user A is referred to as the first video, and in the second scene, the video distributed by any of the users B to E is referred to as the third video. The functions of the terminal devices 10, e.g., the functions of the terminal devices 10A to 10E are identical. Therefore, it should be understood that the first video generation unit 100 can be read as the third video generation unit 100 in a part described as the first video generation unit 100.

The acquisition unit 102 can include one or more first sensors 102a that acquire data regarding the body of the distributor, and one or more second sensors 102b that acquire voice data regarding an utterance and singing emitted by the distributor.

In a preferred embodiment, the first sensor can include an RGB camera that captures visible light and a near-infrared camera that captures near-infrared light. As such a camera, it is possible to use one included in True Depth camera of iPhone X (registered trademark), for example. The second sensor can include a microphone for recording voice.

First, as for the first sensor, the acquisition unit 102 captures the body of the distributor by using the first sensor placed close to the body (e.g., face or hand and foot) of the distributor. Thus, the acquisition unit 102 can generate data (e.g., MPEG file) in which an image acquired by the RGB camera is recorded over a unit time in association with a time code (code indicating the time acquired). The acquisition unit 102 can generate data (e.g., TSV file) in which a numerical value (e.g., numerical value of floating point number) indicating a predetermined number (e.g., 51) of depths acquired by the near-infrared camera is recorded over a unit time in association with the time code. The TSV file is a file in a format where a plurality of data are recorded with data separated by tabs.

As for the near-infrared camera, specifically, a dot projector radiates, to the body of the distributor (performer), an infrared laser that forms a dot pattern, and the near-infrared camera captures the infrared dots projected and reflected on the body of the distributor and generates an image of the infrared dots thus captured. The acquisition unit 102 can compare an image of the dot pattern emitted by the dot projector registered in advance with an image captured by the near infrared camera. Thus, the acquisition unit 102 can calculate the depth (distance between each point or each feature point and the near-infrared camera) of each point (each feature point) by using the positional deviation at each point (each feature point) (e.g., each of 51 points and feature points) in the both images. The acquisition unit 102 can generate data in which a numerical value indicating the thus calculated depth is recorded over a unit time in association with the time code as mentioned above. The camera (s) that the first sensor 102a has is indicated with the reference sign 102c.

Next, as for the second sensor, the acquisition unit 102 acquires voice related to an utterance and singing emitted by the distributor using the second sensor placed close to the body of the distributor. The second sensor 102b can include at least one microphone 102d. Thus, the acquisition unit 102 can generate data (e.g., MPEG file) recorded over a unit time in association with a time code. In an embodiment, the acquisition unit 102 can acquire data regarding the body of the distributor using the first sensor, and at the same time, acquire voice data regarding an utterance and singing emitted by the distributor using the second sensor. In this case, the acquisition unit 102 can generate data (e.g., MPEG file) in which the image acquired by the RGB camera and the voice data regarding the utterance and singing emitted by the distributor using the second sensor are recorded over a unit time in association with the identical time code.

The acquisition unit 102 can output, to the processing unit 104, the data (MPEG file, TSV file, or the like) related to the body of the distributor thus generated, as motion data, and/or the voice data (MPEG file or the like) related to the utterance and singing emitted by the distributor.

For example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be generated with an image capture devices (such as a CCD (charge-coupled device) or CMOS (complementary metal oxide semiconductor) image sensor) coupled to a computer that transforms the motion data into video or other image data.

The case where the first sensor includes an RGB camera and an infrared camera has been described here. However, the first sensor can include, for example, any of the following (A) to (C).

(A) A camera that detects infrared rays emitted by an infrared laser and reflected on the face of the performer
(B) A plurality of RGB cameras that capture visible light
(C) A single camera that captures visible light In the case of (A) above, the acquisition unit 102 can calculate the depth for each feature point in the body of the distributor by the same method as that mentioned above. In the case of (B) above, the acquisition unit 102 can calculate the depth of each feature point of the body of the distributor using a plurality of images captured by a plurality of RGB cameras. In the case of (C) above, the acquisition unit 102 can calculate, by using deep learning or the like, the depth of each feature point in the body of the distributor from an image captured by a single camera. In the case of (C) above, the acquisition unit 102 can calculate the depth of each feature point of the body of the distributor by analysis processing (image processing and the like) for the image captured by the single camera.

The processing unit 104 can generate a video including an animation of a virtual character (avatar of the distributor) on the basis of the data regarding the body of the distributor from the acquisition unit 102. As for the video itself of the virtual character, the processing unit 104 can also generate the video of the virtual character by causing a rendering unit not illustrated to execute rendering using various data (e.g., geometry data, bone data, texture data, shader data, blend shape data, and so on) stored in a character storage unit not illustrated.

By using various known techniques, the processing unit 104 can generate a video (e.g., a video in which the facial expression of the avatar changes in synchronization with the movement of the mouth and both eyes of the distributor, e.g., a video in which the facial expression of the avatar changes in response to lip-sync and gaze tracking with respect to the face of the distributor) in which the facial expression of the avatar or the like is changed by using the data (data regarding the depth of each feature point in the body of the distributor) related to the body of the distributor from the acquisition unit 102.

Any other known technique can be used for generating the first video (third video) including an animation of the avatar of the distributor on the basis of the motion data regarding the motion of the distributor. Such well-known technology includes a technique referred to as "blend shapes" described in a website specified by the following URL.

https://developer.apple.com/documentation/arkit/arfaceanchor/2928251-blendshapes When using this technique, the processing unit 104 can adjust each parameter of one or more feature points corresponding to the motion of the distributor among a plurality of feature points of the upper body (face or the like) of the distributor. This allows the processing unit 104 to generate a video of a virtual character that follows the action of the distributor.

(2) Second Video Generation Unit 110 (Fourth Video Generation Unit 110)

The second video generation unit 110 can generate the second video regarding the game on the basis of the operation data regarding the operation of the distributor by using the web page received from the web server device 20B. As described above, the second video and the fourth video are essentially the similar videos, except that the distributors (the distributor of the second video is the user A, and the distributor of the fourth video is any of the users B to E), which are the basis of the video, are different. That is, in the first scene, the video distributed by the user A is referred to as the second video, and in the second scene, the video distributed by any of the users B to E is referred to as the fourth video. The functions of the terminal devices 10, e.g., the functions of the terminal devices 10A to 10E are identical. Therefore, it should be understood that the second video generation unit 110 can be read as the fourth video generation unit 110 in a part described as the second video generation unit 110.

The second video generation unit 110 executes a game program incorporated in the web page received from the web server device 20B. Thus, the second video generation unit 110 can render the second video (game video) related to the game on the basis of the operation data indicating the operation of the distributor input by the user interface unit 190 and at least one game object in which the related control parameter has been calculated by the control parameter calculation unit 150. For example, the operation data can include one or more of the following: data indicative of how the distributor has swiped a touch pad display, data indicative of which object the distributer has tapped or clicked, or data indicative of how the distributor has dragged a touch pad display, or other such operation data.

(3) Token/Comment Processing Unit 120

The token/comment processing unit 120 can process token data and/or comment data transmitted/received regarding distribution and/or viewing of a video. For example, when the terminal device 10 operates as the terminal device 10A of the user A as a distributor in the first scene, the token/comment processing unit 120 can process the token data and/or comment data transmitted to this user A and the comment data distributed (transmitted) by the user A to the terminal device 10 of each viewer (in FIG. 1, the terminal device 10B of the user B to the terminal device 10E of the user E). When the terminal device 10 operates as the terminal device 10 of the viewer (for example, in the first scene, the terminal device 10B of the user B to the terminal device 10E of the user E), the token/comment processing unit 120 can process the token data and/or comment data to be transmitted by this viewer (user B to user E).

When the video distribution application and/or the video viewing application is installed in the terminal device 10 (the terminal device 10 of the distributor and the terminal device 10 of the viewer), the token/comment processing unit 120 can store the token data set in advance in these applications. The token data can include data such as names, shapes, colors, and places for the avatars to be attached of various types of tokens, and price data set in advance for each token.

The token/comment processing unit 120 can be implemented with a processor coupled to a memory storing computer-readable instructions executed by the processor to process token data/comment data.

Specifically, for example, in the first scene, using the user interface unit 190 of the terminal device 10 (the terminal device 10B of the user B to the terminal device 10E of the user E) of the viewers, the users B to E, who are viewers, can purchase a discretionary token for the user A (the terminal device 10A of the user A, who is a distributor), and then perform an operation of transmitting the purchased token to the user A. By the operation related to the transmission of a token (also called "token-giving action") by the viewer, the token data regarding a target token is transmitted from the terminal device 10 of the viewer to the terminal device 10A of the user A via the server device 20 (distribution server device 20a). Thus, the token/comment processing unit 120 in the terminal device 10A of the user A can execute the processing of reading the received token data.

(4) Viewer Data Acquisition Unit 130

The viewer data acquisition unit 130 can receive, from the server device 20 (distribution server device 20a), data on each viewer (viewer data) regarding the first video and/or the second video (third video and/or fourth video) distributed from the terminal device 10 of the distributor to the terminal device 10 of each viewer via the server device 20 (distribution server device 20a). The viewer data acquisition unit 130 can be implemented with a processor coupled to a memory storing computer-readable instructions executed by the processor to acquire viewer data.

Here, the viewer data is user data on each user as a viewer stored in the server device 20 (the first DB server device 20b and the second DB server device 20c of the server system 20A). That is, for example, in the first scene, since the viewer is the users B to E, the viewer data in the first scene means the user data on the users B to E. Similarly, in the second scene, when the user B is a distributor, the viewer is the user A and the users C to E, and hence the viewer data in the second scene means the user data on the user A and the users C to E. Also when any of the users C to E is a distributor in the second scene, it is only required to think in the same manner as when the user B is a distributor.

The user data includes not only data on each user as a viewer but also data (distributor data) regarding the distributed video when each user distributes the first video and/or the second video (third video and/or fourth video) as a distributor.

Here, the data on each user as a viewer can include data on accumulated point or accumulated amount of tokens or points sent (transmitted) as a viewer to a discretionary distributor. For example, focusing on the user C, given that the user C executes any kind of token—giving actions (giving a token (s)) to the user A as a distributor in the first scene and also executes any kind of token-giving actions (giving a tokens (s)) to the user B when the user B is a distributor in the second scene, data regarding points and token purchase amounts (token-giving action amounts) associated with the token-giving actions in the first scene and the second scene can be used as data as a viewer regarding the user C. Regarding other users including the user D and the user E, by managing "data as a viewer" similar to the user C by the server device 20, data regarding any ranking (e.g., ranking of completion with other viewers for the total giving amount to the distributor) of the user C as a viewer can also be included as data as a viewer regarding the user C. Such data as a viewer is only required to be managed by the distribution server device 20a of the server device 20 and stored in the first DB server device 20b and the second DB server device 20c.

Next, the above-mentioned distributor data can include avatar data regarding an avatar (avatar of the user A) in the first video and/or the second video distributed by the user A as the distributor in the first scene, for example, and game data regarding the game. Similarly, if the user B is a distributor in the second scene, for example, the above-mentioned distributor data can include avatar data regarding an avatar (avatar of the user B) in the third video and/or the fourth video distributed by the user B as the distributor and game data regarding the game. Also in the case where any of the users C to E is a distributor in the second scene, the above-mentioned distributor data can include avatar data regarding an avatar (avatars of the users C to E) in the third video and/or the fourth video distributed by any of the users C to E as a distributor and game data regarding the game. The data on the distributor may include data such as the number of followers (viewers who follow the video distribution by the user A) of the user A as a distributor, for example, in the first scene, and any ranking (e.g., ranking of completion with other distributors for accumulated point earned by the token-giving actions from viewers) of the user A.

The avatar data can include data regarding, for example, avatar attributes and/or items attached or given to the avatar. The avatar attribute can include, for example, the type (occupation) of avatar such as a wizard, a monk, a high school girl, and a brave, and the character of avatar such as gentle, rough, dynamic, and laid-back. The avatar attribute may be set individually by each distributor when the distributor sets the avatar, or may be set automatically by the installed video distribution application.

Data regarding the item to be attached or given to the avatar can include various items that each distributor has attached to the avatar (or purchased on the video distribution application) or that have been given as a token by the viewers viewing the video. Here, the item can include things that the avatar can wear such as costumes, protection, and accessories, and game objects such as spells, killer moves, and life.

The game data can include, for example, game progress data (saved data stored in response to the progress of the game), any title (badge and the like) given to the distributor (user) in accordance with the game score or the game progress, and record data in any game event or tournament.

As described above, the viewer data acquisition unit 130 acquires, from the server device 20 (distribution server device 20a), user data on at least one of the users B to E as a viewer, the data as the viewer, distributed by the terminal device 10A of the user A as a distributor (first distributor), for example, in the first scene, and (at least a part of) distributor data regarding the third video and/or the fourth video distributed by the users B to E (the users B to E distribute as a second distributor) in the second scene.

(5) Object Extraction Unit 140

The object extraction unit 140 can extract at least one specific game object to be controlled based on the viewer data (user data on the users B to E in the first scene) acquired by the viewer data acquisition unit 130, from among a plurality of game objects used in a game generated based on operation data related to the operation of the distributor (user A in the first scene). The at least one specific game object to be controlled can include at least one game object acquired and/or operated by the distributor in the game. The at least one game object to be "acquired" or "operated" by the distributor in the game can include items, equipment, points, rewards, coins, cards, characters, and/or avatars. The object extraction unit 140 can be implemented with a processor coupled to a memory storing computer-readable instructions executed by the processor.

(6) Control Parameter Calculation Unit 150

Based on viewer data acquired by the viewer data acquisition unit 130, the control parameter calculation unit 150 can calculate the control parameter related to the specific game object extracted by the object extraction unit 140. The specific calculation of the control parameter related to the specific game object will be described later. As described above, the specific game object extracted by the object extraction unit 140 can include at least one game object acquired and/or operated by the distributor (user A in the first scene) in the game. The control parameter calculation unit 150 can be implemented with a processor coupled to a memory storing computer-readable instructions executed by the processor.

(7) Communication Unit 160

The communication unit 160 can communicate various data used for distribution and/or viewing of a video between the server system 20A and the web server device 20B. For example, when the terminal device 10 operates as the terminal device 10 of the distributor, the communication unit 160 can access the web server device 20B and receive a web page (HTML document) or the like containing a game program used for executing a game or the like. When the terminal device 10 operates as the terminal device 10 of the distributor, the communication unit 160 can receive viewer data regarding at least one viewer from the distribution server device 20a. Furthermore, when the terminal device 10 operates as the terminal device 10 of the distributor, the communication unit 160 can transmit the first video and/or the second video (third video and/or fourth video) to the server system 20A, and can receive, from the server system 20A (token/comment API server device 20d), token data and/or comment data and the like transmitted from the terminal device 10 of the viewer to the distributor. Furthermore, when the terminal device 10 operates as the terminal device 10 of the distributor, the communication unit 160 can transmit, to the server system 20A (token/comment API server device 20d), comment data or the like to the terminal device 10 of the viewer. The communication unit 160 may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

When the terminal device 10 operates as the terminal device 10 of the viewer, the communication unit 160 can receive, from the server system 20A (distribution server device 20a), the first video and/or the second video (third video and/or fourth video) and the comment data transmitted by the terminal device 10 of the distributor, and can transmit, to the server system 20A (distribution server device 20a), the token data and/or the comment data to the distributor (terminal device 10 of the distributor).

(8) Display Unit 170

The display unit 170 can display various data used for distribution and/or viewing of a video. Specifically, the display unit 170 can display the first video and/or the second video (third video and/or fourth video) to be distributed, the first video and/or the second video (third video and/or fourth video) having been received, and/or the like. The display unit 170 can also display token data/comment data and the like transmitted/received between the distributor and the viewer.

(9) Storage Unit 180

The storage unit 180 can store various data used for distribution and/or viewing of a video using computer-readable memory or storage devices. Specifically, the storage unit 180 can store at least a part of various data regarding the first video (including data on the distributor), various data regarding the second video (including data on the distributor), various data regarding the third video (including data on the distributor), various data regarding the fourth video (including data on the distributor), token data and comment data transmitted/received between the terminal device 10 of the distributor and the terminal device 10 of the viewer, and the like.

(10) User Interface Unit 190

The user interface unit 190 can input, via the user (distributor or viewer) operation, various data used for distribution and/or viewing of a video. For example, the user interface unit 190 can input, from the distributor, operation data indicating the contents of the operation by the distributor when executing the game, and output the data to the second video generation unit 110 (fourth video generation unit 110). The user interface unit 190 may include a touch input device, such as a keyboard, keypad, mouse, touch screen display, pen, or trackball, a voice input device, a camera, an image sensor, a scanning device, or another device, that provides user input.

3-2. Functions of Server Device 20

Figure 4:
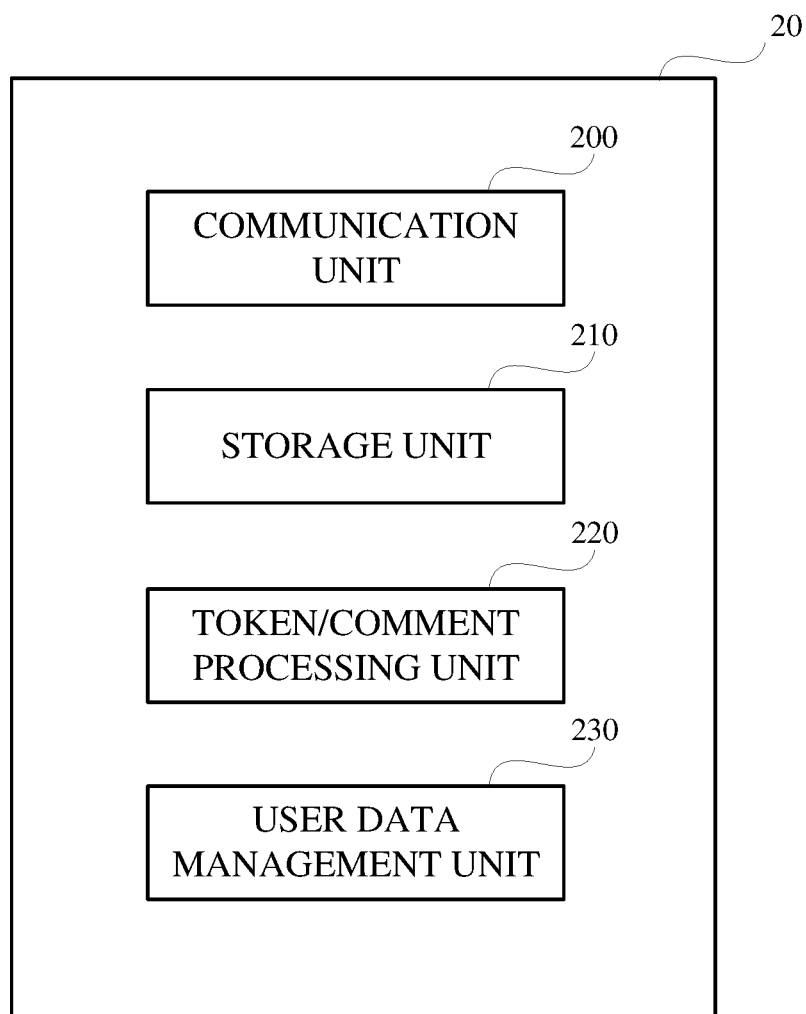
FIG. 4 is a block diagram schematically showing an example of a function of the server device 20 shown in FIG. 1.

Next, an example of the function of the server device 20 will be described with reference to FIG. 4. FIG. 4 is a block diagram schematically showing an example of a function of the server device 20 shown in FIG. 1.

As shown in FIG. 4, the server device 20 can mainly include a communication unit 200, a storage unit 210, a token/comment processing unit 220, and a user data management unit 230. These may be included in any one of the distribution server device 20a, the first DB server device 20b, the second DB server device 20c, and the token/comment API server device 20d constituting the server system 20A, or may be included redundantly or dispersedly in at least one server device of the distribution server device 20a, the first DB server device 20b, the second DB server device 20c, and the token/comment API server device 20d.

The communication unit 200 can communicate various data used for distribution and/or viewing of a video between the terminal device 10 of the distributor and/or the terminal device 10 of the viewer. For example, when operating as the server system 20A, the server device 20 can receive the first video and/or the second video (third video and/or fourth video) from the terminal device 10 of each distributor and can distribute the received video to the terminal device 10 of each viewer. When operating as the server system 20A, the server device 20 can receive token data and/or comment data to the terminal device 10 of the distributor (the terminal device 10A of the user A in the first scene) from the terminal device 10 of each viewer regarding the first video and/or the second video, and can transmit them to the terminal device 10 of the distributor (the terminal device 10A of the user A in the first scene). Furthermore, when operating as the server system 20A, the server device 20 can receive comment data to the terminal device 10 of each viewer from the terminal device 10 of a certain distributor, and can transmit this comment data to the terminal device 10 of each viewer. Furthermore, when operating as the server system 20A, the server device 20 can transmit user data (viewer data) managed by the user data management unit 230 (and stored in the storage unit 210) to the terminal device 10 of the distributor (e.g., in the first scene, the terminal device 10A of the user A) who has received an inquiry. Furthermore, when operating as the web server device 20B, the server device 20 can transmit, to the terminal device 10 of each distributor having accessed, a web page in which a game program is incorporated.

The storage unit 210 is used for distribution and/or viewing of a video, and can store various user data (including data on each user as a viewer and/or data on a distributor to be described later) received from the communication unit 200, the token/comment processing unit 220, and/or the user data management unit 230. The storage unit 210 can store various user data received from the user data management unit 230 for each user based on the identification ID given to each user.

The token/comment processing unit 220 can process token data and/or comment data transmitted from each viewer (terminal device 10 of each viewer) to each distributor (terminal device 10 of each distributor). The token/comment processing unit 220 can also process comment data transmitted from each distributor (terminal device 10 of each distributor) to each viewer (terminal device 10 of each viewer).

The user data management unit 230 can manage, for example, at least one piece of the following user data (data on the distributor) regarding the first video to the fourth video from each distributor (terminal device 10 of each distributor), without being limited thereto.

(a) Avatar data regarding an avatar of a distributor (for example, the user A in the first scene, and the users B to E in the second scene) including, for example, the following data.

Avatar attribute data regarding the type (occupation) of avatar such as a wizard, a monk, a high school girl, and a brave, and the character of avatar such as gentle, rough, dynamic, and laid-back.

Data regarding the item to be attached or given to the avatar, the data regarding various items that each distributor has attached to the avatar (or purchased on the video distribution application) or that have been given as a token by the viewers. Here, the item can include things that the avatar can wear such as costumes, weapons, protection, and accessories (e.g., headbands, rings, and necklaces), and game objects such as spells, killer moves, and life.

(b) Game data regarding the game of the distributor, including, for example, the following data.

Game progress data (saved data stored in response to the progress of the game).

Data regarding any title (badge, level, and the like) given to the distributor (user) in accordance with the game score or the game progress.

Record data in any game event or tournament.

The user data management unit 230 can receive appropriate data from the token/comment processing unit 220, and can manage, as data on each user as a viewer, the data (user data) exemplified below.

Data on accumulated point or accumulated amount of tokens or points sent (transmitted) as a viewer to a discretionary distributor (for example, focusing on the user C, given that the user C executes any kind of token-giving actions to the user A as a distributor in the first scene and also executes any kind of token-giving actions to the user B when the user B is a distributor in the second scene, data regarding points and token purchase amounts (token-giving action amounts) associated with the token-giving actions in the first scene and the second scene can be used as data as a viewer regarding the user C).

Data regarding any ranking (e.g., ranking of completion with other viewers for the total token-giving actions amount to the distributor) of the user as a viewer.

The server system 20A is provided for the purpose of performing a function of distributing, to each terminal device 10 of the plurality of viewers, the first video and/or the second video (third video and/or fourth video) transmitted by the terminal device 10 of each distributor. In the terminal device 10 of a distributor and the terminal device 10 of a viewer having a specific application (video distribution application, video viewing application, or the like) installed, an identification ID is given to each user (regardless of the distributor or the viewer).

The server system 20A relays token data and comment data exchanged between each distributor and each viewer.

Therefore, the server system 20A can recognize the above-described data on each user as a viewer and various user data (data on the distributor) on each user exemplified as described above in a scene (e.g., first scene or second scene) in which each user (e.g., users A to E in FIG. 1) can be a distributor. That is, by associating the distribution and reception history (log), the token purchase history, the transmission/reception history of the token data, and the history regarding the game progress (saved data stored in response to the progress of the game) with the identification ID of each user, the server system 20A can manage and store, for each user (for each identification ID), the various user data (including data as a viewer and/or data on distributor) on each user exemplified as described above.

When the server device 20 operates as the web server device 20B, the token/comment processing unit 220 and the user data management unit 230 may be omitted.

3-3. Function of Studio Unit 30

As mentioned above, the studio unit 30 can perform the same function as that of the terminal device 10 and/or the server device 20. Therefore, the studio unit 30 can have the function of the terminal device 10 described with reference to FIG. 3 and/or the function of the server device 20 described with reference to FIG. 4.

When the studio unit 30 is used for the purpose of performing a function similar to that of the terminal device 10 of the distributor, a first video generation unit 300 (third video generation unit 300) (not illustrated) in the studio unit 30 may have a function similar to that of the first video generation unit 100 (third video generation unit 100) in the above-mentioned terminal device 10, or may have yet another function added thereto.

4. Overall Operation of Video Distribution System 1

Figure 5A:
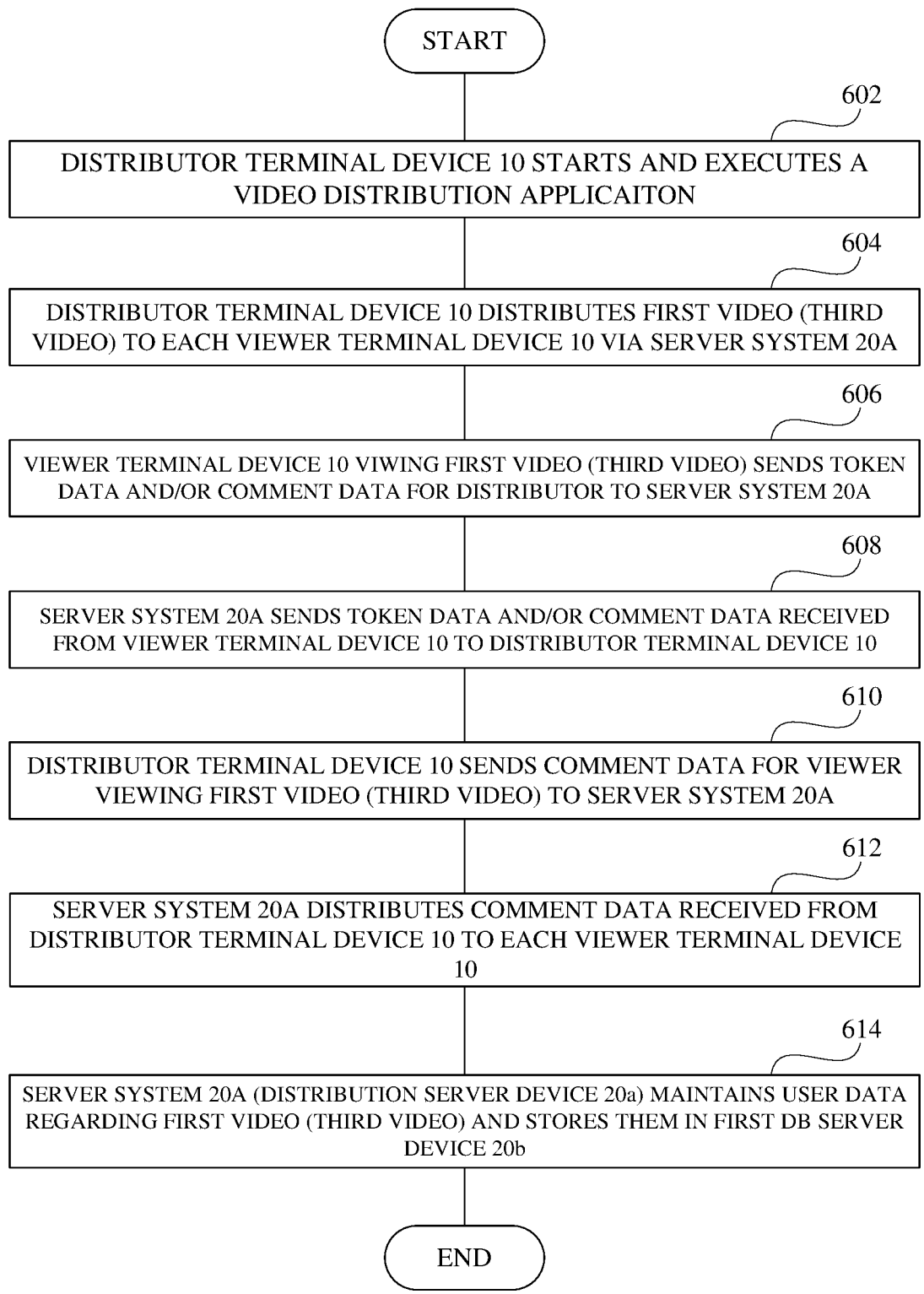
FIG. 5A is a flowchart showing an example of the operation performed in the video distribution system 1 shown in FIG. 1.
Figure 5B:
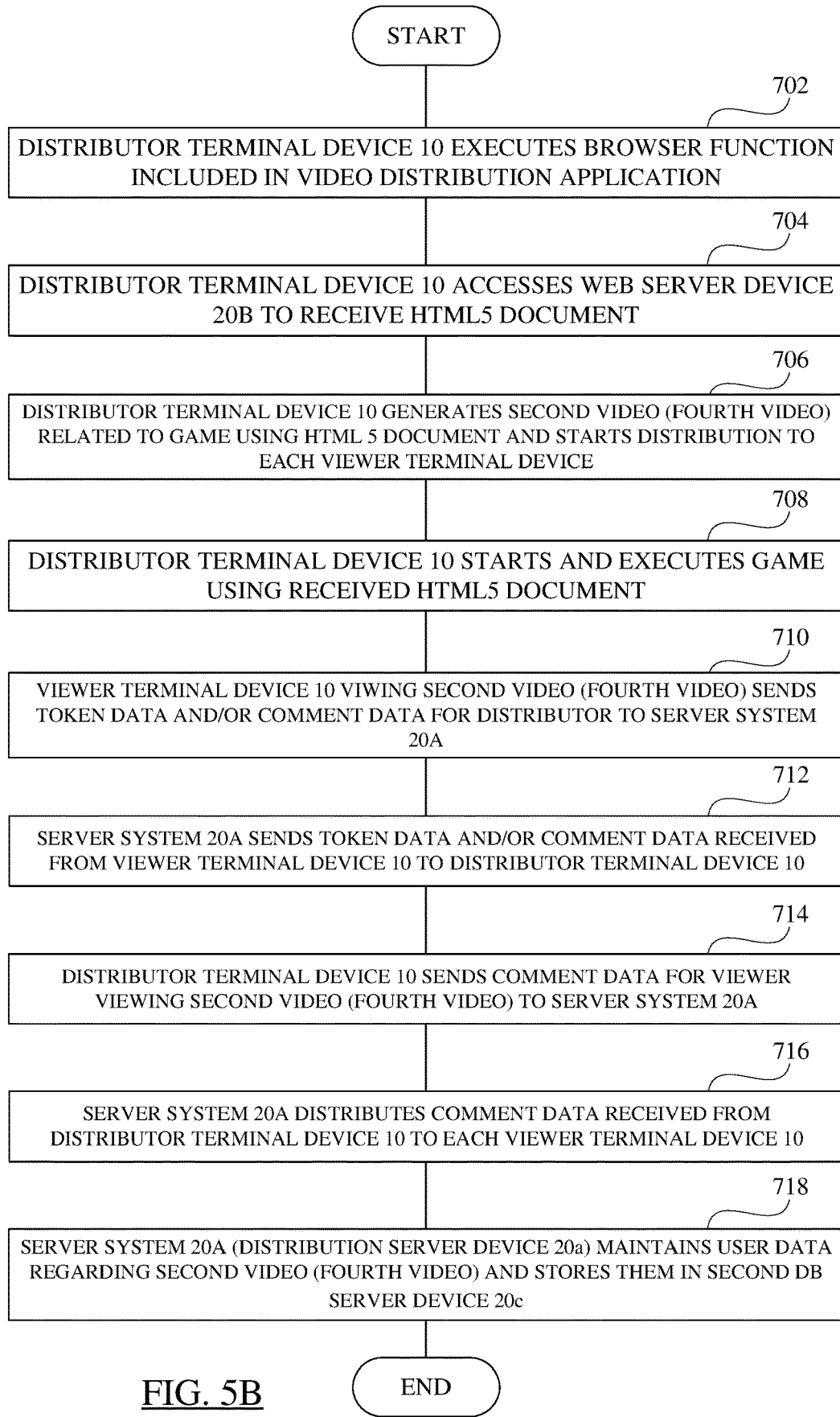
FIG. 5B is a flowchart showing an example of the operation performed in the video distribution system 1 shown in FIG. 1.
Figure 5C:
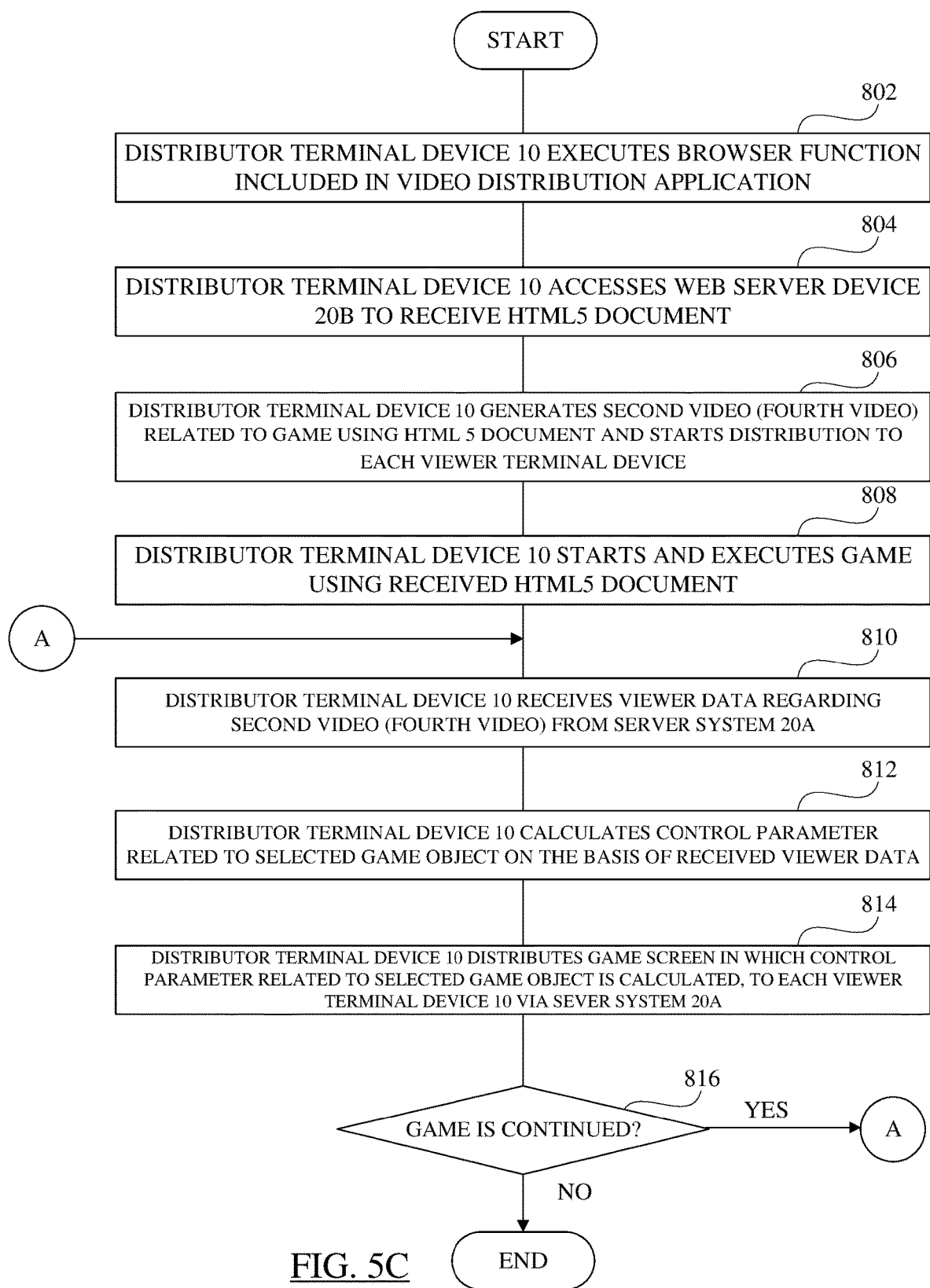
FIG. 5C is a flowchart showing an example of the operation performed in the video distribution system 1 shown in FIG. 1.
Figure 6:
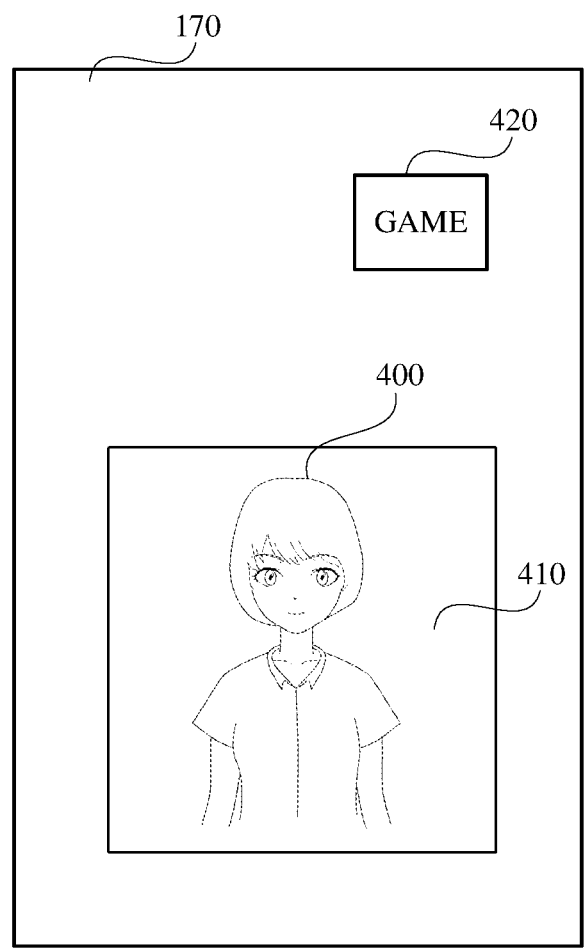
FIG. 6 is a view showing an example of the first video (third video) displayed on the terminal device 10 used in the video distribution system 1 shown in FIG. 1.
Figure 7:
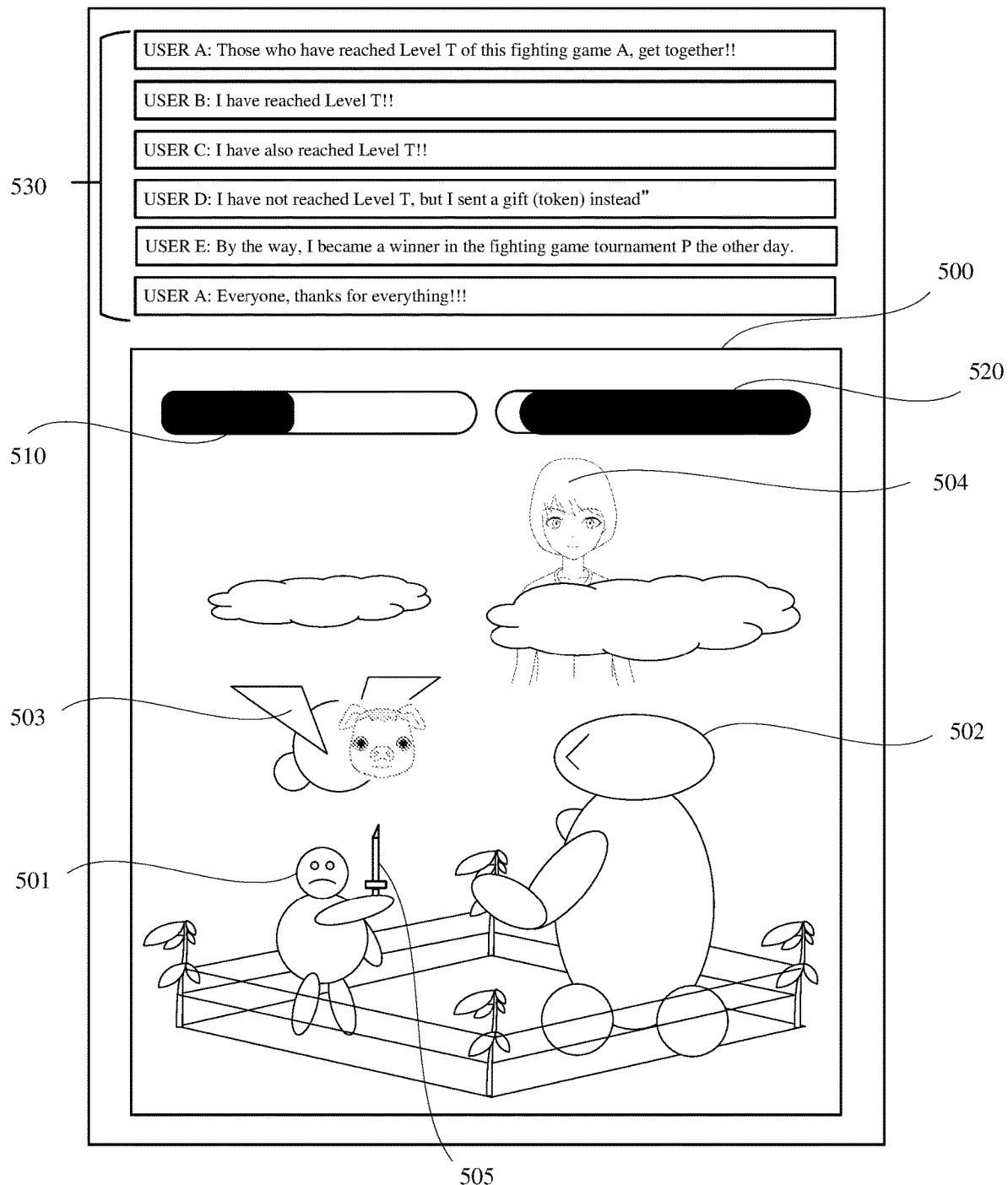
FIG. 7 is a view showing an example of the second video (fourth video) displayed on the terminal device 10 used in the video distribution system 1 shown in FIG. 1.

Next, the overall operation executed in the video distribution system 1 having the above-mentioned configuration will be described with reference to FIGS. 5A to 7. FIGS. 5A to 5C are flowcharts showing an example of the operation performed in the video distribution system 1 shown in FIG. 1. FIG. 6 is a view showing an example of the first video (third video) displayed on the terminal device 10 used in the video distribution system 1 shown in FIG. 1. FIG. 7 is a view showing an example of the second video (fourth video) displayed on the terminal device 10 used in the video distribution system 1 shown in FIG. 1.

First, a series of steps in which the first video or the third video is distributed will be described with reference to FIG. 5A.

First, in step (hereinafter referred to as "ST") 602, in response to the operation of the distributor (e.g., the user A in the first scene, and the users B to E in the second scene), the terminal device 10 (e.g., the terminal device 10A of the user A in the first scene, and any of the terminal device 10B of the user B to the terminal device 10E of the user E in the second scene) starts and executes the video distribution application.

Next, in ST604, the terminal device 10 of the distributor (e.g., the terminal device 10A of the user A in the first scene, and any of the terminal device 10B of the user B to the terminal device 10E of the user E in the second scene) generates the first video (third video) including an animation of an avatar of the distributor based on the motion data regarding the motion of the distributor (the user A in the first scene, and any of the users B to E in the second scene). Thus, as illustrated in FIG. 6, a first video 410 (third video 410) including an animation of an avatar 400 of the distributor is displayed on the display unit 170 of the terminal device 10 of the distributor.

In ST604, the terminal device 10 of the distributor transmits the generated first video 410 (third video 410) to the distribution server device 20a of the server system 20A. From the terminal device 10 of each viewer having accessed the distribution server device 20a by executing the video viewing application, the distribution server device 20a can receive a request signal for requesting the first video 410 (third video 410) distributed by the terminal device 10 of the distributor. In response to this request signal, the distribution server device 20a can distribute, to the terminal device 10 of each viewer, the first video 410 (third video 410) received from the terminal device 10 of the distributor. In this manner, the first video 410 (third video 410) as illustrated in FIG. 6 is displayed also on the display unit 170 of the terminal device 10 of each viewer.

Next, in ST606, a case is assumed in which the viewer (e.g., users B to E in the first scene) viewing the first video 410 (third video 410) distributed by the terminal device 10 of the distributor gives (tokens) a token (token G1 as an example here) to the distributor. By operating the user interface unit 190 of the terminal device 10 (e.g., the terminal device 10B of the user B to the terminal device 10E of the user E in the first scene), the viewer can select (purchase) the token G1 from among a plurality of preset tokens, and can select a command for giving the token G1 to the distributor (e.g., the user A in the first scene). Thus, the terminal device 10 of the viewer can transmit, to the token/comment API server device 20d of the server system 20A (via the distribution server device 20a), token data indicative of giving the token G1 to the distributor. This token data can include, for example, recipient identification data (in this case, the identification ID of the user A) for identifying the recipient (in this case, the user A) of the token, token identification data for identifying the token (in this case, the token G1), and sender identification data (in this case, the identification ID of the user C) for identifying the sender (in this case, for example, the user C) of the token.

By operating the terminal device 10, each viewer (e.g., the users B to E in the first scene) can also transmit a comment to the distributor (e.g., the user A in the first scene). In this case, the terminal device 10 of the viewer can transmit the comment data to the token/comment API server device 20d of the server system 20A (via the distribution server device 20a). The comment data can include recipient identification data (in this case, the identification ID of the user A) for identifying the recipient (in this case, the user A) of the comment, comment content data (e.g., a comment, "Go for it") regarding the content of the comment, and sender identification data (in this case, the identification ID of the user D) for identifying the sender (in this case, for example, the user D) of the comment.

Next, in ST608, the token/comment API server device 20d of the server system 20A transmits, to the terminal device 10 of the distributor without delay (or every unit time), the token data and/or comment data received from the terminal device 10 of the viewer via the distribution server device 20a. Thus, the token and comment corresponding to the received token data and/or comment data are displayed on the display unit 170 of the terminal device 10 of the distributor. The token/comment API server device 20d of the server system 20A stores the received token data and/or comment data in the first DB server device 20b. At this time, the token/comment API server device 20d may transmit the received token data and/or comment data to the distribution server device 20a. Thus, the distribution server device 20a can manage data as a viewer regarding the token and/or comment of each viewer.

Next, in ST610, a case is assumed in which the distributor (e.g., the user A in the first scene) transmits a comment to all viewers or a specific viewer viewing the first video (third video). The distributor can comment to all or a specific viewer by operating the user interface unit 190 of the terminal device 10. That is, the terminal device 10 of the distributor can transmit the comment data to the token/comment API server device 20d of the server system 20A. The comment data in this case can also include the above-mentioned recipient identification data (in the first scene, the identification ID of the users B to E), comment content data, and sender identification data (in the first scene, the identification ID of the user A).

Next, in ST612, the token/comment API server device 20d of the server system 20A transmits, to the distribution server device 20a, the comment data received from the terminal device 10 of the distributor, and the distribution server device 20a distributes this comment data to the terminal device 10 of each viewer. The token/comment API server device 20d stores the received comment data in the first DB server device 20b.

Next, in ST614, the distribution server device 20a of the server system 20A manages, in the first scene and the second scene, user data (data on distributor) on each distributor (the user A in the first video and the users B to E in the third video) regarding the first video 410 and the third video 410, and data (e.g., data on the users B to E viewing the first video 410 in the first scene, and data on the users A and C to E viewing the third video 410 in the second scene) on each viewer as a viewer regarding the first video 410 and the third video 410. The distribution server device 20a can grasp the distribution of the first video 410 and the third video 410, and all pieces of token data and/or comment data transmitted/received between the terminal device 10 of the distributor and the terminal device 10 of the viewer regarding the distribution of the first video 410 and the third video 410. Thus, the (user data management unit 230 of) distribution server device 20a can manage (acquire) various distributor data such as avatar data (including token data) regarding the avatar of the distributor regarding the first video and the third video, and the above-mentioned data on each viewer as a viewer in the first video 410 and the third video 410. The distribution server device 20a stores the data (data on the distributor and/or data as a viewer) on each user regarding the first video 410 and the third video 410 in the first DB server device 20b. Since a unique identification ID is given to each distributor and each viewer, the distribution server device 20a can manage (acquire) user data for each user (e.g., for each of the users A to E), and can store each user data in the first DB server device 20b for each user.

ST602 to ST614 described above are a series of operations that distributes the first video 410 or the third video 410 from the terminal device 10 of the distributor. ST614 does not necessarily have to be executed after ST612, and each time the operations of ST604 to ST612 are executed, viewer data related to the operations may be managed (acquired) and the user data (data on the distributor and/or data as a viewer) may be stored in the first DB server device 20b.

In ST602 to ST614 described above, the series of typical operations that distributes the first video 410 or the third video 410 from the terminal device 10 of each distributor ends. This series of operations allows the server system 20A (distribution server device 20a) to acquire user data (data on the distributor and/or data as a viewer) on each user regarding the first video 410 or the third video 410.

Next, a series of steps in which the second video or the fourth video is distributed will be described with reference to FIG. 5B. FIG. 5B focuses on the series of steps that distributes the second video or the fourth video. FIG. 5B is sometimes performed following the series of steps in FIG. 5A (in this case, ST614 in FIG. 5A is followed by ST702, which will be described later) or is sometimes performed independently of the series of steps in FIG. 5A (regardless of the series of steps in FIG. 5A).

First, in ST702, when the distributor (the user A in the first scene, and any of the users B to E in the second scene) taps or the like an icon 420 of "Game" (see FIG. 6) displayed on the display unit 170 of the terminal device 10 of the distributor, the terminal device 10 of the distributor executes the browser function equipped on the video distribution application. Thus, in ST704, the terminal device 10 of the distributor can access the web server device 20B in a state of having executed the video distribution application (e.g., of being capable of distributing the first video 410 or the third video 410 to the terminal device 10 of each viewer). Therefore, the terminal device 10 of the distributor can receive, from the web server device 20B, the HTML5 document in which the game program is incorporated.

Then, in ST706, the terminal device 10 of the distributor generates a video (second video or fourth video) regarding the game by executing the game program incorporated in the received HTML5 document. FIG. 7 shows an example of a second video 500 (fourth video 500) thus generated by the terminal device 10 of the distributor. The terminal device 10 of the distributor transmits the generated second video 500 or fourth video 500 to the distribution server device 20a of the server system 20A. From the terminal device 10 of each viewer having accessed the distribution server device 20a by executing the video viewing application, the distribution server device 20a can receive a request signal for requesting the second video 500 (fourth video 500) distributed by the terminal device 10 of the distributor. In response to this request signal, the distribution server device 20a can distribute, to the terminal device 10 of each viewer, the second video 500 (fourth video 500) received from the terminal device 10 of the distributor. In this manner, the second video 500 (fourth video 500) as exemplified in FIG. 7 is displayed also on the display unit 170 of the terminal device 10 of each viewer.

Next, in ST708, the terminal device 10 of the distributor starts and executes the game by executing the game program incorporated in the received HTML5 document. Therefore, at the same time as the game progresses, the terminal device 10 of the distributor distributes the situation of the game as the second video 500 (fourth video 500) to the terminal device 10 of each viewer via the distribution server device 20a.

The transmission of the first video 410 (third video 410) and the second video 500 (fourth video) in a case where FIG. 5B is executed following the series of steps of FIG. 5A will be supplemented. When transmitting the second video 500 (fourth video 500) generated in ST706 and ST708 to the distribution server device 20*a*, the terminal device 10 of the distributor may stop the transmission of the first video 410 (third video 410) to the distribution server device 20*a*, or may transmit the first video 410 (third video 410) together with the transmission of the second video 500 (fourth video 500). The distribution server device 20*a* distributes, to the terminal device 10 of each viewer receiving the first video 410 (third video 410) by executing the video viewing application, the second video 500 (fourth video 500) received from the terminal device 10 of the distributor. In this case, in a case of having received not only the second video 500 (fourth video 500) but also the first video 410 (third video 410) from the terminal device 10 of the distributor, the distribution server device 20*a* may transmit, to the terminal device 10 of each viewer, only the second video 500 (fourth video 500) or both the second video 500 (fourth video 500) and the first video 410 (third video 410). Thus, the second video 500 (fourth video 500) can be displayed on the display unit 170 of the terminal device 10 of each viewer in a state of being covered on the first video 410 (third video 410) as illustrated in FIG. 6 and hiding the first video 410 (third video 410).

Next, in ST710, a case is assumed in which the viewer (e.g., users B to E in the first scene) viewing the second video 500 (fourth video 500) distributed by the terminal device 10 of the distributor gives (tokens) a token (token G2 as an example here) to the distributor. By operating the user interface unit 190 of the terminal device 10 (e.g., the terminal device 10B of the user B to the terminal device 10E of the user E in the first scene), the viewer can select (purchase) the token G2 from among a plurality of preset tokens, and can select a command for giving the token G2 to the distributor (e.g., the user A in the first scene). Thus, the terminal device 10 of the viewer can transmit, to the token/comment API server device 20*d* of the server system 20A (via the distribution server device 20*a*), token data indicative of giving the token G2 to the distributor. This token data can include, for example, recipient identification data (in this case, the identification ID of the user A) for identifying the recipient (in this case, the user A) of the token, token identification data for identifying the token (in this case, the token G2), and sender identification data (in this case, the identification ID of the user C) for identifying the sender (in this case, for example, the user C) of the token.

By operating the terminal device 10, each viewer (e.g., the users B to E in the first scene) can also transmit a comment to the distributor (e.g., the user A in the first scene). In this case, the terminal device 10 of the viewer can transmit the comment data to the token/comment API server device 20*d* of the server system 20A (via the distribution server device 20*a*). The comment data can include recipient identification data (in this case, the identification ID of the user A) for identifying the recipient (in this case, the user A) of the comment, comment content data (e.g., a comment, "Go for it") regarding the content of the comment, and sender identification data (in this case, the identification ID of the user D) for identifying the sender (in this case, for example, the user D) of the comment.

Next, in ST712, the token/comment API server device 20*d* of the server system 20A transmits, to the terminal device 10 of the distributor without delay (or every unit time), the token data and/or comment data received from the terminal device 10 of the viewer via the distribution server device 20*a*. Thus, the token and comment corresponding to the received token data and/or comment data are displayed on the display unit 170 of the terminal device 10 of the distributor. The token/comment API server device 20*d* of the server system 20A stores the received token data and/or comment data in the second DB server device 20*c*. At this time, the token/comment API server device 20*d* may transmit the received token data and/or comment data to the distribution server device 20*a*. Thus, the distribution server device 20*a* can manage data as a viewer regarding the token and/or comment of each viewer.

Next, in ST714, a case is assumed in which the distributor (e.g., the user A in the first scene) transmits a comment to all viewers or a specific viewer viewing the second video 500 (fourth video 500). The distributor can comment to all or a specific viewer by operating the user interface unit 190 of the terminal device 10. That is, the terminal device 10 of the distributor can transmit the comment data to the token/comment API server device 20*d* of the server system 20A. The comment data in this case can also include the above-mentioned recipient identification data (in the first scene, the identification ID of the users B to E), comment content data, and sender identification data (in the first scene, the identification ID of the user A). The comment content data on the distributor to the viewer viewing the second video 500 (or fourth video 500) includes "Avatar in rare costume wanted!" and "Avatar in blue headband wanted!". By distributing the comment data as described above, the distributor can invite a user having an avatar matching the comment data as a viewer of the second video 500 (fourth video 500) distributed by the distributor. If the avatar of the viewer viewing the second video 500 (or the fourth video 500) does not match comment content of the distributor when receiving the comment content, it is assumed that the viewer changes the setting of the avatar as appropriate so that the avatar of the viewer wears a costume or an item matching the comment content of the distributor while maintaining the state of viewing the second video 500 (or the fourth video 500). Furthermore, in a case where the avatar of the viewer viewing the second video 500 (or the fourth video 500) does not match the comment content of the distributor when receiving the comment content and does not have a costume or an item matching the comment content, the viewer may purchase a costume or an item matching the comment content of the distributor on the video distribution system 1 and then perform setting so that the purchased costume or the item is put on to the avatar of the viewer while maintaining the state of viewing the second video 500 (or the fourth video 500). For the viewer to change the avatar setting, the viewer may execute processing of temporarily cancelling the state of viewing the second video 500 (or the fourth video 500) without maintaining and then returning to the state of viewing again.

In order to invite a viewer having an avatar satisfying a predetermined condition as described above, the distributor may transmit data, for example, the above-mentioned comment contents ("Avatar in rare costume wanted!" and "Avatar in blue headband wanted!") via a generally known social networking service (SNS).

Next, in ST716, the token/comment API server device 20*d* of the server system 20A transmits, to the distribution server device 20*a*, the comment data received from the terminal device 10 of the distributor, and the distribution server device 20*a* distributes this comment data to the terminal device 10 of each viewer. The token/comment API server device 20*d* stores the received comment data in the first DB server device 20*b*.

Next, in ST718, the distribution server device 20*a* of the server system 20A manages, in the first scene and the second scene, user data (data on distributor) on each distributor (the user A in the first video and the users B to E in the third video) regarding the second video 500 and the fourth video 500, and data (e.g., data on the users B to E viewing the second video 500 in the first scene, and data on the users A and C to E viewing the fourth video 500 in the second scene) on each viewer as a viewer regarding the second video 500 and the fourth video 500. The distribution server device 20*a* can grasp the distribution of the second video 500 and the fourth video 500, and all pieces of token data and/or comment data transmitted/received between the terminal device 10 of the distributor and the terminal device 10 of the viewer regarding the distribution of the second video 500 and the fourth video 500. Thus, the (user data management unit 230 of) distribution server device 20*a* can manage (acquire) various distributor data such as avatar data (including token data) regarding the avatar of the distributor regarding the second video 500 and the fourth video 500 and game data regarding the game, and the above-mentioned data on each viewer as a viewer in the second video 500 and the fourth video 500. The distribution server device 20*a* stores the data (data on the distributor and/or data as a viewer) on each user regarding the second video 500 and the fourth video 500 in the second DB server device 20*c*. Since a unique identification ID is given to each distributor and each viewer, the distribution server device 20*a* can manage (acquire) user data for each user (e.g., for each of the users A to E), and can store each user data in the second DB server device 20*c* for each user.

ST702 to ST718 described above are a series of operations that distributes the second video 500 or the fourth video 500 from the terminal device 10 of the distributor. ST718 does not necessarily have to be executed after ST716, and each time the operations of ST706 to ST716 are executed, viewer data related to the operations may be managed (acquired) and the user data (data on the distributor and/or data as a viewer) may be stored in the second DB server device 20*c*.

In ST702 to ST718 described above, the series of typical operations that distributes the second video 500 or the fourth video 500 from the terminal device 10 of each distributor ends. This series of operations allows the server system 20A (distribution server device 20*a*) to acquire user data (data on the distributor and/or data as a viewer) on each user regarding the second video 500 or the fourth video 500.

Next, with reference to FIG. 5C, a series of steps in which the second video 500 or the fourth video 500 is distributed will be described on an assumption that user data (data on the distributor and/or data as a viewer) on each user has been acquired by the server system 20A (distribution server device 20*a*) through the series of operations in FIGS. 5A and 5B, and the user data (data on the distributor and/or data as a viewer) on each user has been stored in the first DB server device 20*b* and the second DB server device 20*c*. That is, the series of operations shown in FIG. 5C is executed on the assumption that after the operation of at least any one of FIGS. 5A and 5B has been executed, the series of operations shown in FIG. 5C is executed continuously (in continuity with the series of operations in FIG. 5A and/or 5B) or independently (discontinuously from FIGS. 5A and 5B). As an example, FIG. 5C focuses on a case of being executed independently with respect to FIGS. 5A and 5B.

First, ST802 to ST808 are the same as ST702 to ST708 in FIG. 5B, detailed description thereof will be omitted.

Next, in ST810, when the terminal device 10 (in the first scene, the terminal device 10A of the user A) of the distributor makes an inquiry to the distribution server device 20*a* of the server system 20A about viewer data on the viewer (users B to E in the first scene) viewing the second video 500 or the fourth video 500 (the second video 500 in the first scene) distributed by the terminal device 10, the distribution server device 20*a* reads user data on each viewer (in the first scene, viewer data on the users B to E who are viewers, e.g., the data on the above-mentioned distributor of the users B to E and/or the above-mentioned data as viewer) stored in the first DB server device 20*b* and/or the second DB server device 20*c*. Thus, the terminal device 10 of the distributor can receive the user data on at least one of the viewers from the distribution server device 20*a*. Additionally, the transmission of the user data on the viewer from the distribution server device 20*a* to the terminal device 10 of the distributor does not necessarily have to be based on the above-mentioned inquiry from the terminal device 10 of the distributor, and may be automatically performed at predetermined time intervals, for example, from the distribution server device 20*a* to the terminal device 10 of the distributor. Thus, the terminal device 10 of the distributor can always acquire the latest user data on each viewer viewing the second video 500 or the fourth video 500 when the number of viewers increases or decreases with the progress (lapse of time) of the game by the distributor.

In ST810, in response to the inquiry from the terminal device 10 of the distributor, the distribution server device 20*a* may read only the user data on each viewer regarding the first video 410 or the third video 410 stored in the first DB server device 20*b*, may read only the user data on each viewer regarding the second video 500 or the fourth video 500 stored in the second DB server device 20*c*, or may read both of them. Specifically, for example, in the first scene, in response to the inquiry from the terminal device 10A of the user A, the distribution server device 20*a* may read only the user data on the users B to E regarding the first video 410 or the third video 410 stored in the first DB server device 20*b*, may read only the user data on the users B to E regarding the second video 500 or the fourth video 500 stored in the second DB server device 20*c*, or may read both of them. Here, the user data on each viewer regarding the first video 410 and the third video 410 is stored in the first DB server device 20*b* by ST614 in FIG. 5A. The user data on each viewer regarding the second video 500 and the fourth video 500 is stored in the second DB server device 20*c* by ST718 in FIG. 5B.

Next, in ST812, the terminal device 10 of the distributor (in the first scene, the terminal device 10A of the user A) having received the user data on each viewer from the distribution server device 20*a* calculates the control parameter related to the specific game object to be controlled from among the plurality of game objects used in the game based on (at least a part of) the received viewer data (of at least one viewer). Here, the specific game object to be controlled can include at least one game object acquired and/or operated by the distributor in the game. The at least one game object to be "acquired" or "operated" by the distributor in the game can include items, equipment, points, rewards, coins, cards, characters, and/or avatars (including the avatar of the distributor). The details of the calculation of the control parameters related to the specific game object will be described later in a specific example of the second video 500 (fourth video 500).

Thus, in ST814, the terminal device 10 of the distributor can generate the second video (game) 500 in which the control parameters related to the specific game object are calculated, and can distribute the generated second video 500 to the terminal device 10 of each viewer via the server system 20A (distribution server device 20*a*). The details of the game screen on which the control parameters related to the specific game object are calculated will be described later in the specific example of the second video 500 (fourth video 500).

Next, in ST816, when the terminal device 10 of the distributor continues the game, the processing of ST810 to ST814 described above can be repeated. On the other hand, if the terminal device 10 of the distributor does not continue the game, the processing ends.

5. Specific Example of Second Video 500 (Fourth Video 500)

Next, a specific example of the second video 500 (fourth video 500) will be described with reference to FIGS. 7 and 8. FIG. 8 is a view showing an example of calculation data included in an data table. FIG. 7 shows, as an example, a scene in which the second video 500 (fourth video 500) regarding a fighting game (one type of action game) being played by the distributor is displayed on the terminal device 10 of the distributor and displayed on the terminal device 10 of each viewer by ST814 described above.

In this game, as shown in FIG. 7, the distributor plays against a foe character 502 by operating an avatar (or character) 501 of the distributor. The avatar 501 of the distributor basically aims to defeat the foe character 502 by performing various attacks such as punches and kicks. The foe character may be preset in the game program, or may be an avatar of another distributor (e.g., distributor X) if the game is a fighting game between a plurality of distributors.

The terminal device 10 of the distributor can control at least one game object used in this game based on the viewer data (user data on the viewer) received from the distribution server device 20*a* of the server system 20A in ST810 described above. Specifically, the terminal device 10 of the distributor can first extract a game object to be controlled ("specific game object") from among a plurality of game objects used in the game. The terminal device 10 of the distributor can calculate the control parameter related to the extracted specific game object based on the received viewer data.

The viewer data received by the terminal device 10 of the distributor in ST810 described above can include at least one of the following examples. It should be noted that the following examples may be the latest user data on each viewer at the time point when the processing of ST810 is executed, or may be past user data traced back for a predetermined period (e.g., within a week) from the time point.

(a) User data on each viewer that is avatar data regarding at least any of the avatars of the first to fourth videos in a case where each viewer distributes as a distributor (e.g., the user A in the first scene, and the users B to E in the second scene), and includes, for example, the following data.

Avatar attribute data regarding the type (occupation) of avatar such as a wizard, a monk, a high school girl, and a brave, and the character of avatar such as gentle, rough, dynamic, and laid-back.

Data regarding the item to be attached or given to the avatar, the data regarding various items that each distributor has attached to the avatar (or purchased on the video distribution application) or that have been given as a token by the viewers. Here, the item can include things that the avatar can wear such as costumes, weapons, protection, and accessories (e.g., headbands, rings, and necklaces), and game objects such as spells, killer moves, and life.

(b) User data on each viewer that is game data regarding the game of the second video or the fourth video in a case where each viewer distributes as a distributor (e.g., the user A in the first scene, and the users B to E in the second scene), and includes, for example, the following data.

Game progress data (saved data stored in response to the progress of the game).

Data regarding any title (badge, level, and the like) given to the distributor (user) in accordance with the game score or the game progress.

Record data in any game event or tournament.

(c) User data on each viewer, including data on each viewer as a viewer, for example, as exemplified below.

Data on accumulated point or accumulated amount of tokens or points sent (transmitted) as a viewer to a discretionary distributor (for example, focusing on the user C, given that the user C executes any kind of token-giving actions (giving a token (s)) to the user A as a distributor in the first scene and also executes any kind of token-givinig actions (giving a token (s)) to the user B when the user B is a distributor in the second scene, data regarding points and token purchase amounts (token-givinig action amounts) associated with the token-giving actions in the first scene and the second scene can be used as data as a viewer regarding the user C).

Data regarding any ranking (e.g., ranking of completion with other viewers for the total token-giving action amount to the distributor) of the user as a viewer.

In order for the terminal device 10 of the distributor to extract a specific game object to be controlled from among the plurality of game objects, in one embodiment, an data table 1000 (see FIG. 8) received from the web server device 20B and/or the (distribution server device 20*a* of the) server system 20A can be used. This data table can include calculation data indicating, in association with each game, how to calculate (mainly, but not limited to, increase or decrease) which control parameter of each specific game object, based on which viewer data. The terminal device 10 of the distributor can identify at least one specific game object by searching the data table by using the currently executed game as a search key, and can identify how to calculate the control parameter related to the specific game object. Additionally, the terminal device 10 of the distributor may identify at least one specific game object related to the currently executed game, identify in advance viewer data that becomes an assumption for calculating the specific game object, and make an inquiry to the distribution server device 20*a* for that effect so as to receive only the viewer data from the distribution server device 20*a*.

With reference to FIG. 8, for example, in a fighting game A (see FIG. 7, for example), an avatar of the distributor (in FIG. 7, the avatar 501 of the distributor) and a friend character are extracted as specific game objects. In the data table, "attack power" and "defense power" are set as control parameters related to the avatar of the distributor, and "number of appearances" is set as control parameters related to the friend character. Regarding viewer data on each viewer (user data on each viewer) acquired by the terminal device 10 of the distributor, if "two avatars with dynamic characteristics" are acquired (e.g., in the first scene, for example, the avatars of two of the users B to E have a dynamic character), the "attack power" is calculated so that the "attack power" of the avatar of the distributor becomes "double". Regarding viewer data on each viewer (user data on each viewer) acquired by the terminal device 10 of the distributor, if "four avatars having a weapon 'Japanese sword' are acquired (e.g., in the first scene, for example, a case in which all the avatars of the users B to E are equipped with or given a Japanese sword), the "Japanese sword" is added as a weapon of the avatar of the distributor (see reference numeral 505 in FIG. 7), and the "attack power" of the avatar of the distributor is calculated so that the "attack power" becomes "four times".

Referring to FIG. 8, regarding viewer data on each viewer (user data on each viewer) acquired by the terminal device 10 of the distributor, if "two avatars in rare costumes" are acquired (e.g., in the first scene, for example, a case in which the costumes of the two avatars of the users B to E are so unique that other users do not have), "defense power" is calculated so that the "defense power" of the avatar of the distributors becomes "double". Regarding viewer data on each viewer (user data on each viewer) acquired by the terminal device 10 of the distributor, when "four avatars wearing gold necklaces" are acquired (e.g., in the first scene, for example, a case in which all the avatars of the users B to E wear or are attached with gold necklaces), "defense power" is calculated so that the "defense power" of the avatars of the distributor becomes "four times".

Furthermore, with reference to FIG. 8, regarding viewer data on each viewer (user data on each viewer) acquired by the terminal device 10 of the distributor, if viewer data that is "two viewers have reached a level T (T is a discretionarily set integer used generally in games) of the fighting game A" is acquired (e.g., in the first scene, for example, a case in which any two of the users B to E have reached the level T of the fighting game A), one "friend character" is added (given). Furthermore, regarding viewer data on each viewer (user data on each viewer) acquired by the terminal device 10 of the distributor, if viewer data that is "one viewer is the winner of a fighting game tournament P" is acquired (e.g., in the first scene, for example, a case in which any one of the users B to E is the winner of the tournament P), one "friend character" is added (given). In FIG. 7, friend characters 503 and 504 are displayed as a result of satisfying both of the two conditions regarding the "friend character" (the user B and the user C have already reached the level T in the fighting game A, and the user E is the winner of the tournament P). The friend character means a character that plays (fights) against the foe character 502 in favor of the avatar of the distributor.

Furthermore, referring to FIG. 8, in a case where the distributor distributes the second video 500 (fourth video 500) regarding a role-playing game B, it is set in the data table 1000 that a new "spell" and a "killer move" can be acquired by acquiring viewer data such as "three avatars of wizards" and viewer data such as "ten avatars wearing the same headbands (e.g., ten viewers have avatars wearing the same headbands)", regarding viewer data on each viewer (user data on each viewer) acquired by the terminal device 10 of the distributor.

The above-mentioned "attack power" becoming "double" or "four times" means that in FIG. 7, when the avatar 501 of the distributor attacks the foe character 502, an energy gauge 520 of the foe character is reduced by double or four times compared to the normal state. The "defense" becoming "double" or "four times" as shown in FIG. 8 means that in FIG. 7, when the avatar 501 of the distributor is attacked by the foe character 502, an energy gauge 510 of the avatar 501 of the distributor is reduced by only ½ or ¼ times the normal state.

As shown in FIG. 8, the specific game object described above is not limited to the avatar of the distributor or the like, and can be various things depending on the type of game, for example, such as equipment, points, rewards, coins, and cards. For example, the avatar data ("dynamic character," "rare costume," "wizard," "wearing the same headbands", and the like) shown in FIG. 8 may be only regarding the first video 410 (third video 410), may be only regarding the second video 500 (fourth video 500), or may be the sum (total) of the both of that regarding the first video 410 (third video 410) and that regarding the second video 500 (fourth video 500). In the calculation method based on viewer data as shown in FIG. 8, for example, a plurality of thresholds (in this case, 10 and 20 correspond to the thresholds) may be provided for viewer data so that a new killer move A is given upon acquiring the viewer data that is "ten avatars wear the same headbands (e.g., ten viewers have avatars wearing the same headbands)", and a new killer move B is given upon acquiring the viewer data that is "20 avatars wear the same headbands (e.g., 20 viewers have avatars wearing the same headbands)".

It is possible to regard that calculating the control parameters related to the particular game object based on at least one piece of viewer data means, in other words, occurrence of at least one of the following events that would be more advantageous for the distributor.

Reduce the difficulty level of the game.
Allow the distributor to acquire more game objects (characters, points, rewards, and the like).
Allow the distributor to acquire more valuable game objects (rarer items, higher points and rewards, and the like).

As shown in FIG. 7, in distributing the second video 500 (fourth video 500), comment data (ST710 to ST716 described above) exchanged between the terminal device 10 of the distributor and the terminal device 10 of each viewer is displayed in a comment region 530 on the display unit 170 of the terminal device 10 of the distributor and the terminal device 10 of each viewer. FIG. 7 illustrates the first scene in which the user A is a distributor and the users B to E are viewers. As shown in the comment region 530 of FIG. 7, in the first scene, the user A is given a token from the user D, but it is needless to say that this token data (type of token and the like) is managed by the server system 20A (distribution server device 20a) and stored in the second DB server device 20c as user data on the user A. Therefore, after the first scene shown in FIG. 7, for example, in the second scene, in a case where the user B distributes the fourth video 500 and in a case where the user A views the fourth video 500 distributed by the user B, the token data are transmitted to the terminal device 10B of the user B as user data on the user A as a viewer.

6. Variations

In the various embodiments described above, the case in which the terminal device 10 of the distributor distributes the second video 500 (fourth video) regarding the fighting game has been described. However, the terminal device 10 of the distributor can distribute the second video 500 (fourth video 500) regarding a discretionary game. The discretionary game can include, for example, action games, simulation games, role-playing games, card games, puzzle games, shooter games, quiz games, social simulation games, board games, loot box games, and/or sports games, without being limited thereto.

In one embodiment as described above with reference to FIGS. 7 and 8, the specific game object is an avatar of the distributor and friend character as an example, but the present invention is not limited to this, and may be, for example, the foe character 502. In this case, if the control parameter of the foe character 502 is "attack power", the attack power may be calculated to be ½ or ¼.

The calculation of control parameter shown in FIG. 8 is merely an example, and may be set in more detail.

In the various embodiments described above, the case in which in order to generate a video (second video 500 or fourth video 500) regarding the game, the terminal device 10 of the distributor receives, from the web server device 20B, an HTML (HTML5, in particular) document in which a game program is incorporated has been described. However, instead of the configuration of receiving, from the web server device 20B, an HTML document in which a game program is incorporated, the terminal device 10 of the distributor can also generate the second video 500 (fourth video 500) including a screen regarding the game by executing the installed video distribution application and receiving appropriate data from a data server device not illustrated (or a certain server device not illustrated included in the server system 20A).

In the various embodiments described above, the terminal device 10 of the distributor may be a smartphone or the like used by a general user or may be a dedicated terminal device placed in a studio or the like. In this case, at least one server device of the distribution server device 20a, the first DB server device 20b, the second DB server device 20c, and the token/comment API server device 20d (furthermore, the web server device 20B) included in the server system 20A may be provided together with the dedicated terminal device in the studio or the like.

In the various embodiments described above, the case in which, on the basis of motion data regarding the motion of the distributor and voice data regarding the voice of the distributor, the terminal device 10 of the distributor generates the first video 410 (third video 410) including the animation including the avatar of this distributor, and transmits the first video 410 (third video 410) to the server device 20 (server system 20A) has been described. However, the terminal device 10 of the distributor may transmit the motion data regarding the motion of the distributor and the voice data regarding the voice of the distributor to the server device 20, and the server device 20 may generate the first video 410 (third video 410) on the basis of the motion data and the voice data and distribute the first video 410 (third video 410) to the terminal device 10 of each viewer. This can reduce the amount of data transmitted from the terminal device 10 of the distributor to the server system 20A.

Alternatively, the terminal device 10 of the distributor may transmit the motion data regarding the motion of the distributor and the voice data regarding the voice of the distributor to a separately provided server device, this separate server device may generate the first video 410 (third video 410) on the basis of the motion data and the voice data and return it to the terminal device 10 of the distributor, and the terminal device 10 of the distributor may transmit the received first video 410 (third video 410) to the server device 20 (server system 20A). This can reduce the amount of data transmitted from the terminal device 10 of the distributor to the separately provided server device.

Furthermore, the terminal device 10 of the distributor may transmit the motion data regarding the motion of the distributor and the voice data regarding the voice of the distributor to the terminal device 10 of each viewer via the server device 20 (server system 20A) or the separately provided server device, and the terminal device 10 of each viewer may generate (render) and display the first video 410 (third video 410) on the basis of the received motion data and voice data (this technique is sometimes referred to as "client rendering"). This can reduce the amount of data transmitted from the server device 20 (server system 20A) or the separately provided server device to the terminal device 10 of each viewer.

In any of the above cases, the generation of the first video 410 (third video 410) on the basis of the motion data and the voice data transmitted by the terminal device 10 of the distributor may be shared by at least two devices from among the server device 20, the separate server device, and the terminal device 10 of each viewer. In either case, the device responsible for generation of the video can receive and store data (image and the like) regarding the avatar to be operated from, for example, the server device 20 or the like.

In the various embodiments described above, the motion of each of the terminal devices 10 described above can be executed similarly by the studio unit 30 having a similar configuration to that of the terminal device 10. In this case, the studio unit 30A illustrated in FIG. 1 can have a similar function to that of the terminal device 10 for distributing a video. Similarly, the studio unit 30B illustrated in FIG. 1 can have a similar function to that of the terminal device 10 for viewing a video. The motion of each of the server devices 20 mentioned above can be executed also by the studio unit 30 having the similar configuration to that of the server device 20.

In general, if a game program is installed in the terminal device 10, or if a game program is incorporated in a video distribution application installed in the terminal device 10, execution of a new game requires the terminal device 10 to have a new game program or video distribution application installed. In this case, from the point of view of the creator of the game program, it is necessary to prepare a game program corresponding to each of a plurality of operating systems, and thus there is a problem of an increase in the man-hour used for the creation of the game program. On the other hand, from the point of view of the user, it is necessary to download a new game program and/or to update an existing game program in order to obtain a new game, and thus there is a problem of requiring communication load, communication cost, time, and labor.

On the other hand, according to the technology disclosed in the present application, in order to execute the game, the terminal device 10 of the distributor can call the browser function incorporated in the video distribution application, instead of executing the game program installed in this terminal device 10, can receive a web page (HTML document, particularly HTML5 document) from the web server device 20B by using this browser function, and can execute the game program incorporated in the web page. This allows the terminal device 10 of the distributor to easily execute the new game. Therefore, when providing a new game, the creator of the game program only has to incorporate the new game program into the web page (HTML document, particularly HTML5 document) transmitted by the web server device 20B, and it is hence possible to reduce the number of man-hours used for creation of the new game program. Furthermore, since the user does not need to download a new game program or the like in order to be provided with the new game, it is possible to suppress communication load, communication cost, time, and labor.

In the above-described various embodiments, during executing the video distribution application, communicating with the server system 20A, and distributing the first video 410 (third video 410), the terminal device 10 of the distributor executes the browser function incorporated in this video distribution application, whereby the terminal device 10 of the distributor can execute the program included in the web page received from the web server device 20B, and can distribute the second video 500 (fourth video 500) to the terminal device 10 of each viewer via the server system 20A. However, such configuration is merely an example.

For example, the terminal device 10 of the distributor can also distribute the second video 500 (fourth video 500) without distributing the first video 410 (third video 410). Specifically, in the first example, by executing the video distribution application and executing the browser function incorporated in the video distribution application, the terminal device 10 of the distributor can execute the program included in the web page received from the web server device 20B (without distributing the first video 410 or the third video 410 by using the video distribution application) and distribute the second video 500 (fourth video 500) to the terminal device 10 of each viewer via the server system 20A. In this configuration, the distributor does not distribute the first video 410 (third video 410) based on the motion of the distributor himself (stop the distribution of the first video 410 or the third video 410) but can distribute only the second video 500 (fourth video 500) showing the situation of the game that the distributor himself executes.

In the second example, by executing the installed game application and accessing the server system 20A, which also functions as a game server device, the terminal device 10 of the distributor can distribute the screen of the game being executed to the terminal device 10 of each viewer via this server system 20A. Also in these first and second examples, as in the various embodiments described above, the terminal device 10 of the distributor can generate the second video 500 (fourth video 500) by using the viewer data received from the server system 20A.

In a third example, in the first example or the second example, the terminal device 10 of the distributor can transmit operation data of the distributor to the server system 20A or the web server device 20B without generating the game screen (second video 500 or fourth video 500). In this case, the server system 20A or the web server device 20B generates the game screen (second video 500 or fourth video 500) by using the operation data, and the server system 20A can distribute the generated second video 500 (fourth video 500) to the terminal device 10 of each viewer.

In this third example, when generating the second video 500 (fourth video 500), the web server device 20B can use viewer data received from the server system 20A (distribution server device 20a). When the server system 20A generates the second video 500 (fourth video 500), the server system 20A can use user data (viewer data) managed and stored by the server system 20A itself.

As will be readily understood to a person of ordinary skill in the art having the benefit of the present disclosure, the various examples described above can be used in various suitable combinations with each other as long as they do not cause inconsistencies.

As described above, according to one embodiment and various aspects including variations, it is possible to generate the second video (fourth video) in which a control parameter related to a specific game object is calculated based on viewer data regarding at least one viewer. Thus, the distributor is induced to use the service of the video distribution system 1 as a distributor for the purpose of playing the own game more advantageously. The distributor is induced not only to use the video distribution system 1 as a distributor but also to use the video distribution system 1 as a viewer.

Thus, the technology disclosed in the present application can provide a computer program, a method, and a server device that can induce users to use a service regarding video distribution as a distributor or as a viewer.

Also, in ordinary systems, when viewers wish to affect the game played by a distributor, they need to use their terminal devices to send tokens, messages, or comments, etc. to the distributor, which occupies communication network resources. According to the technology disclosed in the present application, all the viewers have to do in order to affect the game played by the distributor (e.g. to help the distributor play the game advantageously) is to view the videos (game screens), etc. distributed by the distributor. This may allow a server device (which communicates with the terminal devices of the distributor and the viewers) as well as these terminal devices to effectively save or decrease communication network loads.

Further, according to the technology disclosed in the present application, the device of the distributor is able to calculate a control parameter related to a selected game object used in game on the basis of viewer data so that the distributor is able to play the game advantageously. Therefore, as the distributor is able to complete the game more quickly, the terminal device of the distributor is able to: save the power consumption of the device; extend the battery life of the device; decrease CPU/memory loads; and/or decrease communication network loads. This is also true with the server device and the terminal devices of the viewers.

7. Various Aspects

The computer program according to the first aspect "causes, by being executed by at least one processor, the processor to function so as to distribute, to terminal devices of a plurality of viewers via a communication line, a first video including an animation of an avatar of a first distributor generated based on first motion data regarding a motion of the first distributor or the first motion data, and a second video regarding a game generated based on first operation data regarding an operation of the first distributor using a received web page, acquire, via a communication line, viewer data regarding at least one viewer from among the plurality of viewers, extract a specific game object to be controlled from among a plurality of game objects used in the game, and calculate a control parameter related to the specific game object based on the viewer data".

The computer program according to the second aspect, in which in the first aspect, "the viewer data includes data on a second distributor in a case where at least one viewer, as the second distributor different from the first distributor, can distribute, toward the terminal devices of the plurality of viewers via the communication line, at least any one of a third video including an animation of an avatar of the second distributor generated based on second motion data regarding a motion of the second distributor or the second motion data, and a fourth video regarding the game generated based on second operation data regarding an operation of the second distributor using the web page".

The computer program according to the third aspect, in which in the second aspect, "the data on the second distributor includes avatar data regarding an avatar of the second distributor and/or game data regarding the game of the second distributor".

The computer program according to the fourth aspect, in which in the third aspect, "the avatar data includes data regarding an attribute of an avatar of the second distributor and/or an item attached or given to the avatar".

The computer program according to the fifth aspect, in which in the third aspect, "the game data includes progress data on the game by the second distributor".

The computer program according to the sixth aspect, in any of the first to fifth aspects, "causes the at least one processor to function so as to receive the viewer data via the communication line from a server device that stores the viewer data".

The computer program according to the seventh aspect, in which in any of the first to sixth aspects, "the specific game object is the game object acquired by the first distributor or operated by the first distributor in the game".

The computer program according to the eighth aspect, in which in the seventh aspect, "the particular game object includes an item, equipment, a point, a reward, a coin, a card, a character, and/or an avatar".

The computer program according to the ninth aspect, in which in any of the first to eighth aspects, "the processor includes a central processing unit (CPU), a microprocessor, and/or a graphics processing unit (GPU)".

The computer program according to the tenth aspect, in which in any of the first to ninth aspects, "the communication line includes the Internet".

The computer program according to the eleventh aspect "causes, by being executed by at least one processor, the processor to function so as to receive, from a terminal device of a first distributor via a communication line, a first video including an animation of an avatar of the first distributor generated based on first motion data regarding a motion of the first distributor or the first motion data, and a second video regarding a game generated based on first operation data regarding an operation of the first distributor using a received web page, and cause the second video to include a specific game object extracted as an object to be controlled from among a plurality of game objects used in the game and the specific game object in which a related control parameter is calculated based on viewer data regarding at least one viewer of a plurality of viewers who receive the first video or the motion data and the second video from a terminal device of the first distributor".

The computer program according to the twelfth aspect, in which in the eleventh aspect, "the processor includes a central processing unit (CPU), a microprocessor, and/or a graphics processing unit (GPU)".

The computer program according to the thirteenth aspect, in which in the eleventh or the twelfth aspect, "the communication line includes the Internet".

The method according to the fourteenth aspect is "a method executed by at least one processor that executes a computer-readable instruction, the method including a step of, by executing the instruction with the processor, distributing, to terminal devices of a plurality of viewers via a communication line, a first video including an animation of an avatar of a first distributor generated based on first motion data regarding a motion of the first distributor or the first motion data, and a second video regarding a game generated based on first operation data regarding an operation of the first distributor using a received web page, a step of acquiring, via a communication line, viewer data regarding at least one viewer from among the plurality of viewers, a step of extracting a specific game object to be controlled from among a plurality of game objects used in the game, and a step of calculating a control parameter related to the specific game object based on the viewer data".

The method according to the fifteenth aspect, in which in the fourteenth aspect, "the processor includes a central processing unit (CPU), a microprocessor, and/or a graphics processing unit (GPU)".

The method according to the sixteenth aspect, in which in the fourteenth or fifteenth aspect, "the communication line includes the Internet".

The method according to the seventeenth aspect is "a method executed by at least one processor that executes a computer-readable instruction, the method including a step of, by executing the instruction with the processor, receiving, from a terminal device of a first distributor via a communication line, a first video including an animation of an avatar of the first distributor generated based on first motion data regarding a motion of the first distributor or the first motion data, and a second video regarding a game generated based on first operation data regarding an operation of the first distributor using a received web page, in which the second video includes a specific game object extracted as an object to be controlled from among a plurality of game objects used in the game and the specific game object in which a related control parameter is calculated based on viewer data regarding at least one viewer of a plurality of viewers who receive the first video or the motion data and the second video from a terminal device of the first distributor".

The method according to the eighteenth aspect, in which in the seventeenth aspect, "the processor includes a central processing unit (CPU), a microprocessor, and/or a graphics processing unit (GPU)".

The method according to the nineteenth aspect, in which in the seventeenth or eighteenth aspect, "the communication line includes the Internet".

The server device according to the twentieth aspect is "a server device including at least one processor and causing the at least one processor to function so as to receive, from a terminal device of a first distributor, a first video including an animation of an avatar of the first distributor generated based on first motion data regarding a motion of the first distributor or the first motion data, and a second video regarding a game generated based on first operation data regarding an operation of the first distributor using a received web page, distribute, to terminal devices of a plurality of viewers via a communication line, the received first video or the first motion data and the second video, store viewer data regarding at least one viewer of the plurality of viewers, and transmit the viewer data to a terminal device of the first distributor, in which the second video includes a specific game object extracted as an object to be controlled from among a plurality of game objects used in the game and the specific game object in which a related control parameter is calculated based on the viewer data".

The server device according to the twenty-first aspect, in which in the twentieth aspect, "the processor includes a central processing unit (CPU), a microprocessor, and/or a graphics processing unit (GPU)".

The server device according to the twenty-second aspect, in which in the twentieth or twenty-first aspect, "the communication line includes the Internet".

The server device according to the twenty-third aspect is "a server device including at least one processor, and the processor transmits a web page including a computer program via a communication line to a terminal device of a first distributor configured so as to distribute, to terminal devices of a plurality of viewers via the communication line, a first video including an animation of an avatar of the first distributor generated based on first motion data regarding a motion of the first distributor or the first motion data, and a second video regarding a game generated based on first operation data regarding an operation of the first distributor using a received web page, in which the computer program causes a terminal device of the first distributor to function so as to acquire, via the communication line, viewer data regarding at least one viewer of the plurality of viewers, extract a specific game object to be controlled from among a plurality of game objects used in the game, and calculate a control parameter related to the specific game object based on the viewer data".

The server device according to the twenty-fourth aspect, in which in the twenty-third aspect, "the processor includes a central processing unit (CPU), a microprocessor, and/or a graphics processing unit (GPU)".

The server device according to the twenty-fifth aspect, in which in the twenty-third or twenty-fourth aspect, "the communication line includes the Internet".

The method according to the twenty-sixth aspect is "a method executed by at least one processor that executes a computer-readable instruction, the method including a step of, by executing the instruction with the processor, receiving, from a terminal device of a first distributor, a first video including an animation of an avatar of the first distributor generated based on first motion data regarding a motion of the first distributor or the first motion data, and a second video regarding a game generated based on first operation data regarding an operation of the first distributor using a received web page, a step of distributing, to terminal devices of a plurality of viewers via a communication line, the received first video or the first motion data and the second video, a step of storing viewer data regarding at least one viewer of the plurality of viewers, and a step of transmitting the viewer data to a terminal device of the first distributor, in which the second video includes a specific game object extracted as an object to be controlled from among a plurality of game objects used in the game and the specific game object in which a related control parameter is calculated based on the viewer data".

The method according to the twenty-seventh aspect, in which in the twenty-sixth aspect, "the processor includes a central processing unit (CPU), a microprocessor, and/or a graphics processing unit (GPU)".

The method according to the twenty-eighth aspect, in which in the twenty-sixth or twenty-seventh aspect, "the communication line includes the Internet".

The method according to the twenty-ninth aspect is "a method executed by at least one processor that executes a computer-readable instruction, the method including a step of, by executing the instruction with the processor, transmitting a web page including a computer program via a communication line to a terminal device of a first distributor configured so as to distribute, to terminal devices of a plurality of viewers via the communication line, a first video including an animation of an avatar of the first distributor generated based on first motion data regarding a motion of the first distributor or the first motion data, and a second video regarding a game generated based on first operation data regarding an operation of the first distributor using a received web page, in which the computer program causes a terminal device of the first distributor to function so as to acquire, via the communication line, viewer data regarding at least one viewer of the plurality of viewers, extract a specific game object to be controlled from among a plurality of game objects used in the game, and calculate a control parameter related to the specific game object based on the viewer data".

The method according to the thirtieth aspect, in which in the twenty-ninth aspect, "the processor includes a central processing unit (CPU), a microprocessor, and/or a graphics processing unit (GPU)".

The method according to the thirty-first aspect, in which in the twenty-ninth or thirtieth aspect, "the communication line includes the Internet".

II. Second Embodiment

1. Configuration of Video Distribution System

In a video distribution system disclosed in the present application, simply put, a user who performs distribution (hereinafter referred to as "distributor") can distribute, by using his terminal device, the first video and the second video to a terminal device of a user who views the video (hereinafter referred to as "viewer") via a communication line. The first video is a video including an animation of an avatar generated on the basis of motion data regarding the motion of the distributor. The second video is a video regarding a game generated on the basis of operation data regarding the operation of the distributor.

Figure 9:
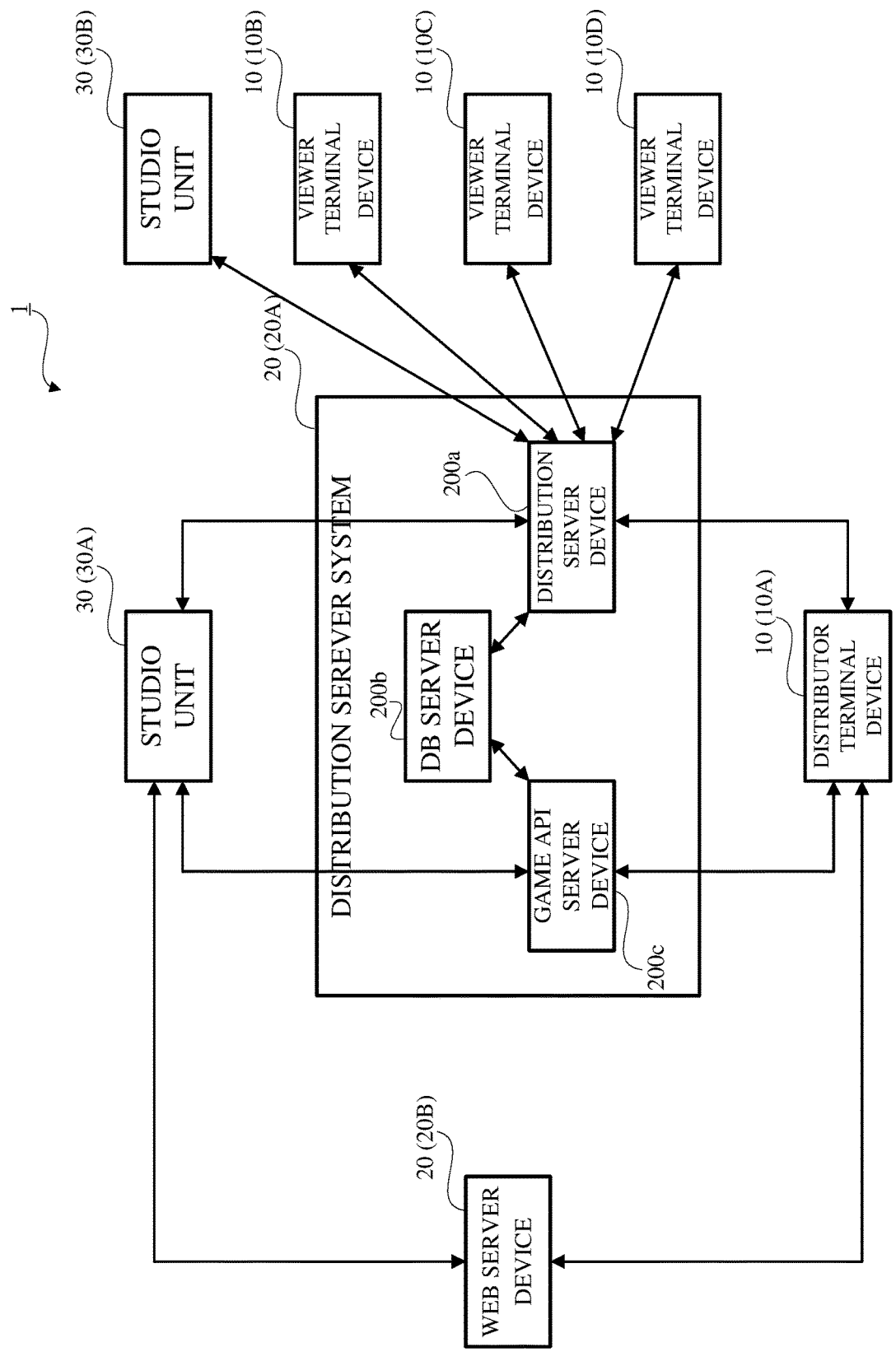
FIG. 9 is a block diagram showing an example of the configuration of the video distribution system according to an embodiment.

FIG. 9 is a block diagram showing an example of the configuration of the video distribution system according to an embodiment. As shown in FIG. 9, the video distribution system 1 can include a plurality of terminal devices 10 connected to a communication line (communication network) not illustrated, and one or more server devices 20 connected to the communication line. Each terminal device 10 can be connected to one or more server devices 20 via the communication line.

Additionally, as the plurality of terminal devices 10, FIG. 9 shows, for example, terminal devices 10A to 10D, but one or more terminal devices 10 other than them can be used similarly. Similarly, FIG. 9 shows as one or more server devices 20, for example, server devices 20A and 20B, but one or more server devices 20 other than them can be used similarly. The communication line (not shown) can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

In an embodiment, the video distribution system 1 can include one or more studio units 30 connected to the communication line. Each studio unit 30 can be connected to one or more server devices 20 or the plurality of terminal devices 10 via the communication line. Additionally, as one or more studio units 30, FIG. 9 shows, for example, studio units 30A and 30B, but one or more studio units 30 other than them can be used similarly. Each studio unit 30 can have a similar function to that of the terminal device 10 described later or the server device 20.

In order to simplify the description, attention will be paid to a case in which one or the plurality of server devices 20 transmit/receive videos, token data, and the like to/from each terminal device 10. In place of this or in addition to this, as will be described later, one or the plurality of server devices 20 can also transmit/receive videos, token data, and the like to/from each studio unit 30. In place of this or in addition to this, as will be described later, the studio unit 30 can also transmit/receive videos, token data, and the like to/from each terminal device 10.

1-1. Terminal Device 10

The plurality of terminal devices 10 can include one or more distributor terminal devices 10 (here, terminal device 10A) and one or more viewer terminal devices 10 (here, terminal device 10B to the terminal device 10D). Each terminal device 10 has a common configuration and can thus be either a terminal device (terminal device 10 of the distributor) for distributing a video or a terminal device (terminal device 10 of the viewer) for viewing a video.

In a case of operating as a terminal device (distributor terminal device) for distributing a video, each terminal device 10 can execute an installed video distribution application (may also be middleware or a combination of an application and middleware. The same shall apply hereinafter). Thus, each terminal device 10 can acquire motion data regarding the motion of the distributor, and can transmit, to the server device 20 (distribution server system 20A) via the communication line, the first video including an animation of a virtual character (avatar) changed according to the acquired data. Such the first video is distributed by the server device 20 (distribution server system 20A) to the terminal device (viewer terminal device) 10 for receiving the video via the communication line. Such the terminal device 10 of the viewer can receive a video by executing an installed video viewing application (may also be middleware or a combination of an application and middleware. The same shall apply hereinafter).

When operating as a terminal device of the distributor, each terminal device 10 can execute a browser function incorporated in the installed video distribution application and/or execute an installed web browser application. This allows each terminal device 10 to receive a web page (for example, an HTML document including in some examples, HTML documents encoding code such as JavaScript or PHT code) from the server device 20 (web server device 20B) and execute a game program included in this web page. By executing the game program, each terminal device 10 can generate a second video in which at least one game object is caused to act on the basis of operation data related to an operation of the distributor.

When operating as a terminal device of the distributor, each terminal device 10 can transmit, by executing the video distribution application, the second video thus generated to the server device 20 (distribution server system 20A) via the communication line. Such the second video is also distributed by the server device 20 (distribution server system 20A) via a communication line to a terminal device (terminal device of the viewer) 10 for receiving a video which executes an installed video viewing application.

Furthermore, when operating as a distributor terminal device, by executing the above-described video distribution application, each terminal device 10 can receive, via the server device 20 (distribution server system 20A), from the terminal device 10 of the viewer viewing the second video (distributed by the terminal device 10 of this distributor), token data indicative of giving a token to this distributor, and/or comment data indicative of transmitting a comment to this distributor.

On the other hand, when operating as a terminal device (viewer terminal device) for viewing a video, by executing the installed video viewing application, each terminal device 10 can receive, via the server device 20 (distribution server system 20A), the first video and/or the second video distributed by the terminal device 10 of the distributor.

In a case of operating as a distributor terminal device, by executing the video viewing application, each terminal device 10 can transmit, via the server device 20 (distribution server system 20A) to the terminal device 10A of this viewer, token data indicative of giving a token to the distributor, and/or comment data indicative of transmitting a comment to this distributor.

Additionally, the above-described video distribution application and video viewing application can be installed and executed in each terminal device 10 as one integrated application or as separate applications.

Each terminal device 10 is any terminal device capable of executing such operation, and can include a smartphone, a tablet, a mobile phone (feature phone), and/or a personal computer, without being limited thereto.

1-2. Server Device 20

FIG. 9 shows the server system 20A and the web server device 20B as one or the plurality of server devices 20 as an example.

The distribution server system 20A can distribute the first video and/or the second video transmitted by each terminal device (terminal device of each distributor) 10 to each terminal device (terminal device of each viewer) 10. Furthermore, the distribution server system 20A can transmit, to the terminal device 10 of a certain distributor, token data indicative of giving a token to the distributor and/or comment data indicative of transmitting a comment to the distributor that have been transmitted by each terminal device (terminal device of each viewer) 10.

In order to execute such operation, the distribution server system 20A, in an embodiment, can include a distribution server device 200a, a database (DB) server device 200b, and a game API server device 200c that are interconnected via a communication line (including a wireless line and/or a wired line that are not shown).

The distribution server device 200a can distribute, to each terminal device 10, the first video and/or the second video transmitted by the terminal device 10 of each distributor. Furthermore, the distribution server device 200a can store, into the DB server device 200b, the token data and/or the comment data transmitted by the terminal device 10 of each viewer.

The DB server device 200b can store the token data and/or the comment data received from the distribution server device 200a, read the token data and/or the comment data inquired by the game API server device 200c, and transmit them to the game API server device 200c.

When receiving an inquiry about token data and/or comment data from the terminal device 10 of each distributor, the game API server device 200c can read, from the DB server device 200b, the token data and/or the comment data for the terminal device 10 of the distributor, and transmit them to the terminal device 10 of the distributor.

The example shown in FIG. 9 shows a configuration in which the distribution server system 20A has three server devices including the distribution server device 200a, the DB server device 200b, and the game API server device 200c for the purpose of balancing the load. However, at least one server device of these three server devices may be integrated with at least one of the remaining server devices.

Next, the web server device 20B can transmit, to the terminal device 10 of each distributor having accessed, a web page (document created according to HTML, for example, HTML5) in which a game program is incorporated. This game program can cause the terminal device 10 having received and decoded the game program to execute various operations related to the distribution of the video, including the operations exemplified below.

Operation of executing the game

Operation of transmitting, to the distribution server system 20A (distribution server device 200a), a game screen generated in accordance with execution of the game Operation of acquiring, from the distribution server system 20A (game API server device 200c), the token data and/or comment data transmitted to this distributor 1-3. Studio Unit 30

The studio unit 30 can be placed in a studio, a room, a hall, or the like that is a place where the distributor (performer) distributes a video. As described above, the studio unit 30 can perform the same function as that of the terminal device 10 and/or the server device 20.

2. Hardware Configuration of Each Device

Next, an example of the hardware configuration of each of the terminal device 10, the server device 20, and the studio unit 30 will be described.

2-1. Hardware Configuration of Terminal Device 10

An example of the hardware configuration of each terminal device 10 will be described with reference again to FIG. 2, which was referred to with respect to the first embodiment above. FIG. 2 is a block diagram schematically showing an example of the hardware configuration of the terminal device 10 (server device 20) shown in FIG. 9 (in FIG. 2, reference numerals in parentheses are provided in relation to the server device 20, as will be described later).

As shown in FIG. 2, each terminal device 10 can mainly include a central processing unit 11, a main storage device 12, an input/output interface device 13, an input device 14, an auxiliary storage device 15, and an output device 16. These devices are interconnected via a data bus and/or a control bus.

The central processing unit 11, which is referred to as a "CPU", can perform operations on instructions and data stored in the main storage device 12, and store the results of the operations in the main storage device 12. Furthermore, the central processing unit 11 can control the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 2 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a capacity larger than that of the main storage device 12. It is possible to store instructions and data (computer programs) constituting the above-described specific applications (video distribution application, video viewing application, and the like), web browser applications, and the like. By being controlled by the central processing unit 11, the auxiliary storage device 15 can transmit these instructions and data (computer program) to the main storage device 12 via the input/output interface device 13. The auxiliary storage device 15 can include a magnetic disk device and/or an optical disk device, without being limited thereto.

The input device 14 is a device that fetches data from the outside, and can include a touch screen, a button, a keyboard, a mouse, and/or a sensor, without being limited thereto. The sensor can include a sensor including one or more cameras or the like and/or one or more microphones or the like, without being limited thereto, as described below.

The output device 16 can include a display device, a touch screen, and/or a printer device, without being limited thereto.

With such hardware configuration, the central processing unit 11 can sequentially loads, into the main storage device 12, an instruction and data (computer program) constituting a specific application stored in the auxiliary storage device 15, and calculate the loaded instruction and data. Thus, the central processing unit 11 can control the output device 16 via the input/output interface device 13 or transmit/receive various data to/from another device (e.g., server device 20, other terminal device 10, studio unit 30, and/or like) via the input/output interface device 13 and a communication network 2.

Thus, by executing the installed specific application, the terminal device 10 can execute at least one operation of the following operations exemplified below, for example (including various operations described in detail later).

Operation used for distributing the first video and/or the second video

Operation used for receiving the token data and/or the comment data transmitted from another terminal device 10 to the own terminal device 10

Operation used for receiving the first video and/or the second video distributed by another terminal device 10

Operation used for transmitting token data and/or comment data to another terminal device 10

The terminal device 10 can include one or more microprocessors and/or graphics processing units (GPU) in place of the central processing unit 11 or together with the central processing unit 11.

2-2. Hardware Configuration of Server Device 20

An example of the hardware configuration of each server device 20 will be described with reference to FIG. 2 similarly. The hardware configuration of each server device 20 (each of distribution server device 200a, DB server device 200b, game API server device 200c, and web server device 20B) can be, for example, one identical to the hardware configuration of each terminal device 10 described above. Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 may be substantially identical to the central processing unit 11, the main storage device 12, the input/output interface device 13, the input device 14, the auxiliary storage device 15, and the output device 16, respectively, included in each terminal device 10 described above.

With such hardware configuration, the central processing unit 21 can sequentially loads, into the main storage device 22, an instruction and data (computer program) constituting a specific application stored in the auxiliary storage device 25, and calculate the loaded instruction and data. Thus, the central processing unit 21 can control the output device 26 via the input/output interface device 23 or transmit/receive various data to/from another device (e.g., other terminal device 10, studio unit 30, and/or like) via the input/output interface device 23 and the communication network 2.

Thus, the server device 20 can execute at least one operation of the following operations exemplified below, for example (including various operations described in detail later).

Operation used for distributing, to the terminal device 10 of each viewer, the first video and/or the second video transmitted by the terminal device 10 of each distributor Operation used for transmitting, to the terminal device 10 of the distributor, token data and/or comment data transmitted by the terminal device 10 of each viewer to the terminal device 10 of a certain distributor The server device 20 can include one or more microprocessors and/or graphics processing units (GPU) in place of the central processing unit 21 or together with the central processing unit 21.

2-3. Hardware Configuration of Studio Unit 30

As described above, the studio unit 30 can perform the same function as that of the terminal device 10 and/or the server device 20. Therefore, the studio unit 30 can have a similar hardware configuration to that of the above-described terminal device 10 or the server device 20.

3. Functions of Each Device

Next, an example of the function of each of the terminal device 10, the server device 20, and the studio unit 30 will be described.

3-1. Functions of Terminal Device 10

Figure 10:
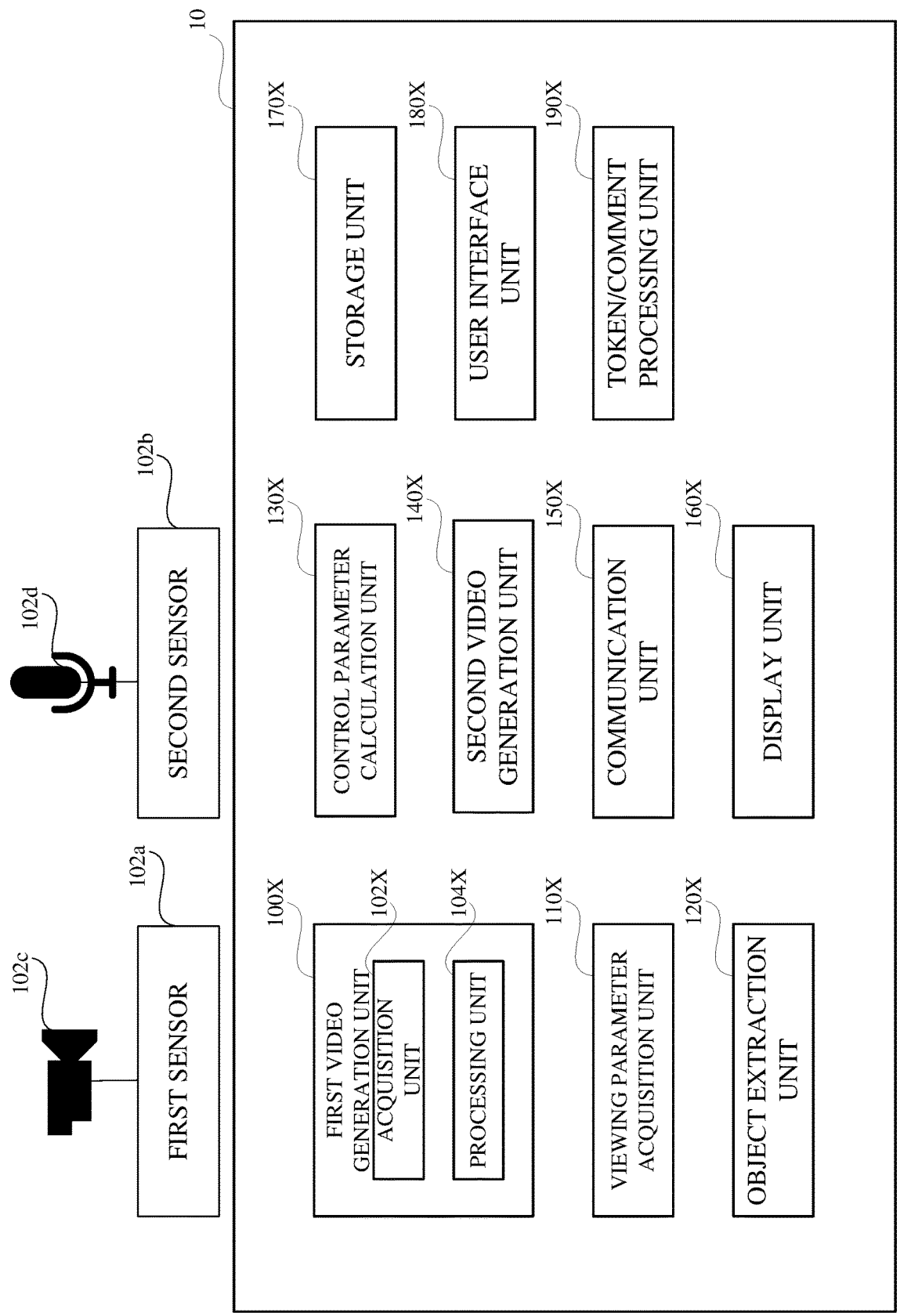
FIG. 10 is a block diagram schematically showing an example of a function of the terminal device 10 shown in FIG. 9.

An example of the function of the terminal device 10 will be described with reference to FIG. 10. FIG. 10 is a block diagram schematically showing an example of a function of the terminal device 10 shown in FIG. 9.

As shown in FIG. 10, the terminal device 10 can mainly include a first video generation unit 100X, a viewing parameter acquisition unit 110X, an object extraction unit 120X, a control parameter calculation unit 130X, a second video generation unit 140X, a communication unit 150, a display unit 160X, a storage unit 170X, a user interface unit 180X, and a token processing unit 190X.

(1) First Video Generation Unit 100X

The first video generation unit 100X can generate the first video including an animation of an avatar of a distributor on the basis of motion data regarding the motion of the distributor. In order to realize this, the first video generation unit 100X can include an acquisition unit 102X and a processing unit 104X, for example.

The acquisition unit 102X can include one or more first sensors 102a that acquire data regarding the body of the distributor, and one or more second sensors 102b that acquire voice data regarding an utterance and/or singing emitted by the distributor.

In a preferred embodiment, the first sensor 102a can include an RGB camera that captures visible light and a near infrared camera that captures near infrared rays. As such a camera, it is possible to use a camera included in a True Depth camera of iPhone X (registered trademark), for example. The second sensor 102b can include a microphone to record voice.

First, as for the first sensor 102a, the acquisition unit 102X captures the body of the distributor by using the first sensor 102a placed close to the body of the distributor. Thus, the acquisition unit 102X can generate data (e.g., MPEG file) in which an image acquired by the RGB camera is recorded over an unit time in association with a time code (code indicating the time acquired). The acquisition unit 102X can generate data (e.g., TSV file) in which a numerical value (e.g., numerical value of floating point number) indicating a predetermined number (e.g., 51) of depths acquired by the near-infrared camera is recorded over a unit time in association with the time code. The TSV file is a file in a format where a plurality of data are recorded with data separated by tabs.

As for the near-infrared camera, specifically, a dot projector radiates, to the body of the performer, an infrared laser that forms a dot pattern, and the near-infrared camera captures the infrared dots projected and reflected on the body of the performer and generates an image of the infrared dots thus captured. The acquisition unit 102X can compare an image of the dot pattern emitted by the dot projector registered in advance with an image captured by the near infrared camera. Thus, the acquisition unit 102X can calculate the depth (distance between each point or each feature point and the near-infrared camera) of each point (each feature point) by using the positional deviation at each point (each feature point) (e.g., each of 51 points and feature points) in the both images. The acquisition unit 102X can generate data in which a numerical value indicating the thus calculated depth is recorded over a unit time in association with the time code as described above. The camera (s) that the first sensor 102a has is indicated with the reference sign 102c.

Next, as for the second sensor 102b, the acquisition unit 102X acquires voice related to an utterance and/or singing emitted by the distributor using the second sensor 102b placed close to the body of the distributor. The second sensor 102b can include at least one microphone 102d. Thus, the acquisition unit 102X can generate data (e.g., MPEG file) recorded over a unit time in association with a time code. In an embodiment, the acquisition unit 102X can acquire data regarding the body of the distributor using the first sensor 102a, and at the same time, acquire voice data regarding an utterance and/or singing emitted by the distributor using the second sensor 102b. In this case, the acquisition unit 102X can generate data (e.g., MPEG file) in which an image acquired by the RGB camera and voice data related to speech and/or vocal given by the distributor using the second sensor 102b are recorded over a unit time in association with an identical time code.

The acquisition unit 102X can output, to the processing unit 104X, the data (MPEG file, TSV file, or the like) related to the body of the distributor thus generated, as motion data, and/or the voice data (MPEG file or the like) related to the utterance and/or singing emitted by the distributor.

For example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be capture with an image capture devices (such as a CCD (charge-coupled device) or CMOS (complementary metal oxide semiconductor) image sensor) coupled to a computer that transforms the motion data into video or other image data.

The case where the first sensor 102a includes an RGB camera and an infrared camera has been described here. However, the first sensor 102a can include, for example, any of the following (A) to (C).

(A) A camera that detects infrared rays emitted by an infrared laser and reflected on the face of the performer (B) A plurality of RGB cameras that capture visible light (C) A single camera that captures visible light In the case of (A) above, the acquisition unit 102X can calculate the depth for each feature point in the body of the distributor by the same method as that described above. In the case of (B) above, the acquisition unit 102X can calculate the depth of each feature point of the body of the distributor using a plurality of images captured by a plurality of RGB cameras. In the case of (C) above, the acquisition unit 102X can calculate, by using deep learning or the like, the depth of each feature point in the body of the distributor from an image captured by a single camera. In the case of (C) above, the acquisition unit 102X can calculate the depth of each feature point of the body of the performer by analysis processing (image processing and the like) for the image captured by the single camera.

The processing unit 104X can generate a video including an animation of a virtual character (avatar of the distributor) on the basis of the data regarding the body of the distributor from the acquisition unit 102X. As for the video itself of the virtual character, the processing unit 104X can generate the video of the virtual character by causing a rendering unit not illustrated to execute rendering using various data (e.g., geometry data, bone data, texture data, shader data, blend shape data, and so on) stored in a character data storage unit not illustrated.

By using various known techniques, the processing unit 104X can generate a video (e.g., a video in which the facial expression of the avatar changes in synchronization with the movement of the mouth and both eyes of the performer, e.g., a video in which the facial expression of the avatar changes in response to lip-sync and gaze tracking with respect to the face of the performer) in which the facial expression of the avatar or the like is changed by using the data (data regarding the depth of each feature point in the body of the performer) related to the body of the distributor from the acquisition unit 102X.

Any other known technique can be used for generating the first video including an animation of the avatar of the distributor on the basis of the motion data regarding the motion of the distributor. Such well-known technology includes a technique referred to as "blend shapes" described in a website specified by the following URL.

https://developer.apple.com/documentation/arkit/arfaceanchor/2928251-blendshapes When using this technique, the processing unit 104X can adjust each parameter of one or more feature points corresponding to the motion of the distributor among a plurality of feature points of the upper body (face or the like) of the distributor. This allows the processing unit 104X to generate a video of a virtual character that follows the action of the distributor.

(2) Viewing Parameter Acquisition Unit 110X

Regarding the second video "currently distributed" by the distributor (distributor A using the terminal device 10), the viewing parameter acquisition unit 110X can receive, from the distribution server device 200a of the distribution server system 20A, at least one viewing parameter regarding viewing by at least one viewer from among a plurality of viewers viewing this second video. The at least one viewing parameter described above can include the total number of plurality of viewers viewing the second video currently distributed by the distributor A, and/or the viewing time of at least one viewer viewing the second video currently distributed by the distributor A.

In addition to this, regarding the second video "previously distributed" by the distributor A, the viewing parameter acquisition unit 110X can also receive, from the distribution server device 200a of the distribution server system 20A, at least one viewing parameter regarding viewing by at least one viewer from among a plurality of viewers viewed this second video. The at least one viewing parameter described above can include the total number of plurality of viewers viewed the second video previously distributed by the distributor A, the viewing time of at least one viewer viewed the second video previously distributed by the distributor A, and/or the frequency with which at least one viewer viewed the second video previously distributed by the distributor A. The viewing parameter acquisition unit 110X can be implemented with a processor coupled to a memory storing computer-readable instructions executed by the processor.

(3) Object Extraction Unit 120X

The object extraction unit 120X can extract at least one specific game object to be controlled on the basis of the viewing parameter acquired by the viewing parameter acquisition unit 110X, from among a plurality of game objects used in a game generated on the basis of operation data related to the operation of the distributor A. The at least one game object to be controlled can include at least one game object acquired and/or operated by the distributor A in the game. The at least one game object to be "operated" by the distributor A in the game can include characters and/or avatars. The at least one game object to be "acquired" by the distributor A in the game can include items, equipment, points, rewards, coins, cards, and/or characters. The object extraction unit 120X can be implemented with a processor coupled to a memory storing computer-readable instructions executed by the processor.

(4) Control Parameter Calculation Unit 130X

On the basis of a viewing parameter acquired by the viewing parameter acquisition unit 110X, the control parameter calculation unit 130X can calculate the control parameter related to the game object extracted by the object extraction unit 120X. Here, as described above, the game object extracted by the object extraction unit 120X can include at least one game object acquired and/or operated by the distributor A in the game. The control parameter calculation unit 130X can be implemented with a processor coupled to a memory storing computer-readable instructions executed by the processor.

(5) Second Video Generation Unit 140X

The second video generation unit 140X can generate the second video regarding the game on the basis of the operation data regarding the operation of the distributor by using the web page received from the web server device 20B.

Specifically, the second video generation unit 140X executes a game program incorporated in the web page received from the web server device 20B. Thus, the second video generation unit 140X can render the second video (game video) related to the game on the basis of the operation data indicating the operation of the distributor input by the user interface unit 180X and at least one game object in which the related control parameter has been calculated by the control parameter calculation unit 130X. For example, the operation data can include one or more of the following: data indicative of how the distributor has swiped a touch pad display, data indicative of which object the distributer has tapped or clicked, or data indicative of how the distributor has dragged a touch pad display, or other such operation data.

(6) Communication Unit 150X

The communication unit 150X can communicate various data used for distribution and/or viewing of a video between the distribution server system 20A and the web server device 20B. For example, when the terminal device 10 operates as the terminal device 10 of the distributor A, the communication unit 150X can access the web server device 20B and receive a web page (HTML document) or the like containing a game program used for executing a game or the like. When the terminal device 10 operates as the terminal device 10 of the distributor A, the communication unit 150X can receive at least one viewing parameter from the distribution server device 200a of the distribution server system 20A. Furthermore, when the terminal device 10 operates as the terminal device 10 of the distributor A, the communication unit 150X can transmit the first video and/or the second video to the distribution server system 20A, and can receive, from the distribution server system 20A, the token data and/or the comment data transmitted to this distributor A.

Furthermore, when the terminal device 10 operates as the terminal device of the viewer, the communication unit 150X can receive, from the distribution server system 20A, the first video and/or the second video transmitted by the terminal device 10 of the distributor, and transmit token data and/or comment data for the distributor to the distribution server system 20A. The communication unit 150X may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

(7) Display Unit 160X

The display unit 160X can display various information (data) used for distribution and/or viewing of a video. Specifically, the display unit 160X can display the first video and/or the second video to be distributed, the first video and/or the second video having been received, and/or the like.

(8) Storage Unit 170X

The storage unit 170X can store various data used for distribution and/or viewing of a video using computer-readable memory or storage devices.

(9) User Interface Unit 180X

The user interface unit 180X can input various data used for distribution and/or viewing of the video through a user operation. For example, the user interface unit 180X can input, from the distributor, operation data indicating the contents of the operation by the distributor when executing the game, and output the data to the second video generation unit 140X. The user interface unit 180X may include a touch input device, such as a keyboard, keypad, mouse, touch screen display, pen, or trackball, a voice input device, a camera, an image sensor, a scanning device, or another device, that provides user input.

(10) Token/Comment Processing Unit 190X

The token/comment processing unit 190X can process token data and/or comment data transmitted/received regarding distribution and/or viewing of a video. For example, when the terminal device 10 operates as the terminal device 10 of the distributor A, the token/comment processing unit 190X can process the token data and/or the comment data transmitted to this distributor A. When the terminal device 10 operates as the terminal device 10 of the viewer, the token/comment processing unit 190X can process the token data and/or comment data to be transmitted by this viewer.

3-2. Functions of Server Device 20

Figure 11:
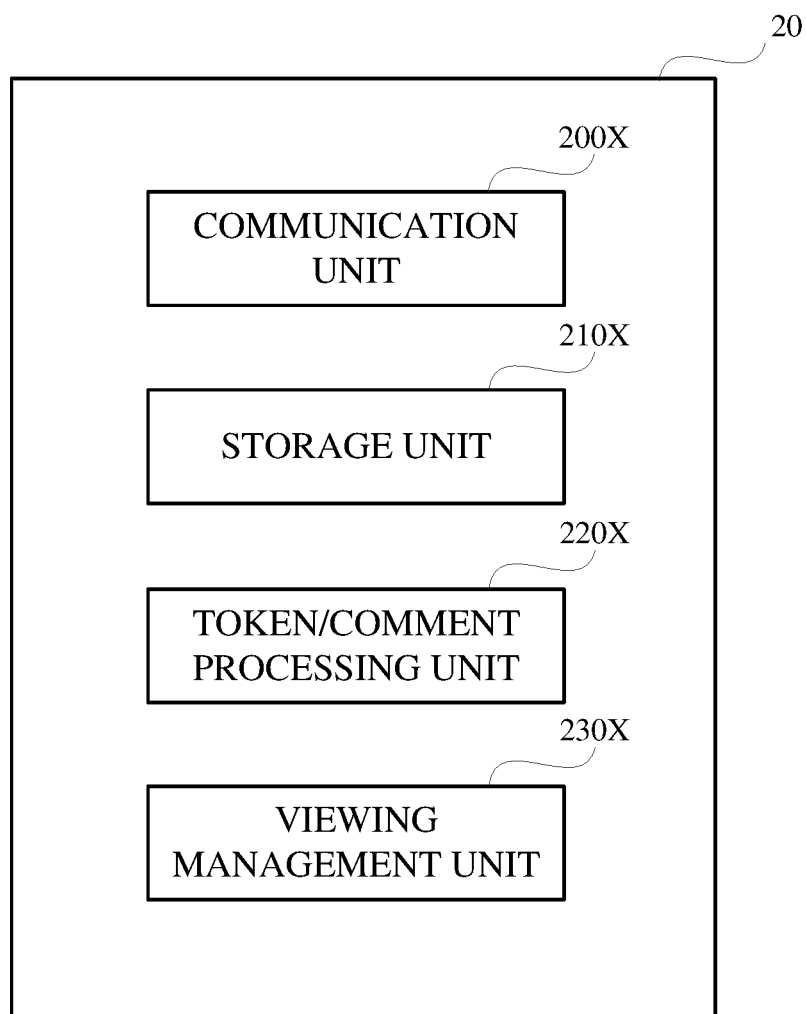
FIG. 11 is a block diagram schematically showing an example of a function of the server device 20 shown in FIG. 9.

An example of the function of the server device 20 will be described with reference to FIG. 11. FIG. 11 is a block diagram schematically showing an example of a function of the server device 20 shown in FIG. 9. As shown in FIG. 11, the server device 20 can mainly include a communication unit 200X, a storage unit 210X, a token/comment processing unit 220X, and a viewing management unit 230X. These may be included in any one of the distribution server device 200a, the DB server device 200b, and the game API server device 200c constituting the distribution server system 20A, or may be included redundantly or dispersedly in at least one server device of the distribution server device 200a, the DB server device 200b, and the game API server device 200c.

The communication unit 200X can communicate various data used for distribution and/or viewing of a video between the terminal device 10 of the distributor and/or the terminal device 10 of the viewer. For example, when operating as the distribution server system 20A, the server device 20 can receive the first video and/or the second video from the terminal device 10 of each distributor and can distribute the received video to the terminal device 10 of each viewer. When operating as the web server device 20B, the server device 20 can transmit, to the terminal device 10 of each distributor having accessed, a web page in which a game program is incorporated.

The storage unit 210X can store various data used for distribution and/or viewing of a video, the various data received from the communication unit 200X, the token/comment processing unit 220X, and/or the viewing management unit 230X.

The token/comment processing unit 220X can process the token data and/or the comment data transmitted from each viewer to each distributor.

The viewing management unit 230X can manage, for example, at least one piece of the following user data regarding each distributor, without being limited thereto.

(a) Total number of plurality of viewers viewing the second video currently distributed by the distributor (b) Total length of time in which each viewer viewing the second video currently distributed by the distributor has viewed the second video (c) Total number of plurality of viewers viewed the second video previously distributed by the distributor (d) Total length of time in which each viewer viewed the second video previously distributed by the distributor has viewed the second video (e) Number of times (e.g., viewing frequency) for which each viewer viewed the second video previously distributed by the distributor has viewed the second video per unit time The distribution server system 20A (in particular, distribution server device 200a) is provided for the purpose of performing a function of distributing, to each terminal device 10 of the plurality of viewers, the second video transmitted by the terminal device 10 of each distributor. Therefore, the distribution server system 20A (in particular, distribution server device 200a) can recognize which viewer's terminal device 10 to transmit the second video from, and which viewer's terminal device 10 to be currently distributed or to have been previously distributed to. Therefore, by managing the history (log) of such distribution, the distribution server system 20A (in particular, distribution server device 200a) can manage various data listed as described above.

When the server device 20 operates as the web server device 20B, the token/comment processing unit 220X and the viewing management unit 230X may be omitted.

3-3. Function of Studio Unit 30

As described above, the studio unit 30 can perform the same function as that of the terminal device 10 and/or the server device 20. Therefore, the studio unit 30 can have the function of the terminal device 10 described with reference to FIG. 10 and/or the function of the server device 20 described with reference to FIG. 11.

4. Overall Operation of Video Distribution System 1

Figure 12A:
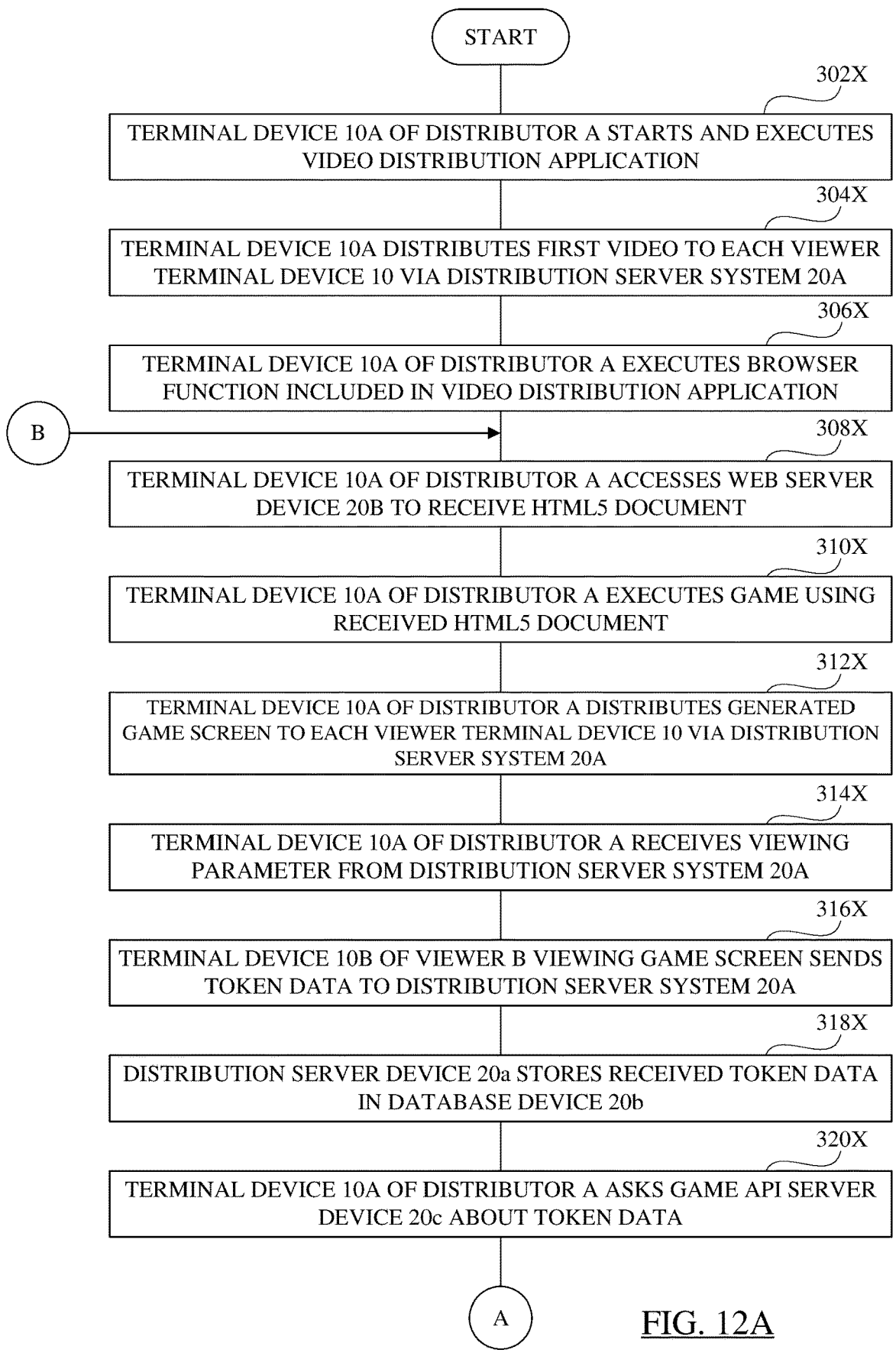
FIG. 12A is a flowchart showing an example of the operation performed in the video distribution system 1 shown in FIG. 9.
Figure 12B:
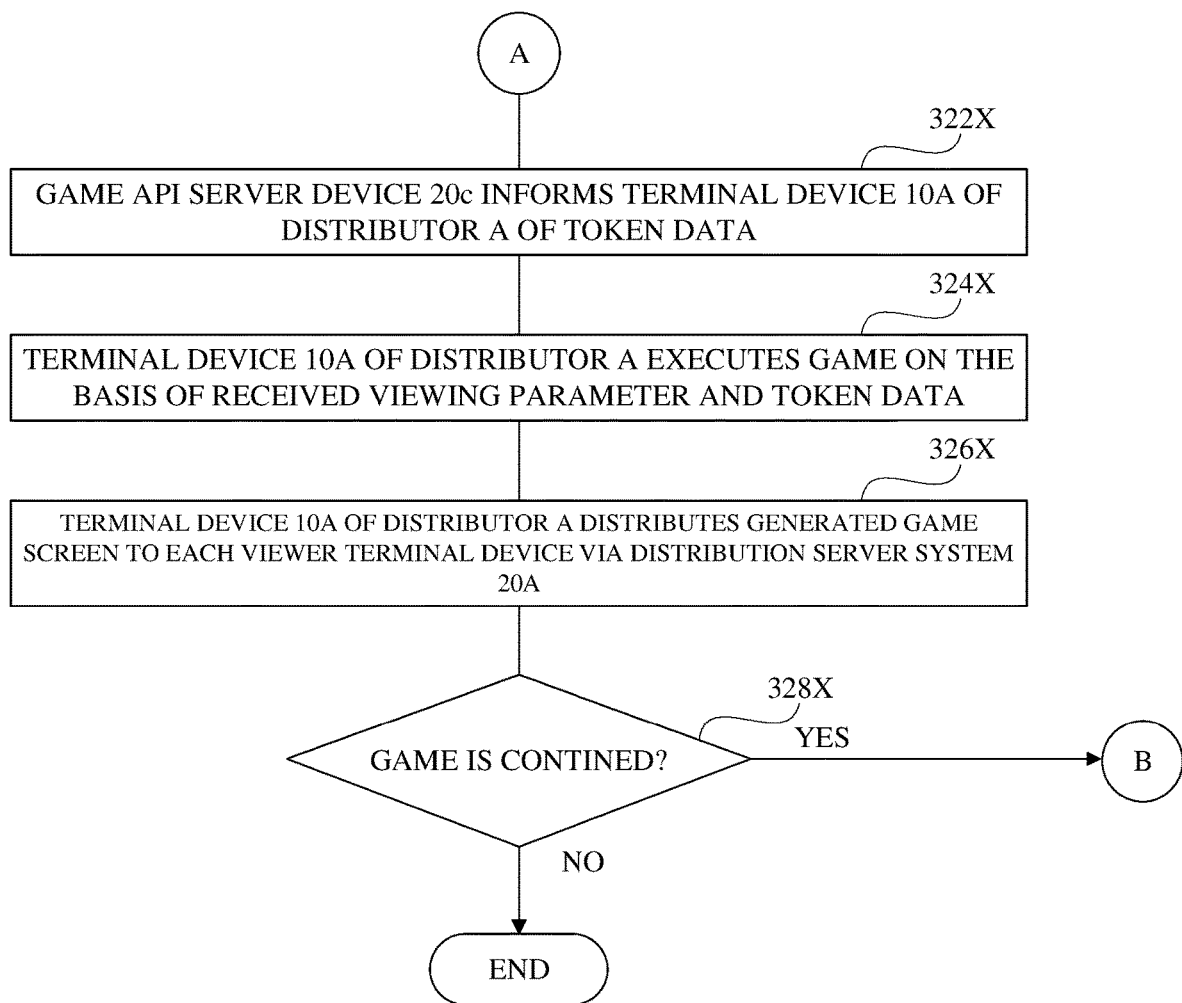
FIG. 12B is a flowchart showing an example of the operation performed in the video distribution system 1 shown in FIG. 9.

Next, the overall operation performed in the video distribution system 1 having the above configuration will be described with reference to FIGS. 12A and 12B. FIGS. 12A and 12B are flow diagrams showing an example of the operation performed in the video distribution system 1 shown in FIG. 9.

First, referring to FIG. 12A, in ST302X, in response to the operation of the distributor (here, distributor A), the terminal device 10 (here, terminal device 10A) starts and executes the video distribution application.

Figure 13:
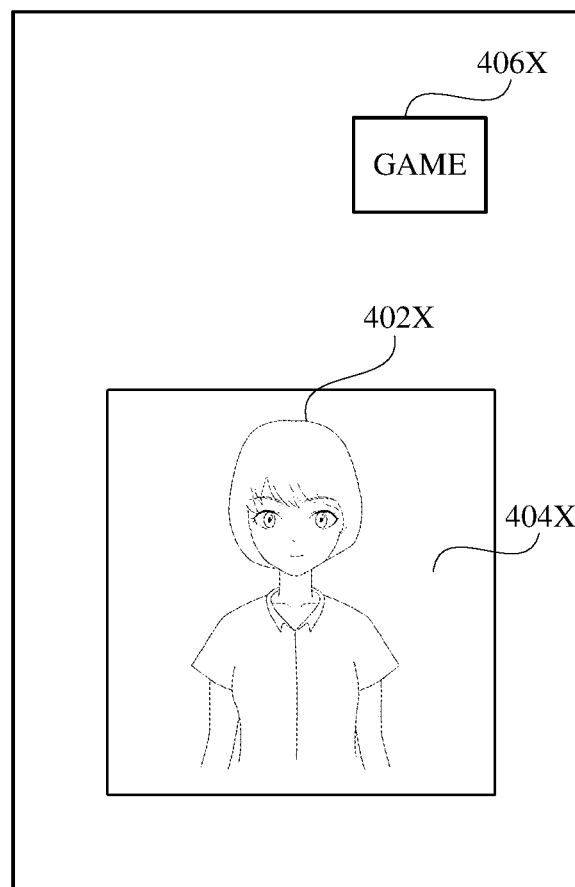
FIG. 13 is a view showing an example of the first video displayed on the terminal device 10 used in the video distribution system 1 shown in FIG. 9.

Next, in ST304X, the terminal device 10A generates the first video including an animation of an avatar of the distributor A on the basis of the motion data regarding the motion of the distributor A. Thus, as illustrated in FIG. 13, a first video 404X including an animation of an avatar 402X of the distributor A is displayed on the display unit 160X of the terminal device 10A.

Returning to FIG. 12A, the terminal device 10A transmits the generated first video 404X to the distribution server device 200*a* of the distribution server system 20A. From the terminal device 10 of each viewer having accessed the distribution server device 200*a* by executing the video viewing application, the distribution server device 200*a* can receive a request signal for requesting the first video 404X distributed by the terminal device 10A of the distributor A. In response to this request signal, the distribution server device 40*a* can distribute, to the terminal device 10 of each viewer executing the video viewing application, the first video 404X received from the terminal device 10A. Thus, the (viewing management unit 230X of the) distribution server device 200*a* can manage the date, time, and the like of the first video 404X being distributed (and/or previously distributed) by the distributor A was viewed by each viewer. In this manner, the first video 404X as illustrated in FIG. 13 is displayed also on the display unit 160X of the terminal device 10 of each viewer.

Next, in ST306X, when the distributor A taps or the like an icon 406X of "Game" (see FIG. 13) displayed on the display unit 160X of the terminal device 10A, the terminal device 10A of the distributor executes the browser function equipped on the video distribution application. Thus, in ST308X, the terminal device 10A can access the web server device 20B in a state of having executed the video distribution application (e.g., having distributed the first video 404X to the terminal device 10 of each viewer). Therefore, the terminal device 10A can receive, from the web server device 20B, the HTML5 document in which the game program is incorporated.

Figure 14:
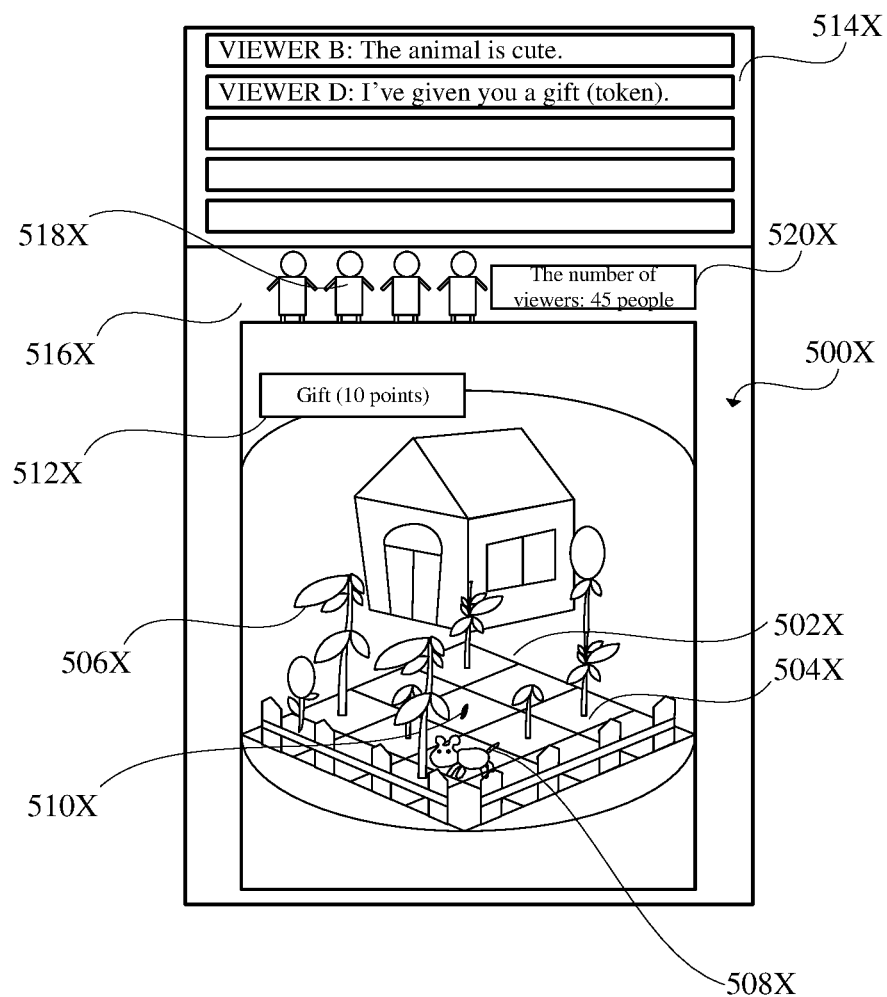
FIG. 14 is a view showing an example of the second video displayed on the terminal device 10 used in the video distribution system 1 shown in FIG. 9.

Next, in ST310X, the terminal device 10A can generate a video (second video) regarding the game by executing the game program incorporated in the received HTML5 document. FIG. 14 shows an example of a second video 500X thus generated by the terminal device 10A.

Next, returning to FIG. 12A, in ST312X, the terminal device 10A transmits the second video (game screen) 500X generated in ST310X to the distribution server device 200*a* of the distribution server system 20A (additionally, during transmitting the second video 500X to the distribution server device 200*a* of the distribution server system 20A, the terminal device 10A may stop transmitting the first video 404X or may transmit the first video 404X). The distribution server device 200*a* distributes the second video received from the terminal device 10A to the terminal device 10 of each viewer executing the video viewing application and receiving the first video 404X (in a case of receiving not only the second video 500X but also the first video 404X from the terminal device 10A, the distribution server device 200*a* may transmit only the second video 500X or both the second video 500X and the first video 404X to the terminal device 10 of each viewer). Thus, the (viewing management unit 230X of the) distribution server device 200*a* can manage the date, time, and the like of the second video being distributed (and/or previously distributed) by the distributor A was viewed by each viewer. Thus, the second video 500X can be displayed also on the display unit 160X of the terminal device 10 of each viewer (for example, in a state of being covered on the first video 404X as illustrated in FIG. 13 and hiding the first video 404X).

Next, in ST314X, the terminal device 10A can receive, from the (viewing management unit 230X of the) distribution server device 200*a* of the distribution server system 20A, at least one viewing parameter regarding viewing by at least one viewer of a plurality of viewers viewing the second video 500X. The terminal device 10A can also receive such a viewing parameter every unit time. As will be described later, the thus received viewing parameter can be used when the terminal device 10A generates the second video 500X.

Next, in ST316X, a case is assumed in which the viewer (here, the user B) viewing the second video 500X transmitted by the terminal device 10A gives a token (token G1 as an example here) to the distributor A. By operating the terminal device 10B, the viewer B can select the token G1 from a plurality of prepared tokens and can select a command for giving the token G1 to the distributor A. The selection of such a command can be executed via a user interface (not illustrated) displayed on the terminal device 10B. Thus, the terminal device 10B can transmit, to the distribution server device 200*a* of the distribution server system 20A, token data indicative of giving the token G1 to the distributor A. This token data can include, for example, recipient identification data for identifying the recipient (distributor A) of the token, token identification data for identifying the token (token G1), and sender identification data for identifying the sender (viewer B) of the token.

By operating the terminal device 10B, the viewer B can also transmit a comment to the distributor A. In this case, the terminal device 10B can transmit the comment data to the distribution server device 200*a*. The comment data can include recipient identification data for identifying the recipient (distributor A) of the comment, comment content data storing the content of the comment, and sender identification data for identifying the sender (viewer B) of the comment.

ST318X to ST324X explained below are related to the procedure in which the token data transmitted by the terminal device 10 of each viewer is received by the terminal device 10 of the distributor A. However, by applying the same procedure to comment data, the comment data transmitted by the terminal device 10 of each viewer can be received by the terminal device 10 of the distributor A. In this case, in ST318X to ST324X explained below, "token identification data" and "token data" can be read and understood as "comment content data" and "comment data", respectively.

In ST318X, the distribution server device 200*a* can store the token data received from the terminal device 10B in the DB server device 200*b*. For example, the DB server device 200*b* can store, as token data, number identification data for identifying what number a token was given, the token identification data, and the sender identification data in association with the recipient identification data.

In ST320X, the terminal device 10A of the distributor A can make an inquiry with the game API server device 200c whether or not new token data has come to the distributor A at each predetermined cycle during execution of the game. For example, if having received one piece of token data from the game API server device 200c so far since starting the game, the terminal device 10A can make an inquiry with the game API server device 200c for the presence/absence of the second and subsequent pieces of token data.

With reference to FIG. 12B, in ST322X, in response to an inquiry from the terminal device 10A, the game API server device 200c can request the DB server device 200b for the second and subsequent pieces of token data regarding the distributor A. In a case of having successfully searched the second and subsequent pieces of number identification data as the number identification data stored in association with the distributor A (recipient identification data), the DB server device 200b can transmit, to the game API server device 200c as the second piece of token data, the token identification data and the sender identification data corresponding to each of the second and subsequent pieces of number identification data. Here, a case is assumed in which the DB server device 200b has successfully searched only the second piece of number identification data. In this case, the DB server device 200b can transmit, to the game API server device 200c as the second piece of token data, the token identification data and the sender identification data corresponding to the second piece of number identification data. In response to this, the game API server device 200c can transmit the second piece of token data to the terminal device 10A of the distributor A.

Next, in ST324X, the terminal device 10A having received the second piece of token data can execute the game on the basis of the second piece of token data. The terminal device 10A can execute the game on the basis of at least one piece of the following data, for example.

Token uniquely identified by the token identification data included in the token data (token G1, here)
Sender identified by the sender identification data included in the token data (viewer B, here)
Comment content data included in the comment data
Sender identified by the sender identification data included in the comment data (viewer B, here)

In place of this or in addition to this, the terminal device 10A can also execute the game on the basis of the viewing parameter received in ST314X.

Thus, the terminal device 10A generates the second video 500X including at least one game object generated on the basis of the token data, the comment data, and/or the viewing parameter. A specific example of the second video 500X including at least one game object generated on the basis of the token data, the comment data, and/or the viewing parameter will be described later.

Additionally, the terminal device 10A has received so far two pieces of token data from the game API server device 200c (the terminal device 10A identifies how many pieces of token data have been received so far during the execution of the game). Thus, in the next cycle, the terminal device 10A can make an inquiry with the game API server device 200c for the presence/absence of the third and subsequent pieces of token data.

Next, in ST326X, the terminal device 10A can distribute the thus generated second video 500X including at least one game object to the terminal device 10 of each viewer via the distribution server system 20A in the same manner as in ST312X.

Next, in ST328X, if the terminal device 10A continues the game, it is possible to repeat the processes in and after ST308X. On the other hand, if the terminal device 10A does not continue the game, the processing ends.

5. Specific Example of Second Video

FIG. 14 is a view showing an example of the second video displayed on the terminal device 10 used in the video distribution system 1 shown in FIG. 9. FIG. 14 shows, as an example, a scene in which the second video 500X regarding a plant growing game for growing plants in a garden that is played by the distributor A is displayed (in ST310X described above) by the terminal device 10A of the distributor A, and displayed (in ST312X described above) by the terminal device 10 of each viewer.

In this game, the distributor A can grow and harvest a plant (e.g., plant 506X) by seeding in a plurality of places 504X (as an example, 16 places in FIG. 14) provided in his garden 502X. As growing a plurality of plants, an animal (e.g., animal 508X) appears and lives in the garden 502X of the distributor A. The game object corresponding to the thus living animal can be stored (registered) in association with the distributor A in the storage unit 170X (and/or storage unit 210X) as a game object owned by the distributor A. The control parameter related to this game object can also be calculated by various techniques described in the present application on the basis of at least one viewing parameter.

The terminal device 10A can control at least one game object used in this game on the basis of the viewing parameter received from the distribution server system 20A in ST314X described above. Specifically, the terminal device 10A can first extract a game object to be controlled ("target game object") from among a plurality of game objects used in this game. The terminal device 10A can calculate the control parameter related to the extracted target game object on the basis of the viewing parameter.

The viewing parameter received by the terminal device 10A in ST314X described above can include at least one of the viewing parameters illustrated below.
(a) Total number of plurality of viewers viewing the second video 500X currently distributed by the distributor A
(b) Total length of time in which each viewer viewing the second video 500X currently distributed by the distributor A has viewed the second video 500X
(c) Total number of plurality of viewers viewed the second video 500X previously distributed by the distributor A
(d) Total length of time in which each viewer who viewed the second video 500X previously distributed by the distributor A has viewed the second video 500X
(e) Number of times (e.g., viewing frequency) for which each viewer viewed the second video 500X previously distributed by the distributor A has viewed the second video per unit time Additionally, "the plurality of viewers viewing the second video 500X" or "each viewer viewing the second video 500X" mentioned here can be understood to mean viewers (users of the terminal device 10 receiving the second video 500X) viewing the second video 500X distributed by the terminal device 10A of the distributor A while not executing (distributing) the game. Similarly, "the plurality of viewers viewed the second video 500X" or "each viewer viewed the second video 500X" mentioned here can be understood to mean viewers (users of the terminal device 10 received the second video 500X) viewed the second video 500X distributed by the terminal device 10A of the distributor A while not executing (distributing) the game at the same time of distribution of this second video 500X.

In order for the terminal device 10A to extract the game object to be controlled from among the plurality of game objects, in one embodiment, it is possible to use an data table (not illustrated) having been received and/or to be received from the web server device 20B, the (distribution server device 200*a* of the) distribution server system 20A, and/or the like. Such data table can include, in association with each game, a distribution time slot of the game, game object identification data for identifying at least one target game object to be controlled, and calculation data indicative of which control parameter of each target game object and how to calculate (increase or decrease). By searching the data table by using the currently executed game and the current date and time as a search key, the terminal device 10A can identify at least one target game object and can identify how to calculate the control parameter related to the target game object.

The target game object can include an avatar and/or a character operated by the distributor A. In this case, control parameters including the point, level, and growing power (e.g., if the growing power is large, the time for growing the seed buried in the garden 502X can be shortened) of the avatar and/or the character can be calculated (increased or decreased) in accordance with the viewing parameter.

The target game object can include a game object acquired by the distributor A. The game object acquired by the distributor A can include, for example, items, points (such as points acquired when the plant is harvested in the garden 502X), rewards (such as rewards acquired when the plant is harvested in the garden 502X), and characters (such as animals appearing in the garden 502X, seeds that can be buried in the garden 502X). In this case, the control parameters including the identification data, value, type, and time required for harvesting of the game object acquired by the distributor A can be calculated (increased or decreased) in accordance with the viewing parameter.

In such a game, the terminal device 10A can calculate control parameters related to the game object acquired and/or operated by the distributor A on the basis of the viewing parameter (so as to be in proportion to the viewing parameter in particular). Thus, the terminal device 10A can generate at least one event of the following events, for example, that become more advantageous to the distributor A.

Reduce the difficulty level of the game.

Allow the distributor A to acquire more game objects (characters, points, rewards, levels, and the like).

Allow the distributor A to acquire more valuable game objects (rarer animals and seeds, higher points and rewards, and the like).

In particular, for example, the more the total number (viewing parameter (a)) of viewers viewing the second video 500X distributed by the distributor A is, the more advantageously the distributor A can play the game by occurrence of such an event. As a result, for the purpose of playing the game more advantageously, the distributor A is expected to attract customers by SNS, mail, telephone, and/or speech prior to the distribution of the second video 500X. This can also increase the total number of users using the video distribution system.

Such an effect is similarly obtained not only in a case of using the viewing parameter (a) as the viewing parameter but also in a case of using at least one of the viewing parameters (b) to (e).

In relation to the parameter (e) regarding the viewing frequency in particular, when viewers whose viewing frequency exceeds a first threshold exist in equal to or greater than a second threshold (this means there are many regular users regarding the second video of the distributor A) in the plurality of viewers viewing the second video 500X, a first bonus can be given to the distributor A. This first bonus is also an aspect of the game object. Also when viewers whose viewing frequency is less than a third threshold exists in equal to or greater than a fourth threshold (this means there are many first-time viewers regarding the second video of the distributor A) in the plurality of viewers viewing the second video 500X, a second bonus can be given to the distributor A. This second bonus is also an aspect of the game object.

In one embodiment, when receiving token data (in ST324X described above) from the terminal device 10 of the viewer, the terminal device 10A can display, in the second video 500X, the token identified by the token identification data included in the token data. As illustrated in FIG. 14, such token may be a new seed 510X that the distributor A can plant in the garden 502X, a point 512X that the distributor A acquires, and/or the animal 508X that appears in the garden 502X.

In relation with such token, in one embodiment, the terminal device 10A can also calculate (increase or decrease) the control parameter of the target game object on the basis of the token data received from the terminal device 10 of each viewer. Specifically, for example, the terminal device 10A can calculate (in favor of the distributor A in particular) the control parameter related to the game object acquired and/or operated by the distributor A, each time receiving token data and/or so as to be proportional to the total number of pieces of token data received per unit time. Such control parameter calculation can be performed in a similar manner to the control parameter calculation on the basis of the viewing parameter described above.

Furthermore, in one embodiment, when receiving comment data (in ST324X described above) from the terminal device 10 of the viewer, the terminal device 10A can display, in the second video 500X, the comment content data included in the comment data. Such comment can be displayed in a comment region 514X as illustrated in FIG. 14. As shown in FIG. 14, information "viewer B" and "the animal is cute" can be displayed in the comment region 514X of the second video 500X on the basis of the sender identification data and the comment content data in the comment data received from the terminal device 10 of the viewer B via the distribution server system 20A. Similarly, information "viewer D" and "I've given you a gift." can be displayed in the comment region 514X on the basis of the sender identification data and the comment content data in the comment data received from the terminal device 10 of the viewer D via the distribution server system 20A.

In relation with such comment, in one embodiment, the terminal device 10A can also calculate (increase or decrease) the control parameter of the target game object on the basis of the comment data received from the terminal device 10 of each viewer. Specifically, in the first example, the terminal device 10A can calculate (in favor of the distributor A in particular) the control parameter related to the game object acquired and/or operated by the distributor A, each time receiving comment data and/or so as to be proportional to the total number of pieces of comment data received per unit time.

Such control parameter calculation can be performed in a similar manner to the control parameter calculation on the basis of the viewing parameter described above.

In the second example, the terminal device 10A can calculate (in favor of the distributor A in particular) the control parameter related to the game object acquired and/or operated by the distributor A, on the basis of at least one piece of the following data (A) to data (C) included in the comment content (comment body text) of one or more pieces of the comment data received from the terminal device 10 of each viewer.

(Data A) Number of specific keywords (e.g., positive keywords) in comment body text When the number of the specific keywords described above exceeds the threshold, the terminal device 10A can calculate (in favor of the distributor A in particular) the control parameter related to the game object acquired and/or operated by the distributor A. The specific keyword described above is stored in advance by the terminal device 10A, the server device 20, or the like.

(Data B) Result of classifying comment body text by artificial intelligence

By inputting the comment body text to a learning model generated in advance by the terminal device 10A, the server device 20, or the like, the terminal device 10A can cause the learning model to estimate as to which of a plurality of groups this comment body text belongs to. Here, the plurality of groups can include, for example, a group G1 of comments with extremely positive contents, a group G2 of comments with very positive contents, a group G3 of comments with normal contents, and a group G4 of comments with negative contents. As a result of the classification by the learning model, the terminal device 10A can calculate the control parameter related to the game object acquired and/or operated by the distributor A in proportion to the degree of positiveness of the comment body text so that the distributor A becomes more advantageous. The learning model can be generated on the basis of a discretionary technology including machine learning (deep learning in particular) and reinforcement learning.

As the learning model, the terminal device 10A can use the learning model stored in the terminal device 10A, and can use the learning model stored in the server device 20 or the like.

(Data C) Number of characters in comment body text

When the number of characters in the comment body text exceeds the threshold, the terminal device 10A can calculate the control parameter related to the game object acquired and/or operated by the distributor A so that the distributor A becomes advantageous. The large number of characters in the comment body text can mean that there is a viewer enthusiastic about the distributor A or the second video distributed by the distributor A.

Similarly to the comment data described above, the terminal device 10A can also receive an evaluation for the distributor A from the terminal device 10 of each viewer via the distribution server system 20A. The evaluation for the distributor A may also be a discretionary evaluation including "like", "agree", and "share". Such evaluation can be received by the terminal device 10 of the distributor A from the terminal device 10 of each viewer via the distribution server system 20A in the same manner as the above-mentioned token data and comment data. A plurality of pieces of the above-mentioned token data, comment data, and evaluation can be used in combination with one another for calculation of a control parameter related to the target game object.

In one embodiment, as illustrated in FIG. 14, the second video 500X can also include a region 516X in which a game object set on the basis of the total number of viewers per unit time is displayed. As explained with reference to FIG. 12A, in ST314X, as one aspect of viewing parameter, the terminal device 10A can receive the total number of viewers viewing the second video 500X for each unit time. This unit time can preferably be a time (fixed or variable) falling within the range of 1 minute to 20 minutes. More preferably, this unit time can be a time (fixed or variable) falling within the range of 5 minutes to 10 minutes.

In the example of FIG. 14, as many game objects 518X as the number proportional to the total number of viewers per unit time (four game objects 518X as an example in FIG. 14) can be displayed in the region 516X. For example, display using at least one of the following aspects is considered.

As many game objects 518X as the total number of viewers can be displayed in the region 516X (in the case of FIG. 14, since four game objects 518X are displayed, the total number is 4).

As many game objects 518X as the number obtained by dividing the total number of viewers by a predetermined number (e.g., 10) can be displayed in the region 516X (in the case of FIG. 14, since four game objects 518X are displayed, the total number is 40 to 49).

A number, symbol, and/or character representing the total number itself of viewers can be displayed in the region 516X (in the case of FIG. 14, a combination 520X of a number and character of "45 viewers" can be displayed as the total number of viewers).

Compared with a configuration in which the total number of viewers is displayed at intervals such as every second, e.g., in a real-time manner (this configuration is also included in the technology disclosed in the present application), as illustrated in FIG. 14, by displaying the total number of viewers for each unit time, it is possible to suppress the communication amount generated between the terminal device 10A and the distribution server system 20A.

Even if the total number of viewers actually decreases after the total number of viewers in a certain unit time (first unit time) is displayed, before the total number of viewers in the next unit time (second unit time) is displayed, the fact that the total number has decreased in that manner is not presented to the distributor A until the total number of viewers in the second unit time is actually displayed. Thus, for the period from the first unit time to the second unit time, the distributor A is supposed to continue to recognize the total number of viewers in the first unit time. Therefore, by understanding that the second video 500X that the distributor A himself is distributing is viewed by a large number of viewers (more than the total number of actual viewers), the distributor A can maintain motivation for distributing the second video 500X. In this sense, the unit time is more preferably a moderately long time (e.g., 5 to 10 minutes).

6. Variations

In the various embodiments described above, the case in which the terminal device 10A distributes the second video 500X regarding the plant growing game has been described. However, the terminal device 10A can distribute the second video 500X regarding a discretionary game. The discretionary game can include, for example, action games, simulation games, role-playing games, card games, puzzle games, shooter games, quiz games, social simulation games, board games, lottery (loot box) games, and/or sports games, without being limited thereto.

Also in the case of distributing the second video 500X regarding any game, the terminal device 10A can calculate the control parameter related to the target game object so as to be proportional to at least one viewing parameter of the above-described viewing parameters (a) to (e).

In a growing game for growing animals and plants in particular, at least one operation of the following operations can be performed.

Cost (one of the target game objects) required for the distributor A for producing plants and animals is reduced in proportion to at least one viewing parameter of the viewing parameters (a) to (e).

Coin or reward (one of the target game objects) acquired by the distributor A by producing plants and animals is increased in proportion to at least one viewing parameter of the viewing parameters (a) to (e).

Animal born by hatching an egg (plant grown by seeding) (both are target game objects) becomes a rarer animal/plant and/or a more expensive animal/plant in proportion to at least one viewing parameter of the viewing parameters (a) to (e).

The control parameters (discretionary control parameters including costs, coins, and rewards) of the game object thus varying depending on the viewing parameter can be displayed by the user interface on the game screen together with data regarding the variation amount.

Figure 15:
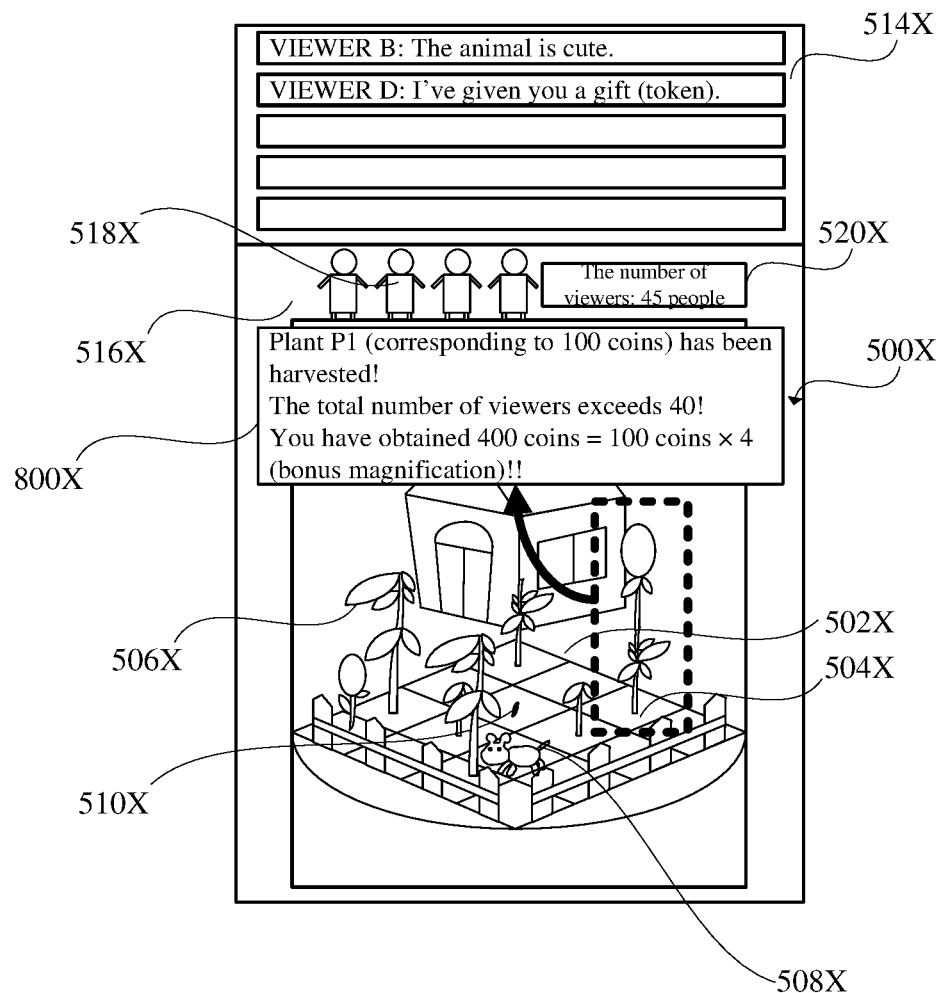
FIG. 15 is a view showing another example of the second video displayed on the terminal device 10 used in the video distribution system 1 shown in FIG. 9.

Specifically, with a parameter (a) as an example, as illustrated in FIG. 15, when the total number of viewers viewing the second video 500X exceeds the threshold of 40, for example, a game screen 500X displays, via a pop-up 800X (one aspect of the user interface), information indicating that the coin (reward) given to the distributor A when a plant is harvested increases from 100 coins obtained in a normal case to 400 coins by applying a bonus magnification (×4). This user interface may be displayed only to the distributor A, or may be displayed to each viewer in addition to the distributor A.

Figure 16:
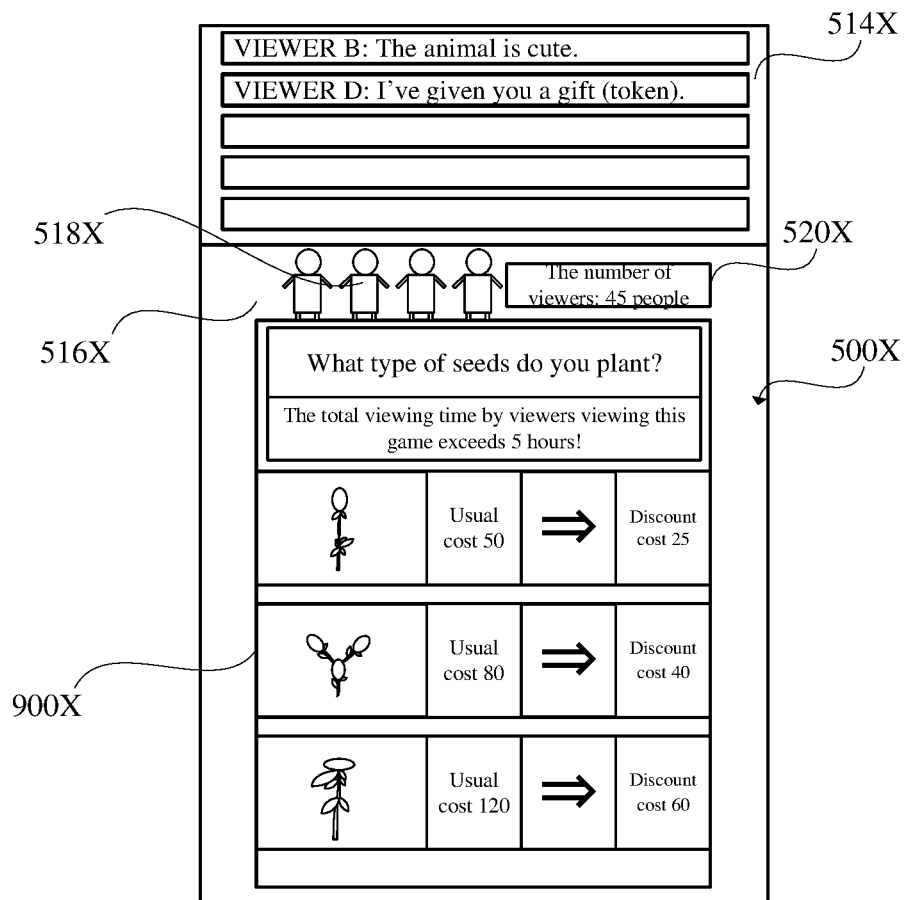
FIG. 16 is a view showing another example of the second video displayed on the terminal device 10 used in the video distribution system 1 shown in FIG. 9.

In another example, with a parameter (b) as an example, as illustrated in FIG. 16, when the total viewing time by the viewer viewing the second video 500X exceeds a threshold of 5 hours, for example, the game screen 500X can display, via a plant selection screen 900X (one aspect of the user interface), information indicating that the cost required for planting a new plant seed is halved by applying a bonus magnification (×0.5). This user interface may be displayed only to the distributor A, or may be displayed to each viewer in addition to the distributor A.

In a fighting game (kind of action game) in particular, at least one operation of the following operations can be performed.

At least one control parameter (e.g., physical strength, attack power, defense power, and mobility) of the character and/or avatar operated by the distributor (or, a friend character and/or friend avatar moving in cooperation with the distributor) increases in proportion to at least one viewing parameter of the viewing parameters (a) to (e).

At least one control parameter (e.g., physical strength, attack power, defense power, and mobility) of the character and/or avatar opposing the character and/or avatar operated by the distributor decreases in proportion to at least one viewing parameter of the viewing parameters (a) to (e).

Similarly, also in this case, the control parameters (discretionary control parameters including physical strength, attack power, and defense power) of the game object varying depending on the viewing parameter can be displayed by a discretionary user interface on the game screen together with information regarding the variation amount.

In a lottery (loot box) game in particular, an operation can be performed in which the probability for the distributor A to acquire a more expensive and/or rarer prize (such as an item) in proportion to at least one viewing parameter of the viewing parameters (a) to (e).

Furthermore, in a game for maneuvering troops such as a real-time strategy game in particular, an operation can be performed in which the total number of troops that the distributor A can maneuvers (or the total number of troops opposing the distributor A) increases (or decreases) in proportion to at least one viewing parameter of the viewing parameters (a) to (e).

Furthermore, in any type of game, the distributor may acquire the game object (discretionary game object including items, points, rewards, and physical strength) on the basis of at least one viewing parameter of the various viewing parameters including the viewing parameters (a) to (e) described above.

Specifically, it is possible to set a threshold as one or more stages of achievement target value for each of at least one viewing parameter of the various viewing parameters (may include the viewing parameters (a) to (e) described above) including, for example, the number of simultaneous viewers, the number of accumulated viewers, the accumulated number of viewers who have viewed the video for five minutes or more, the accumulated viewing time of viewers, the accumulated number of viewers who have given a token to the distributor, and the accumulated points of the token acquired by the distributor.

Each time these thresholds are achieved by the corresponding viewing parameters, the game objects corresponding to the thresholds can be given to the distributor. For example, for the viewing parameter of the number of simultaneous viewers, a case in which 10 is set as the first threshold in the first stage, and 50 is set as the second threshold in the second stage is considered. In this case, the game object corresponding to the first threshold can be given to the distributor at the time point when this viewing parameter reaches the first threshold, and the game object corresponding to the second threshold can be given to the distributor at the time point when the viewing parameter reaches the second threshold.

Thus, a control parameter (threshold associated with a viewing parameter) related to a specific game object acquired by the distributor, the control parameter indicative of a condition to be satisfied by the distributor for acquiring this specific game object, can be compared (aspect of calculation) with the at least one viewing parameter described above. The control parameter (threshold associated with the viewing parameter) related to such specific game object is reached by the at least one viewing parameter described above, whereby the specific game object can be stored (registered) in association with the distributor A as a game object owned by the distributor A.

In the various embodiments described above, the case in which in order to generate a video (second video) regarding the game, the terminal device 10 of the distributor receives, from the web server device 20B, an HTML (HTML5, in particular) document in which a game program is incorporated has been described. However, instead of the configuration of receiving, from the web server device 20B, an HTML document in which a game program is incorporated, the terminal device 10 of the distributor can also generate the second video including a screen regarding the game by executing the installed video distribution application and receiving appropriate data from a data server device not illustrated (or a certain server device not illustrated included in the distribution server system 20A).

In the various embodiments described above, the terminal device 10 of the distributor may be a smartphone or the like used by a general user, or may be a dedicated terminal device installed in a studio or the like. In this case, at least one server device of the distribution server device 200a, the DB server device 200b, and the game API server device 200c that are included in the distribution server system 20A (as well as the web server device 20B) may be provided together with the dedicated terminal device in the studio or the like.

In the various embodiments described above, the case in which, on the basis of motion data regarding the motion of the distributor and voice data regarding the voice of the distributor, the terminal device 10 of the distributor generates the first video including the animation including the avatar of this distributor, and transmits the first video to the server device 20 has been described. However, the terminal device 10 of the distributor may transmit the motion data regarding the motion of the distributor and the voice data regarding the voice of the distributor to the server device 20, and the server device 20 may generate a video on the basis of the motion data and the voice data and distribute the video to the terminal device 10 of each viewer. This can reduce the amount of data transmitted from the terminal device 10 of the distributor to the distribution server system 20A.

Alternatively, the terminal device 10 of the distributor may transmit the motion data regarding the motion of the distributor and the voice data regarding the voice of the distributor to a separately provided server device, this separate server device may generate a video on the basis of the motion data and the voice data and return it to the terminal device 10 of the distributor, and the terminal device 10 of the distributor may transmit the received video to the server device 20. This can reduce the amount of data transmitted from the terminal device 10 of the distributor to the separately provided server device 20.

Furthermore, the terminal device 10 of the distributor may transmit the motion data regarding the motion of the distributor and the voice data regarding the voice of the distributor to the terminal device 10 of each viewer via the server device 20 or the separately provided server device, and the terminal device 10 of each viewer may generate (render) and display a video on the basis of the received motion data and voice data (this technique is sometimes referred to as "client rendering"). This can reduce the amount of data transmitted from the server device 20 or the separately provided server device to the terminal device 10 of each viewer.

In any of the above cases, the generation of a video on the basis of the motion data and the voice data transmitted by the terminal device 10 of the distributor may be shared by at least two devices from among the server device 20, the separate server device, and the terminal device 10 of each viewer. In either case, the device responsible for generation of the video can receive, from, for example, the server device 20 or the like, and store data (image and the like) regarding the avatar to be operated.

Furthermore, in any case, the token data, comment data, and/or evaluation-related data transmitted by the terminal device 10 of each viewer can be transmitted by a discretionary method to a device responsible for generation of a video from among the server device 20, the separate server device, and the terminal device 10 of each viewer. Thus, the device generating the video can execute processing on the basis of received token data (e.g., displaying the token object in the video), execute processing on the basis of received comment data (e.g., displaying the comment in the video), and/or execute processing on the basis of received evaluation-related data (e.g., displaying the evaluation in the video). In either case, the device responsible for generation of the video can receive, from, for example, the server device 20 or the like, and store data (image and the like) corresponding to various tokens to be used.

In the various embodiments described above, the motion of each of the terminal devices 10 described above can be executed similarly by the studio unit 30 having a similar configuration to that of the terminal device 10. In this case, the studio unit 30A illustrated in FIG. 9 can have a similar function to that of the terminal device 10 for distributing a video. Similarly, the studio unit 30B illustrated in FIG. 9 can have a similar function to that of the terminal device 10 for viewing a video. The motion of each of the server devices 20 described above can be executed also by the studio unit 30 having the similar configuration to that of the server device 20.

In general, if a game program has been installed in the terminal device 10, or if a game program has been incorporated in a video distribution application installed in the terminal device 10, execution of a new game requires the terminal device 10 to have a new game program or video distribution application incorporating the new game program installed. In this case, from the point of view of the creator of the game program, it is necessary to prepare a game program corresponding to each of a plurality of operating systems, and thus there is a problem of an increase in the man-hour used for the creation of the game program. On the other hand, from the point of view of the user, it is necessary to download a new game program and/or to update an existing game program in order to obtain a new game, and thus there is a problem of requiring communication load, communication cost, time, and labor.

On the other hand, according to the technology disclosed in the present application, in order to execute the game, the terminal device 10A of the distributor can call the browser function incorporated in the video distribution application, instead of executing the game program installed in this terminal device 10A, can receive a web page (HTML document, particularly HTML5 document) from the web server device 20B by using this browser function, and can execute the game program incorporated in the web page. This allows the terminal device 10A of the distributor to easily execute the new game. Therefore, when providing a new game, the creator of the game program only has to incorporate the new game program into the web page (HTML document, particularly HTML5 document) transmitted by the web server device 20B, and it is hence possible to reduce the number of man-hours used for creation of the new game program. Furthermore, since the user does not need to download a new game program or the like in order to be provided with the new game, it is possible to suppress communication load, communication cost, time, and labor.

In the above-described various embodiments, when executing the video distribution application, communicating with the distribution server system 20A, and distributing the first video, the terminal device 10A of the distributor A executes the browser function incorporated in this video distribution application, whereby the terminal device 10A of the distributor A executes the program included in the web page received from the web server device 20B, and distributes the second video to the terminal device 10 of each viewer via the distribution server system 20A. However, such configuration is merely an example.

For example, the terminal device 10A of the distributor A can also distribute the second video without distributing the first video. Specifically, in the first example, by executing the video distribution application and executing the browser function incorporated in the video distribution application, the terminal device 10A of the distributor A can execute a program included in the web page received from the web server device 20B (without distributing the first video by using the video distribution application), and distribute the second video to the terminal device 10 of each viewer via the distribution server system 20A. In this configuration, the distributor A does not distribute the first video on the basis of the performance of the distributor himself but can distribute only the second video showing the situation of the game that the distributor himself executes.

In the second example, by executing an installed game application and accessing the distribution server system 20A, which also functions as a game server device, the terminal device 10A of the distributor A can distribute the screen of the game being executed to the terminal device 10 of each viewer via the distribution server system 20A. Also in these first and second examples, as in the various embodiments described above, the terminal device 10A of the distributor A can generate the second video by using the viewing parameter received from the distribution server system 20A.

In the third example, in the first example or the second example, the terminal device 10A of the distributor A can transmit operation data of the distributor A to the web server device 20B or the distribution server system 20A without generating a game screen. In this case, the web server device 20B or the distribution server system 20A can generate a game screen by using the operation data, and the distribution server system 20A can distribute the second video including the generated game screen to the terminal device 10 of each viewer. In this third example, when generating a game screen, the web server device 20B can use the viewing parameters received from the distribution server system 20A. When the distribution server system 20A generates a game screen, the distribution server system 20A can use a viewing parameter managed by the distribution server system 20A itself.

As will be readily understood to a person of ordinary skill in the art having the benefit of the present disclosure, the various examples described above can be used in various suitable combinations with each other as long as they do not cause inconsistencies.

Thus, according to the various embodiments described above, the second video can be generated by calculating the control parameter related to the target game object on the basis of the viewing parameter regarding viewing by at least one viewer regarding the current or past second video of the distributor. Thus, since it is possible to play the game more advantageously by attracting more viewers viewing the own second video, the distributor is motivated to attract customers. Therefore, it is possible to increase the number of users using the video distribution service.

Thus, the technology disclosed in the present application can provide a computer program, a method, and a server device that can encourage distributors to attract viewers.

Also, in ordinary systems, when viewers wish to affect the game played by a distributor, they need to use their terminal devices to send tokens, messages, or comments, etc. to the distributor, which occupies communication network resources. According to the technology disclosed in the present application, all the viewers have to do in order to affect the game played by the distributor (e.g. to help the distributor play the game advantageously) is to view the videos (game screens), etc. distributed by the distributor. This may allow a server device (which communicates with the terminal devices of the distributor and the viewers) as well as these terminal devices to effectively save or decrease communication network loads.

Further, according to the technology disclosed in the present application, the device of the distributor is able to calculate a control parameter related to a selected game object used in the game on the basis of viewer data so that the distributor is able to play the game advantageously. Therefore, as the distributor is able to complete the game more quickly, the terminal device of the distributor is able to: save the power consumption of the device; extend the battery life of the device; decrease CPU/memory loads; and/or decrease communication network loads. This is also true with the server device and the terminal devices of the viewers.

7. Various Aspects.

A computer program according to a first aspect of the disclosed technology can be "a computer program configured to, when executed by at least one processor, to cause the at least one processor to: distribute a first video including an animation of an avatar of a distributor generated on the basis of motion data related to motion of the distributor or the motion data, via a communication line, toward terminal devices of a plurality of viewers; distribute a second video related to a game generated on the basis of operation data related to operation of the distributor using a received web page, via the communication line, toward the terminal devices of the plurality of viewers; obtain at least one viewing parameter regarding viewing of at least one viewer among the plurality of viewers, via the communication line; extract a game object to be controlled among a plurality of game objects used in the game; and calculate a control parameter related to the game object on the basis of the at least one viewing parameter."

In the computer program according to a second aspect of the disclosed technology, "the at least one viewing parameter is related to viewing of at least one viewer among the plurality of viewers viewing the second video without executing a game" in the first aspect.

In the computer program according to a third aspect of the disclosed technology, "the at least one viewing parameter includes a total number of the plurality of viewers, viewing time of the at least one viewer, and/or, a frequency with which the at least one viewer viewed the second video distributed by the distributor" in one of the preceding aspects.

In the computer program according to a fourth aspect of the disclosed technology, "the computer program is configured to cause the at least one processor to calculate a control parameter related to a game object acquired or operated by the distributor in the game on the basis of the at least one viewing parameter" in one of the preceding aspects.

In the computer program according to a fifth aspect of the disclosed technology, "the computer program is configured to cause the at least one processor to calculate a control parameter related to a game object acquired by the distributor in the game on the basis of the at least one viewing parameter, wherein the game object acquired by the distributor includes an item, equipment, a point, a reward, a coin, a card, and/or, a character" in the fourth aspect.

In the computer program according to a sixth aspect of the disclosed technology, "the computer program is configured to cause the at least one processor to calculate a control parameter related to a game object operated by the distributor in the game on the basis of the at least one viewing parameter, wherein the game object operated by the distributor include a character and/or an avatar" in the fourth aspect.

In the computer program according to a seventh aspect of the disclosed technology, "wherein the at least one viewing parameter is the total number of the plurality of viewers, the computer program is configured to cause the at least one processor to calculate a control parameter related to the game object acquired or operated by the first distributor on the basis of the total number to: reduce a difficulty level of the game played by the first distributor; allow the first distributor to acquire a more game object; and/or, allow the first distributor to acquire a more valuable game object" in one of the preceding aspects.

In the computer program according to an eighth aspect of the disclosed technology, "the computer program is configured to cause the at least one processor to: receive giving data indicative of giving a token, a comment, or, an evaluation to the distributor transmitted by a terminal device of any viewer out of the plurality of viewers; and calculate, on the basis of the giving data, a control parameter related to the game object to be used in the game" in one of the preceding aspects.

In the computer program according to a ninth aspect of the disclosed technology, "the computer program is configured to cause the at least one processor to: obtain a total number of the plurality of viewers for each unit time from a server device distributing the second video to the plurality of viewers and update the total number; and display, in the game, the updated total number and/or a game object set on the basis of the updated total number" in one of the preceding aspects.

In the computer program according to a tenth aspect of the disclosed technology, "the communication line includes the Internet" in one of the preceding aspects.

In the computer program according to an eleventh aspect of the disclosed technology, "the at least one processor includes a central processing unit (CPU), a microprocessor, and/or, a graphics processing unit (GPU)" in one of the preceding aspects.

A computer program according to a twelfth aspect of the disclosed technology can be "a computer program configured to, when executed by at least one processor, to cause the at least one processor to: receive a first video including an animation of an avatar of a distributor generated on the basis of motion data related to motion of the distributor, or the motion data, via a communication line; receive a second video related to a game generated by a terminal device of the distributor on the basis of operation data related to operation of the distributor using a received web page, via the communication line; and receive, from the terminal device of the distributor, the second video including a game object, a control parameter related to the game object having been calculated on the basis of at least one viewing parameter related to viewing of at least one viewer out of a plurality of viewers viewing the second video."

In the computer program according to a thirteenth aspect of the disclosed technology, "the communication line includes the Internet" in the twelfth aspect.

In the computer program according to a fourteenth aspect of the disclosed technology, "the at least one processor includes a central processing unit (CPU), a microprocessor, and/or, a graphics processing unit (GPU)" in one of the preceding aspects.

A method according to a fifteenth aspect of the disclosed technology can be "a method executed by at least one processor executing computer-readable instructions, including: with the at least one processor executing the instructions, distributing a first video including an animation of an avatar of a distributor generated on the basis of motion data related to motion of the distributor or the motion data, via a communication line, toward terminal devices of a plurality of viewers; distributing a second video related to a game generated on the basis of operation data related to operation of the distributor using a received web page, via the communication line, toward the terminal devices of the plurality of viewers; obtain at least one viewing parameter regarding viewing of at least one viewer among the plurality of viewers, via the communication line; extracting a game object to be controlled among a plurality of game objects used in the game; and calculating a control parameter related to the game object on the basis of the at least one viewing parameter."

In the method according to a sixteenth aspect of the disclosed technology, "the communication line includes the Internet" in the fifteenth aspect.

In the method according to a seventeenth aspect of the disclosed technology, "the at least one processor includes a central processing unit (CPU), a microprocessor, and/or, a graphics processing unit (GPU)" in one the preceding aspects.

A method according to an eighteenth aspect of the disclosed technology can be "a method executed by at least one processor executing computer-readable instructions, including: with the at least one processor executing the instructions, receiving a first video including an animation of an avatar of a distributor generated on the basis of motion data related to motion of the distributor, or the motion data, via a communication line; receiving a second video related to a game generated by a terminal device of the distributor on the basis of operation data related to operation of the distributor using a received web page, via the communication line; and receiving, from the terminal device of the distributor, the second video including a game object, a control parameter related to the game object having been calculated on the basis of at least one viewing parameter related to viewing of at least one viewer out of a plurality of viewers viewing the second video."

In the method according to a nineteenth aspect of the disclosed technology, "the communication line includes the Internet" in the eighteenth aspect.

In the method according to a twentieth aspect of the disclosed technology, "the at least one processor includes a central processing unit (CPU), a microprocessor, and/or, a graphics processing unit (GPU)" in one of the preceding aspects.

A server device according to a twenty first aspect of the disclosed technology can be "a server device, comprising at least one processor, wherein the at least one processor is configured to: distribute a first video including an animation of an avatar of a distributor generated on the basis of motion data related to motion of the distributor or the motion data, toward terminal devices of a plurality of viewers via a communication line; distribute, a second video related to a game generated by a terminal device of the distributor on the basis of operation data related to operation of the distributor using a received web page, toward the terminal devices of the plurality of viewers via the communication line; and receive, from the terminal device of the distributor, the second video including a game object, a control parameter related to the game object having been calculated on the basis of at least one viewing parameter related to viewing of at least one viewer out of a plurality of viewers viewing the second video."

In the server device according to a twenty second aspect of the disclosed technology, "the communication line includes the Internet" in the twenty first aspect.

In the server device according to a twenty third aspect of the disclosed technology, "the at least one processor includes a central processing unit (CPU), a microprocessor, and/or, a graphics processing unit (GPU)" in one of the preceding aspects.

A server device according to a twenty fourth aspect of the disclosed technology can be "a server device, comprising at least one processor, wherein the at least one processor is configured to transmit a web page including a computer program to a terminal device of a distributor, wherein the terminal device is configured to: distribute a first video including an animation of an avatar of the distributor generated on the basis of motion data related to motion of the distributor or the motion data, toward terminal devices of a plurality of viewers via a communication line; and distribute, a second video related to a game generated on the basis of operation data related to operation of the distributor using a received web page, toward the terminal devices of the plurality of viewers via the communication line, wherein the computer program is configured to cause the terminal device of the distributor to: obtain, via the communication line, at least one viewing parameter related to viewing of at least one viewer out of the plurality of viewers; extract a game object to be controlled among a plurality of game objects used in the game; and calculate a control parameter related to the game object."

In the server device according to a twenty fifth aspect of the disclosed technology, "the communication line includes the Internet" in the twenty fourth aspect.

In the server device according to a twenty sixth aspect of the disclosed technology, "the at least one processor includes a central processing unit (CPU), a microprocessor, and/or, a graphics processing unit (GPU)" in one of the preceding aspects.

A method according to a twenty seventh aspect of the disclosed technology can be "a method executed by at least one processor executing computer-readable instructions, including, with the at least one processor executing the instructions, distributing a first video including an animation of an avatar of a distributor generated on the basis of motion data related to motion of the distributor or the motion data, toward terminal devices of a plurality of viewers via a communication line; distributing, a second video related to a game generated by a terminal device of the distributor on the basis of operation data related to operation of the distributor using a received web page, toward the terminal devices of the plurality of viewers via the communication line; and receiving, from the terminal device of the distributor, the second video including a game object, a control parameter related to the game object having been calculated on the basis of at least one viewing parameter related to viewing of at least one viewer out of a plurality of viewers viewing the second video."

In the method according to a twenty eighth aspect of the disclosed technology, "the communication line includes the Internet" in the twenty seventh aspect.

In the method according to a twenty ninth aspect of the disclosed technology, "the at least one processor includes a central processing unit (CPU), a microprocessor, and/or, a graphics processing unit (GPU)" in one of the preceding aspects.

A method according to a thirtieth aspect of the disclosed technology can be "a method executed by at least one processor executing computer-readable instructions, including, with the at least one processor executing the instructions, transmitting a web page including a computer program to a terminal device of a distributor, wherein the terminal device is configured to: distribute a first video including an animation of an avatar of the distributor generated on the basis of motion data related to motion of the distributor or the motion data, toward terminal devices of a plurality of viewers via a communication line; and distribute, a second video related to a game generated on the basis of operation data related to operation of the distributor using a received web page, toward the terminal devices of the plurality of viewers via the communication line, wherein the computer program is configured to cause the terminal device of the distributor to: obtain, via the communication line, at least one viewing parameter related to viewing of at least one viewer out of the plurality of viewers; extract a game object to be controlled among a plurality of game objects used in the game; and calculate a control parameter related to the game object."

In the method according to a thirty first aspect of the disclosed technology, "the communication line includes the Internet" in the thirtieth aspect.

In the method according to a thirty second aspect of the disclosed technology, "the at least one processor includes a central processing unit (CPU), a microprocessor, and/or, a graphics processing unit (GPU)" in one of the preceding aspects.

III. Third Embodiment

1. Configuration of Video Distribution System

In a video distribution system disclosed in the present application, simply put, a user who performs distribution (hereinafter referred to as "distributor") can distribute, by using his terminal device, the first video and the second video to a terminal device of a user who views the video (hereinafter referred to as "viewer") via a communication line. The first video is a video including an animation of an avatar generated on the basis of motion data regarding the motion of the distributor. The second video is a video regarding a game generated on the basis of operation data regarding the operation of the distributor.

The viewer who viewed the second video distributed by the distributor can acquire a game object (acquired game object) usable in a specific game as a subsequent distributor. Such subsequent distributor can distribute a third video and a fourth video to the terminal device of the viewer via the communication line. The third video is a video including an animation of an avatar generated on the basis of motion data regarding the motion of the subsequent distributor. The fourth video is a video regarding the specific game generated on the basis of operation data regarding the operation of the subsequent distributor. The subsequent distributor can use the acquired game object in the specific game described above.

Figure 17:
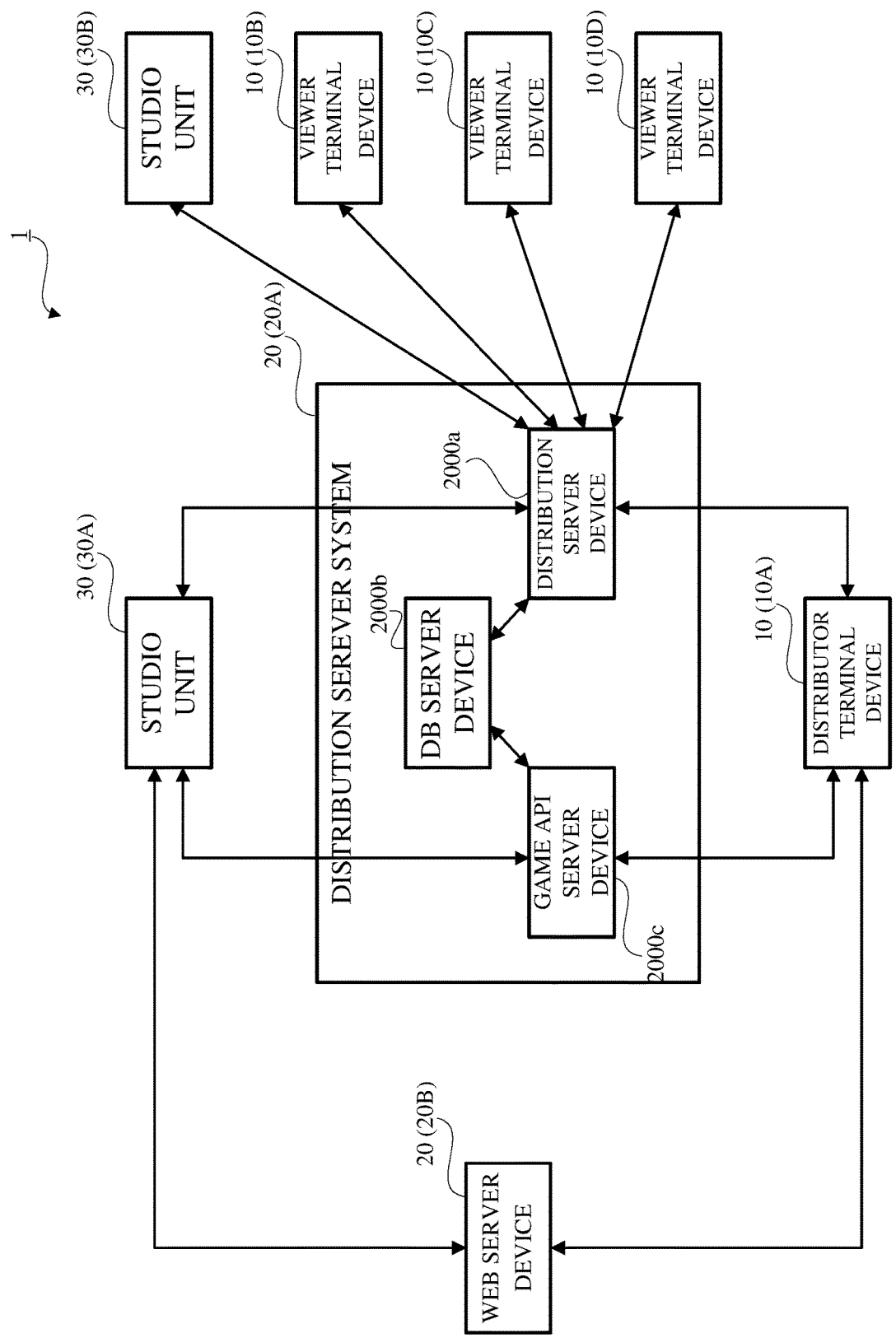
FIG. 17 is a block diagram showing an example of the configuration of the video distribution system according to an embodiment.

FIG. 17 is a block diagram showing an example of the configuration of the video distribution system according to an embodiment. As shown in FIG. 17, the video distribution system 1 can include a plurality of terminal devices 10 connected to a communication line (communication network) not illustrated, and one or more server devices 20 connected to the communication line. Each terminal device 10 can be connected to one or more server devices 20 via the communication line.

Additionally, as the plurality of terminal devices 10, FIG. 17 shows, for example, terminal devices 10A to 10D, but one or more terminal devices 10 other than them can be used similarly. Similarly, FIG. 17 shows as one or more server devices 20, for example, server devices 20A and 20B, but one or more server devices 20 other than them can be used similarly. The communication line (not shown) can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

In an embodiment, the video distribution system 1 can include one or more studio units 30 connected to the communication line. Each studio unit 30 can be connected to one or more server devices 20 or the plurality of terminal devices 10 via the communication line. Additionally, as one or more studio units 30, FIG. 17 shows, for example, studio units 30A and 30B, but one or more studio units 30 other than them can be used similarly. Each studio unit 30 can have a similar function to that of the terminal device 10 described later or the server device 20.

In order to simplify the description, attention will be paid to a case in which one or the plurality of server devices 20 transmit/receive videos, token data, and the like to/from each terminal device 10. In place of this or in addition to this, as will be described later, one or the plurality of server devices 20 can also transmit/receive videos, token data, and the like to/from each studio unit 30. In place of this or in addition to this, as will be described later, the studio unit 30 can also transmit/receive videos, token data, and the like to/from each terminal device 10.

1-1. Terminal Device 10

The plurality of terminal devices 10 can include one or more distributor terminal devices 10 (here, terminal device 10A) and one or more viewer terminal devices 10 (here, terminal device 10B to the terminal device 10D). Each terminal device 10 has a common configuration and can thus be either a terminal device (terminal device 10 of the distributor) for distributing a video or a terminal device (terminal device 10 of the viewer) for viewing a video.

In a case of operating as a terminal device (distributor terminal device) for distributing a video, each terminal device 10 can execute an installed video distribution application (may also be middleware or a combination of an application and middleware. The same shall apply hereinafter). Thus, each terminal device 10 can acquire motion data regarding the motion of the distributor, and can transmit, to the server device 20 (distribution server system 20A) via the communication line, the first video including an animation of a virtual character (avatar) changed according to the acquired data. Such the first video is distributed by the server device 20 (distribution server system 20A) to the terminal device (viewer terminal device) 10 for receiving the video via the communication line. Such the terminal device 10 of the viewer can receive a video by executing an installed video viewing application (may also be middleware or a combination of an application and middleware. The same shall apply hereinafter).

When operating as a terminal device of the distributor, each terminal device 10 can execute a browser function incorporated in the installed video distribution application and/or execute an installed web browser application. This allows each terminal device 10 to receive a web page (for example, an HTML document, including in some examples, HTML documents encoding code such as JavaScript or PHT code) from the server device 20 (web server device 20B) and execute a game program included in this web page. By executing the game program, each terminal device 10 can generate a second video in which at least one game object is caused to act on the basis of operation data related to an operation of the distributor.

When operating as a terminal device of the distributor, each terminal device 10 can transmit, by executing the video distribution application, the second video thus generated to the server device 20 (distribution server system 20A) via the communication line. Such the second video is also distributed by the server device 20 (distribution server system 20A) via a communication line to a terminal device (terminal device of the viewer) 10 for receiving a video which executes an installed video viewing application.

Furthermore, when operating as a distributor terminal device, by executing the above-described video distribution application, each terminal device 10 can receive, via the server device 20 (distribution server system 20A), from the terminal device 10 of the viewer viewing the second video (distributed by the terminal device 10 of this distributor), token data indicative of giving a token to this distributor, and/or comment data indicative of transmitting a comment to this distributor.

On the other hand, when operating as a terminal device (viewer terminal device) for viewing a video, by executing the installed video viewing application, each terminal device 10 can receive, via the server device 20 (distribution server system 20A), the first video and/or the second video distributed by the terminal device 10 of the distributor.

When operating as a distributor terminal device, by executing the video viewing application, each terminal device 10 can transmit, via the server device 20 (distribution server system 20A) to the terminal device 10A of this distributor, token data indicative of giving a token to the distributor, and/or comment data indicative of transmitting a comment to this distributor.

Additionally, the above-described video distribution application and video viewing application can be installed and executed in each terminal device 10 as one integrated application or as separate applications.

Each terminal device 10 is any terminal device capable of executing such operation, and can include a smartphone, a tablet, a mobile phone (feature phone), and/or a personal computer, without being limited thereto.

1-2. Server Device 20

FIG. 17 shows the server system 20A and the web server device 20B as one or the plurality of server devices 20 as an example.

The distribution server system 20A can distribute the first video and/or the second video transmitted by each terminal device (terminal device of each distributor) 10 to each terminal device (terminal device of each viewer) 10. Furthermore, the distribution server system 20A can transmit, to the terminal device 10 of a certain distributor, token data indicative of giving a token to the distributor and/or comment data indicative of transmitting a comment to the distributor that have been transmitted by each terminal device (terminal device of each viewer) 10.

In order to execute such operation, the distribution server system 20A, in an embodiment, can include a distribution server device 2000a, a database (DB) server device 2000b, and a game API server device 2000c that are interconnected via a communication line (including a wireless line and/or a wired line that are not shown).

The distribution server device 2000a can distribute, to each terminal device 10, the first video and/or the second video transmitted by the terminal device 10 of each distributor. Furthermore, the distribution server device 2000a can store, into the DB server device 2000b, the token data and/or the comment data transmitted by the terminal device 10 of each viewer.

The DB server device 2000b can store the token data and/or the comment data received from the distribution server device 2000a, read the token data and/or the comment data inquired by the game API server device 2000c, and transmit them to the game API server device 2000c.

When receiving an inquiry about token data and/or comment data from the terminal device 10 of each distributor, the game API server device 2000c can read, from the DB server device 2000b, the token data and/or the comment data for the terminal device 10 of the distributor, and transmit them to the terminal device 10 of the distributor.

The example shown in FIG. 17 shows a configuration in which the distribution server system 20A has three server devices including the distribution server device 2000a, the DB server device 2000b, and the game API server device 2000c for the purpose of balancing the load. However, at least one server device of these three server devices may be integrated with at least one of the remaining server devices.

Next, the web server device 20B can transmit, to the terminal device 10 of each distributor having accessed, a web page (document created according to HTML, for example, HTML5) in which a game program is incorporated. This game program can cause the terminal device 10 having received and decoded the game program to execute various operations related to the distribution of the video, including the operations exemplified below.

Operation of executing the game

Operation of transmitting, to the distribution server system 20A (distribution server device 2000a), a game screen generated in accordance with execution of the game Operation of acquiring, from the distribution server system 20A (game API server device 2000c), the token data and/or comment data transmitted to this distributor 1-3. Studio Unit 30

The studio unit 30 can be placed in a studio, a room, a hall, or the like that is a place where the distributor (performer) distributes a video. As described above, the studio unit 30 can perform the same function as that of the terminal device 10 and/or the server device 20.

2. Hardware Configuration of Each Device

Next, an example of the hardware configuration of each of the terminal device 10, the server device 20, and the studio unit 30 will be described.

2-1. Hardware Configuration of Terminal Device 10

An example of the hardware configuration of each terminal device 10 will be described with reference again to FIG. 2, which was referred to with respect to the first and second embodiments above. FIG. 2 is a block diagram schematically showing an example of the hardware configuration of the terminal device 10 (server device 20) shown in FIG. 9 (in FIG. 2, reference numerals in parentheses are provided in relation to the server device 20, as will be described later).

As shown in FIG. 2, each terminal device 10 can mainly include a central processing unit 11, a main storage device 12, an input/output interface device 13, an input device 14, an auxiliary storage device 15, and an output device 16. These devices are interconnected via a data bus and/or a control bus.

The central processing unit 11, which is referred to as a "CPU", can perform operations on instructions and data stored in the main storage device 12, and store the results of the operations in the main storage device 12. Furthermore, the central processing unit 11 can control the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 2 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a capacity larger than that of the main storage device 12. It is possible to store instructions and data (computer programs) constituting the above-described specific applications (video distribution application, video viewing application, and the like), web browser applications, and the like. By being controlled by the central processing unit 11, the auxiliary storage device 15 can transmit these instructions and data (computer program) to the main storage device 12 via the input/output interface device 13. The auxiliary storage device 15 can include a magnetic disk device and/or an optical disk device, without being limited thereto.

The input device 14 is a device that fetches data from the outside, and can include a touch screen, a button, a keyboard, a mouse, and/or a sensor, without being limited thereto. The sensor can include a sensor including one or more cameras or the like and/or one or more microphones or the like, without being limited thereto, as described below.

The output device 16 can include a display device, a touch screen, and/or a printer device, without being limited thereto.

With such hardware configuration, the central processing unit 11 can sequentially loads, into the main storage device 12, an instruction and data (computer program) constituting a specific application stored in the auxiliary storage device 15, and calculate the loaded instruction and data. Thus, the central processing unit 11 can control the output device 16 via the input/output interface device 13 or transmit/receive various data to/from another device (e.g., server device 20, other terminal device 10, studio unit 30, and/or like) via the input/output interface device 13 and a communication network 2.

Thus, by executing the installed specific application, the terminal device 10 can execute at least one operation of the following operations exemplified below, for example (including various operations described in detail later).

Operation used for distributing the first video and/or the second video

Operation used for receiving the token data and/or the comment data transmitted from another terminal device 10 to the own terminal device 10

Operation used for receiving the first video and/or the second video distributed by another terminal device 10

Operation used for transmitting token data and/or comment data to another terminal device 10

The terminal device 10 can include one or more microprocessors and/or graphics processing units (GPU) in place of the central processing unit 11 or together with the central processing unit 11.

2-2. Hardware Configuration of Server Device 20

An example of the hardware configuration of each server device 20 will be described with reference to FIG. 2 similarly. The hardware configuration of each server device 20 (each of distribution server device 200*a*, DB server device 200*b*, game API server device 200*c*, and web server device 20B) can be, for example, one identical to the hardware configuration of each terminal device 10 described above.

Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 may be substantially identical to the central processing unit 11, the main storage device 12, the input/output interface device 13, the input device 14, the auxiliary storage device 15, and the output device 16, respectively, included in each terminal device 10 described above.

With such hardware configuration, the central processing unit 21 can sequentially loads, into the main storage device 22, an instruction and data (computer program) constituting a specific application stored in the auxiliary storage device 25, and calculate the loaded instruction and data. Thus, the central processing unit 21 can control the output device 26 via the input/output interface device 23 or transmit/receive various data to/from another device (e.g., other terminal device 10, studio unit 30, and/or like) via the input/output interface device 23 and the communication network 2.

Thus, the server device 20 can execute at least one operation of the following operations exemplified below, for example (including various operations described in detail later).

Operation used for distributing, to the terminal device 10 of each viewer, the first video and/or the second video transmitted by the terminal device 10 of each distributor Operation used for transmitting, to the terminal device 10 of the distributor, token data and/or comment data transmitted by the terminal device 10 of each viewer to the terminal device 10 of a certain distributor The server device 20 can include one or more microprocessors and/or graphics processing units (GPU) in place of the central processing unit 21 or together with the central processing unit 21.

2-3. Hardware Configuration of Studio Unit 30

As described above, the studio unit 30 can perform the same function as that of the terminal device 10 and/or the server device 20. Therefore, the studio unit 30 can have a similar hardware configuration to that of the above-described terminal device 10 or the server device 20.

3. Functions of Each Device

Next, an example of the function of each of the terminal device 10, the server device 20, and the studio unit 30 will be described.

3-1. Functions of Terminal Device 10

Figure 18:
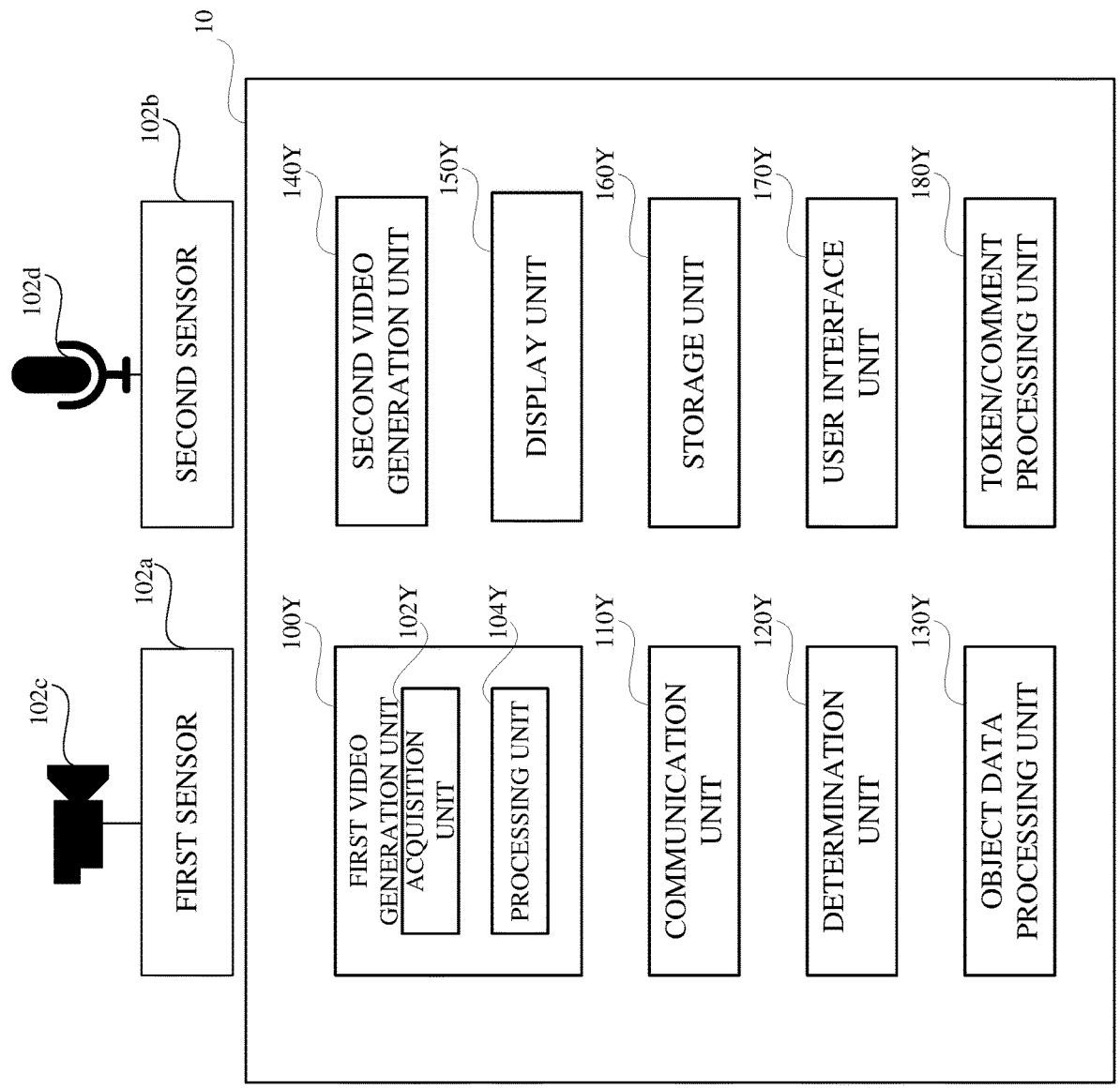
FIG. 18 is a block diagram schematically showing an example of a function of the terminal device 10 shown in FIG. 17.

An example of the function of the terminal device 10 will be described with reference to FIG. 18. FIG. 18 is a block diagram schematically showing an example of a function of the terminal device 10 shown in FIG. 17.

As shown in FIG. 18, the terminal device 10 can mainly include a first video generation unit 100Y, a communication unit 110Y, a determination unit 120Y, an object data processing unit 130, a second video generation unit 140Y, a display unit 150Y, a storage unit 160Y, a user interface unit 170Y, and a token/comment processing unit 180Y.

(1) First Video Generation Unit 100Y

The first video generation unit 100Y can generate the first video (third video) including an animation of an avatar of a distributor on the basis of motion data regarding the motion of the distributor. In order to realize this, the first video generation unit 100Y can include an acquisition unit 102Y and a processing unit 104Y, for example.

The acquisition unit 102Y can include one or more first sensors 102*a* that acquire data regarding the body of the distributor, and one or more second sensors 102*b* that acquire voice data regarding an utterance and/or singing emitted by the distributor.

In a preferred embodiment, the first sensor 102*a* can include an RGB camera that captures visible light and a near infrared camera that captures near infrared rays. As such a camera, it is possible to use a camera included in a True Depth camera of iPhone X (registered trademark), for example. The second sensor 102*b* can include a microphone to record voice. First, as for the first sensor 102*a*, the acquisition unit 102Y captures the body of the distributor by using the first sensor 102*a* placed close to the body of the distributor. Thus, the acquisition unit 102Y can generate data (e.g., MPEG file) in which an image acquired by the RGB camera is recorded over a unit time in association with a time code (code indicating the time acquired). The acquisition unit 102Y can generate data (e.g., TSV file) in which a numerical value (e.g., numerical value of floating point number) indicating a predetermined number (e.g., 51) of depths acquired by the near-infrared camera is recorded over a unit time in association with the time code. The TSV file is a file in a format where a plurality of data are recorded with data separated by tabs.

As for the near-infrared camera, specifically, a dot projector radiates, to the body of the performer, an infrared laser that forms a dot pattern, and the near-infrared camera captures the infrared dots projected and reflected on the body of the performer and generates an image of the infrared dots thus captured. The acquisition unit 102Y can compare an image of the dot pattern emitted by the dot projector registered in advance with an image captured by the near infrared camera. Thus, the acquisition unit 102Y can calculate the depth (distance between each point or each feature point and the near-infrared camera) of each point (each feature point) by using the positional deviation at each point (each feature point) (e.g., each of 51 points and feature points) in the both images. The acquisition unit 102Y can generate data in which a numerical value indicating the thus calculated depth is recorded over a unit time in association with the time code as described above. The camera (s) that the first sensor 102a has is indicated with the reference sign 102c.

Next, as for the second sensor 102b, the acquisition unit 102Y acquires voice related to an utterance and/or singing emitted by the distributor using the second sensor 102b placed close to the body of the distributor. The second sensor 102b can include at least one microphone 102d. Thus, the acquisition unit 102Y can generate data (e.g., MPEG file) recorded over a unit time in association with a time code. In an embodiment, the acquisition unit 102Y can acquire data regarding the body of the distributor using the first sensor 102a, and at the same time, acquire voice data regarding an utterance and/or singing emitted by the distributor using the second sensor 102b. In this case, the acquisition unit 102Y can generate data (e.g., MPEG file) in which an image acquired by the RGB camera and voice data related to speech and/or vocal given by the distributor using the second sensor 102b are recorded over a unit time in association with an identical time code.

The acquisition unit 102Y can output, to the processing unit 104Y, the data (MPEG file, TSV file, or the like) related to the body of the distributor thus generated, as motion data, and/or the voice data (MPEG file or the like) related to the utterance and/or singing emitted by the distributor.

For example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be capture with an image capture devices (such as a CCD (charge-coupled device) or CMOS (complementary metal oxide semiconductor) image sensor) coupled to a computer that transforms the motion data into video or other image data.

The case where the first sensor 102a includes an RGB camera and an infrared camera has been described here. However, the first sensor 102a can include, for example, any of the following (A) to (C).

(A) A camera that detects infrared rays emitted by an infrared laser and reflected on the face of the performer
(B) A plurality of RGB cameras that capture visible light
(C) A single camera that captures visible light In the case of (A) above, the acquisition unit 102Y can calculate the depth for each feature point in the body of the distributor by the same method as that described above. In the case of (B) above, the acquisition unit 102Y can calculate the depth of each feature point of the body of the distributor using a plurality of images captured by a plurality of RGB cameras. In the case of (C) above, the acquisition unit 102Y can calculate, by using deep learning or the like, the depth of each feature point in the body of the distributor from an image captured by a single camera. In the case of (C) above, the acquisition unit 102Y can calculate the depth of each feature point of the body of the performer by analysis processing (image processing and the like) for the image captured by the single camera.

The processing unit 104Y can generate a video including an animation of a virtual character (avatar of the distributor) on the basis of the data regarding the body of the distributor from the acquisition unit 102Y. As for the video itself of the virtual character, the processing unit 104Y can generate the video of the virtual character by causing a rendering unit not illustrated to execute rendering using various data (e.g., geometry data, bone data, texture data, shader data, blend shape data, and so on) stored in a character data storage unit not illustrated.

By using various known techniques, the processing unit 104Y can generate a video (e.g., a video in which the facial expression of the avatar changes in synchronization with the movement of the mouth and both eyes of the performer, e.g., a video in which the facial expression of the avatar changes in response to lip-sync and gaze tracking with respect to the face of the performer) in which the facial expression of the avatar or the like is changed by using the data (data regarding the depth of each feature point in the body of the performer) related to the body of the distributor from the acquisition unit 102Y.

Any other known technique can be used for generating the first video including an animation of the avatar of the distributor on the basis of the motion data regarding the motion of the distributor. Such well-known technology includes a technique referred to as "blend shapes" described in a website specified by the following URL.

https://developer.apple.com/documentation/arkit/arface-anchor/2928251-blendshapes When using this technique, the processing unit 104Y can adjust each parameter of one or more feature points corresponding to the motion of the distributor among a plurality of feature points of the upper body (face or the like) of the distributor. This allows the processing unit 104Y to generate a video of a virtual character that follows the action of the distributor.

(2) Communication Unit 110Y

The communication unit 110Y can communicate various data used for distribution and/or viewing of a video between the distribution server system 20A and the web server device 20B. For example, when the terminal device 10 operates as the terminal device 10 of a certain distributor (e.g., distributor A), the communication unit 110Y can access the web server device 20B and receive a web page (HTML document) or the like containing a game program used for executing a game or the like. When the terminal device 10 operates as the terminal device of the distributor A, the communication unit 110Y can receive object data from the distribution server system 20A. Here, when a certain viewer (e.g., the viewer B) views the second video distributed by the distributor A, the object data can include data regarding a game object (acquired game object) usable in a specific game given to the distributor A and/or the viewer B. Specifically, for example, the object data can include the following data.

Data identifying the game object (acquired game object)
Data identifying the user (distributor A and/or viewer B) to whom the acquired game object has been given
Data identifying the specific game for which the acquired game object is usable Furthermore, when the terminal device 10 operates as the terminal device of the distributor A, the communication unit 110Y can transmit the first video and/or the second video to the distribution server system 20A, and can receive, from the distribution server system 20A, the token data and/or the comment data transmitted to this distributor A.

Furthermore, when the terminal device 10 operates as the terminal device of the viewer B, the communication unit 110Y can receive, from the distribution server system 20A, the first video and/or the second video transmitted by the terminal device 10 of the distributor A, and transmit token data and/or comment data for the distributor A to the distribution server system 20A.

When the terminal device 10 operates as the terminal device of the viewer B, the communication unit 110Y can receive object data from the distribution server system 20A. Here, when the viewer B views the second video distributed by the distributor A, the object data can include data regarding a game object (acquired game object) usable in a specific game given to the viewer B. Specifically, for example, the object data can include the following data.

Data identifying the game object (acquired game object)
Data identifying the specific game for which the acquired game object is usable The communication unit 110Y may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

(3) Determination Unit 120Y

When the terminal device 10 operates as the terminal device of the viewer B, the determination unit 120Y can determine whether or not the object data has been received. Here, the object data is data regarding a game object (acquired game object) that has been given to the viewer B by receiving the second video distributed by the terminal device 10 of the distributor A and can be used as a subsequent distributor by the viewer B in a specific game.

If the determination unit 120Y determines that the object data has been received, it is possible to cause the display unit 150Y to display that the acquired game object is usable in a specific game. The determination unit 120Y can be implemented with a processor coupled to a memory storing computer-readable instructions executed by the processor.

(4) Object Data Processing Unit 130Y

When the terminal device 10 operates as the terminal device of the distributor A, the object data processing unit 130Y, when receiving object data from the distribution server system 20A, can identify, for example, the following data using the received object data.

Game object (acquired game object)
User (distributor A and/or viewer B) to whom the acquired game object is given
Specific game for which the acquired game object is usable
Parameters set for acquired game object (e.g., if the acquired game object is a point, reward, and the like, their values. If the acquired game object is an item, equipment, a character, and the like, their values, attack power, defense power, mobility, and the like)

When the terminal device 10 operates as the terminal device of the viewer B, the object data processing unit 130Y, when receiving object data from the distribution server system 20A, can identify, for example, the following data using the received object data.

Game object (acquired game object)
Specific game for which the acquired game object is usable
Parameters set for acquired game object (e.g., if the acquired game object is a point, reward, and the like, their values. If the acquired game object is an item, equipment, a character, and the like, their values, attack power, defense power, mobility, and the like)

Figure 26:
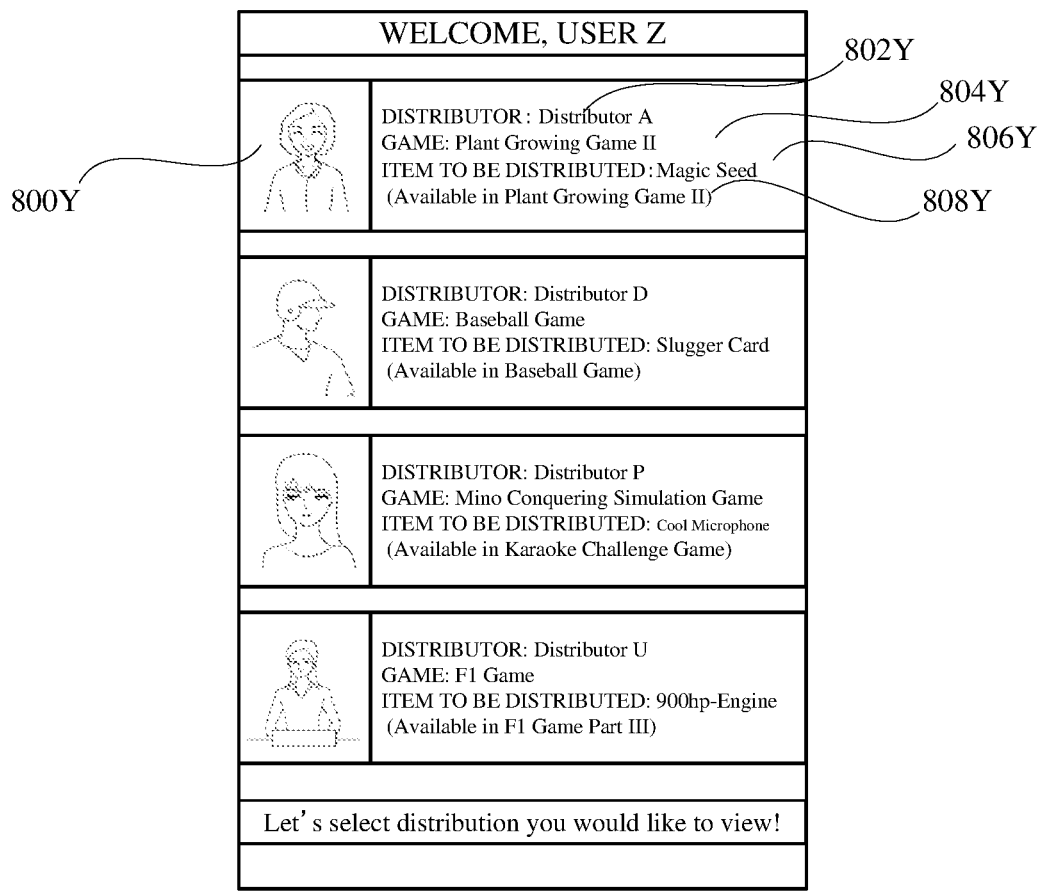
FIG. 26 is a view showing an example of a screen shown in the terminal device of each viewer used in the video distribution system 1 shown in FIG. 17.

Thus, the object data processing unit 130Y can display, on the display unit 150Y, which game object is available in which game so as to present it to the viewer. An example of it is shown in FIG. 26. As illustrated in FIG. 26, an outline of the first video and/or the second video (that may be a video to be distributed) distributed by a plurality of distributors can be displayed in a thumbnail display format on the display unit 150Y of the terminal device 10 of a user Z, who is a viewer. For the distributor A, an avatar 800Y of the distributor A, information 802Y (distributor A) specifying the handle of the distributor A, information 804Y (plant growing game II) specifying the game being distributed by the distributor A, information 806Y (magic seed) specifying the game object to be distributed (given) by viewing this video, and the like can be displayed. Furthermore, information 808Y (plant growing game II) specifying the game in which the game object distributed by viewing this video can be used may be displayed.

If the user Z selects an object or the like corresponding to the distributor A, the display unit 130Y of the terminal device 10 of the user Z may display a screen showing details (e.g., comment of the distributor A, data regarding the distributor A, data regarding the game being distributed, and the like) of the second video being distributed by the distributor A. Also this screen can display the information 806Y (magic seed) specifying the game object to be distributed (given) by viewing this video illustrated in FIG. 26. In addition to this, the information 808Y (plant growing game II) specifying the game for which the game object distributed by viewing this video can be used may be displayed.

This allows each viewer to efficiently discover and collect game objects (items and the like) the viewer wants.

When the terminal device 10 executes a game in order to distribute the second video (fourth video), the object data processing unit 130Y can recognize whether the acquired game object can be used in the game (in that case, the terminal device 10 can use the acquired game object identified in accordance with the object data in the game, in accordance with the parameter set for the acquired game object). The object data processing unit 130Y can be implemented with a processor coupled to a memory storing computer-readable instructions executed by the processor.

(5) Second Video Generation Unit 140Y

The second video generation unit 140Y can generate the second video (or fourth video) regarding the game on the basis of the operation data regarding the operation of the distributor by using the web page received from the web server device 20B.

Specifically, the second video generation unit 140Y executes a game program incorporated in the web page received from the web server device 20B. Thus, the second video generation unit 140Y can render the second video (game video) related to the game on the basis of the operation data indicating the operation of the distributor input by the user interface unit 180Y and at least one game object in which the related control parameter has been calculated by the control parameter calculation unit 130Y. For example, the operation data can include one or more of the following: data indicative of how the distributor has swiped a touch pad display, data indicative of which object the distributer has tapped or clicked, or data indicative of how the distributor has dragged a touch pad display, or other such operation data.

(6) Display Unit 150Y

The display unit 150Y can display various data used for distribution and/or viewing of a video. For example, the display unit 150Y can display the first video (third video) to be distributed and/or the second video (fourth video) to be distributed, the first video (third video) having been received and/or the second video (fourth video) having been received, and/or the like.

(7) Storage Unit 160Y

The storage unit 160Y can store various data used for distribution and/or viewing of a video using computer-readable memory or storage devices.

(8) User Interface Unit 170Y

The user interface unit 170Y can input various data used for distribution and/or viewing of the video through a user operation. For example, the user interface unit 170Y can input, from the distributor, operation data indicating the contents of the operation by the distributor when executing the game, and output the data to the second video generation unit 140Y. The user interface unit 170Y may include a touch input device, such as a keyboard, keypad, mouse, touch screen display, pen, or trackball, a voice input device, a camera, an image sensor, a scanning device, or another device, that provides user input.

(9) Token/Comment Processing Unit 180Y

The token/comment processing unit 180Y can process token data and/or comment data transmitted/received regarding distribution and/or viewing of a video. For example, when the terminal device 10 operates as the terminal device 10 of the distributor A (or subsequent distributor B), the token/comment processing unit 180Y can process the token data and/or the comment data transmitted to this distributor A (or subsequent distributor B).

When the terminal device 10 operates as the terminal device 10 of the viewer B, the token/comment processing unit 180Y can process the token data and/or comment data to be transmitted by this viewer. The token/comment processing unit 180Y can be implemented with a processor coupled to a memory storing computer-readable instructions executed by the processor.

3-2. Functions of Server Device 20

Figure 19:
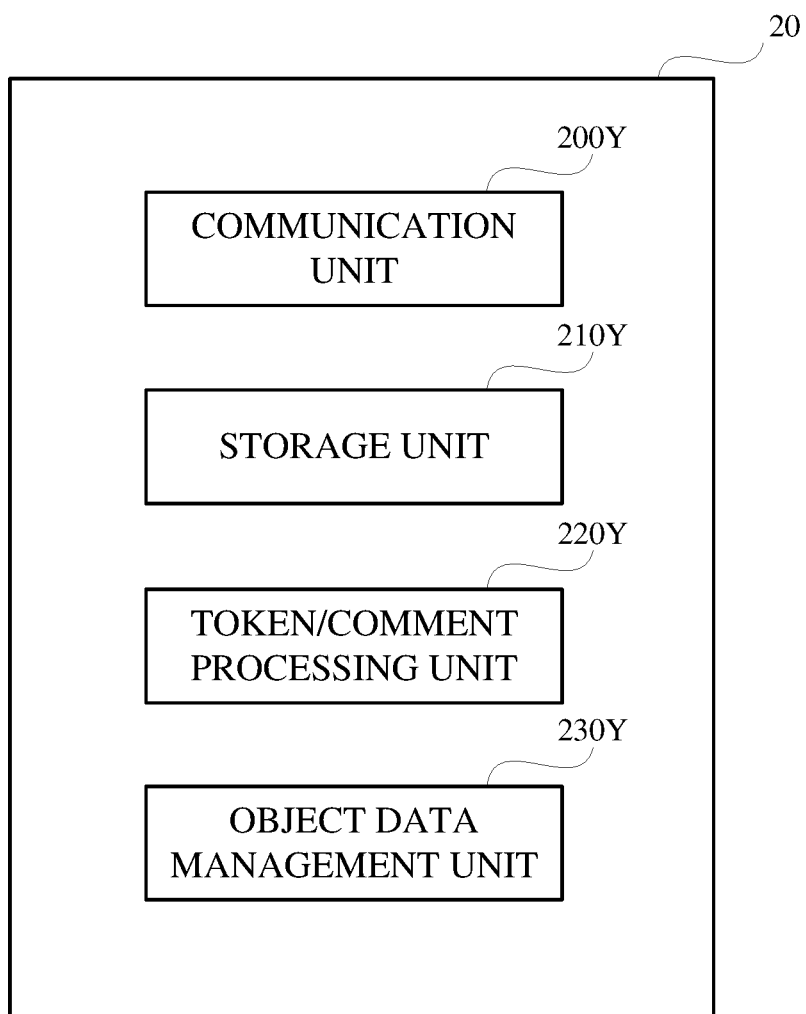
FIG. 19 is a block diagram schematically showing an example of a function of the server device 20 shown in FIG. 17.

An example of the function of the server device 20 will be described with reference to FIG. 19. FIG. 19 is a block diagram schematically showing an example of a function of the server device 20 shown in FIG. 17. As shown in FIG. 19, the server device 20 can mainly include a communication unit 200Y, a storage unit 210Y, a token/comment processing unit 220Y, and an object data management unit 230Y. These may be included in any one of the distribution server device 2000a, the DB server device 2000b, and the game API server device 2000c constituting the distribution server system 20A, or may be included redundantly or dispersedly in at least one server device of the distribution server device 2000a, the DB server device 2000b, and the game API server device 2000c.

The communication unit 200Y can communicate various data used for distribution and/or viewing of a video between the terminal device 10 of the distributor and/or the terminal device 10 of the viewer. For example, when operating as the distribution server system 20A, the server device 20 can receive the first video (third video) and/or the second video (fourth video) from the terminal device 10 of each distributor (each subsequent distributor) and can distribute the received video to the terminal device 10 of each viewer. When operating as the web server device 20B, the server device 20 can transmit, to the terminal device 10 of each distributor (each subsequent distributor) having accessed, a web page in which a game program is incorporated.

The storage unit 210Y can store various data used for distribution and/or viewing of a video, the various data received from the communication unit 200Y, the token/comment processing unit 220Y, and/or the viewing management unit 230Y.

The token/comment processing unit 220Y can process the token data and/or the comment data transmitted from each viewer to each distributor (each subsequent distributor).

The object data management unit 230Y can manage (generate, set, and the like), for example, at least one piece of data of the following data for each distributor and each viewer, without being limited thereto.

(a1) Viewer who has started viewing (receiving) the second video distributed by each distributor (a2) Game object given to the distributor due to the event of (a1) above, and a specific game for which this game object can be used (a3) Game object given to the viewer due to the event of (a1) above, and a specific game for which this game object can be used (b1) Viewer who has completed viewing (receiving) the second video distributed by each distributor (b2) Game object given to the distributor due to the event of (b1) above, and a specific game for which this game object can be used (b3) Game object given to the viewer due to the event of (b1) above, and a specific game for which this game object can be used (c1) At least one parameter regarding the viewing by the viewer who viewed the second video distributed by each distributor (c2) Game object given to the distributor, determined in accordance with the at least one parameter, due to the event of (c1) above, and a specific game for which this game object can be used (c3) Game object given to the viewer, determined in accordance with the at least one parameter, due to the event of (c1) above, and a specific game for which this game object can be used In relation to (c1) above, the at least one parameter can include, for example, the following parameters.

Timing (date, time, and the like) at which the viewer viewed the second video

Total length of time in which the viewer viewed a second video

Giving data indicating that the viewer has given a token, comment, and/or an evaluation to the distributor The game object (acquired game object) given to the viewer can include, for example, items, equipment, points, rewards, coins, cards, and/or characters.

By using the thus managed data, the object data management unit 230Y can transmit object data to the distributor and/or the viewer to whom a game object (acquired game object) that can be used in a specific game is given.

The distribution server system 20A (in particular, distribution server device 2000a) is provided for the purpose of performing a function of distributing, to each terminal device 10 of the plurality of viewers, the second video (fourth video) transmitted by the terminal device 10 of each distributor.

Therefore, the distribution server system 20A (in particular, distribution server device 2000a) can recognize which viewer's terminal device 10 to transmit the second video (fourth video) from, and which viewer's terminal device 10 and when to have been distributed to. The distribution server system 20A (in particular, distribution server device 2000a) can also recognize as to when the token data, comment data, evaluation data, and/or the like were transmitted from the terminal device 10 of which viewer to the terminal device 10 of which distributor.

Therefore, by managing the history (log) of such distribution, the distribution server system 20A (in particular, distribution server device 2000a) can manage various data listed as described above.

When the server device 20 operates as the web server device 20B, the token/comment processing unit 220Y and the object data management unit 230Y may be omitted.

3-3. Function of Studio Unit 30

As described above, the studio unit 30 can perform the same function as that of the terminal device 10 and/or the server device 20. Therefore, the studio unit 30 can have the function of the terminal device 10 described with reference to FIG. 18 and/or the function of the server device 20 described with reference to FIG. 19.

4. Overall Operation of Video Distribution System 1

Figure 20A:
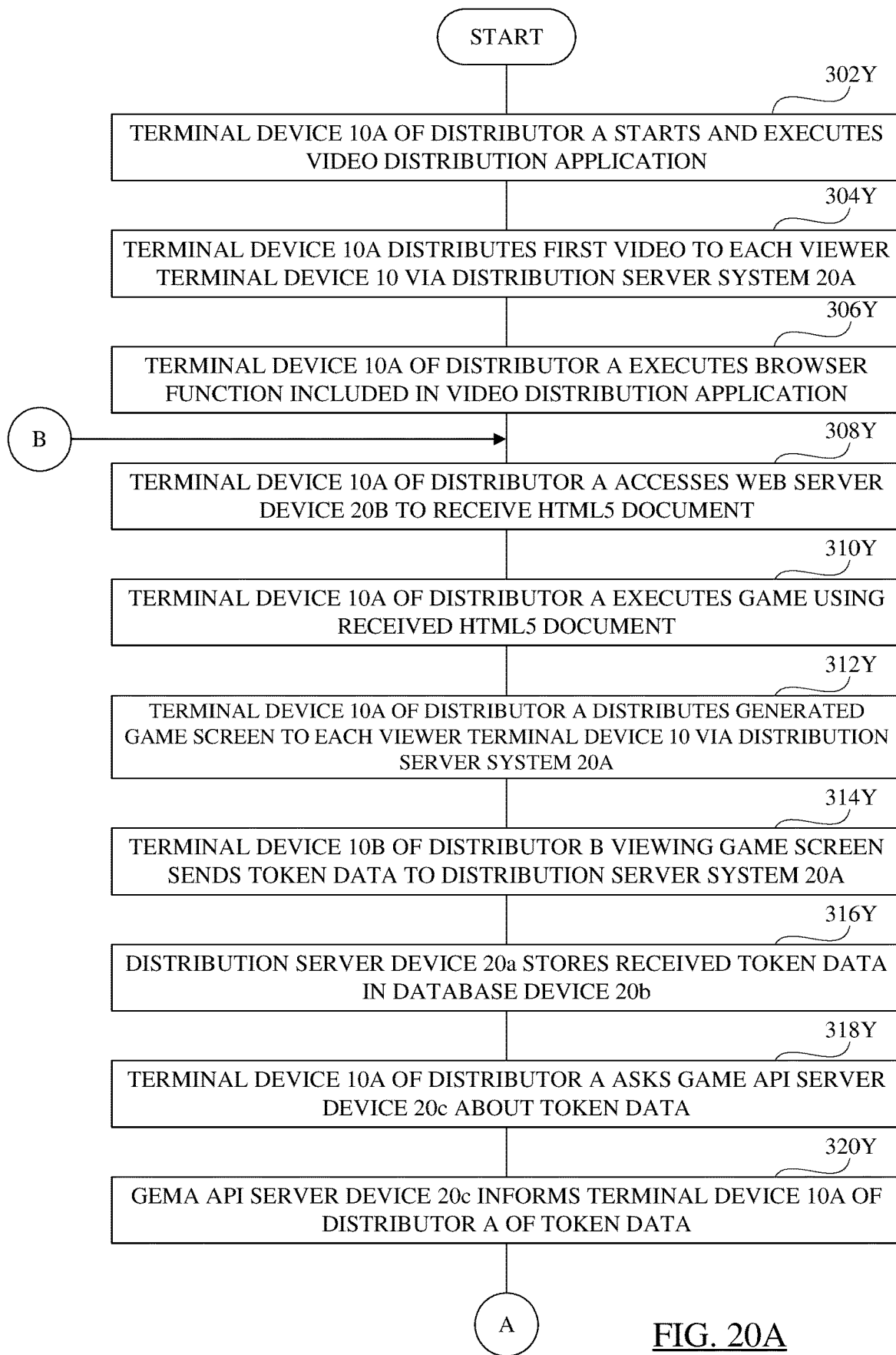
FIG. 20A is a flowchart showing an example of the operation performed in the video distribution system 1 shown in FIG. 17.
Figure 20B:
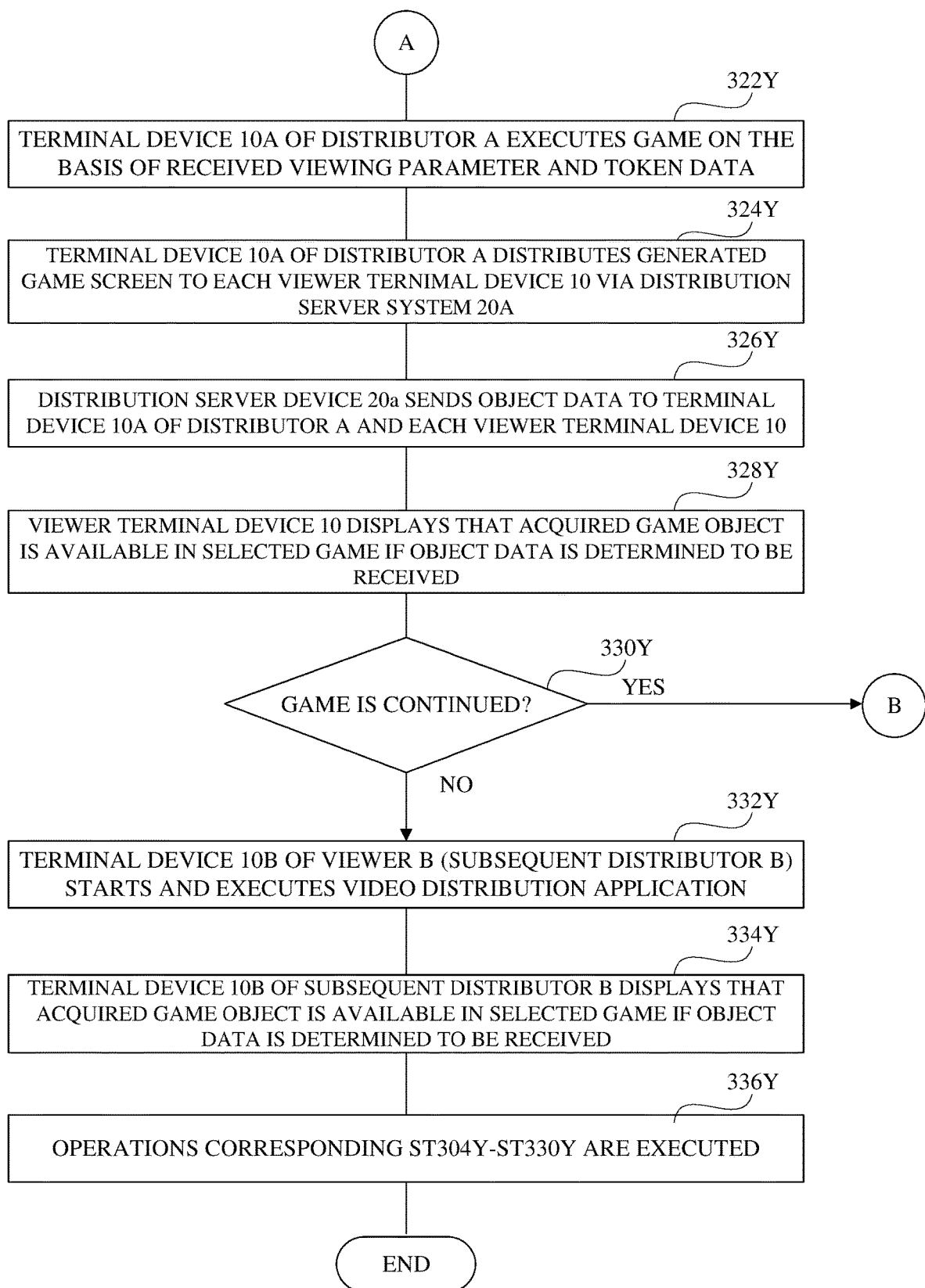
FIG. 20B is a flowchart showing an example of the operation performed in the video distribution system 1 shown in FIG. 17.

Next, the overall operation performed in the video distribution system 1 having the above configuration will be described with reference to FIGS. 20A and 20B. FIGS. 20A and 20B are flow diagrams showing an example of the operation performed in the video distribution system 1 shown in FIG. 17.

First, referring to FIG. 20A, in ST302Y, in response to the operation of the distributor (here, distributor A), the terminal device 10 (here, terminal device 10A) starts and executes the video distribution application.

Figure 21:
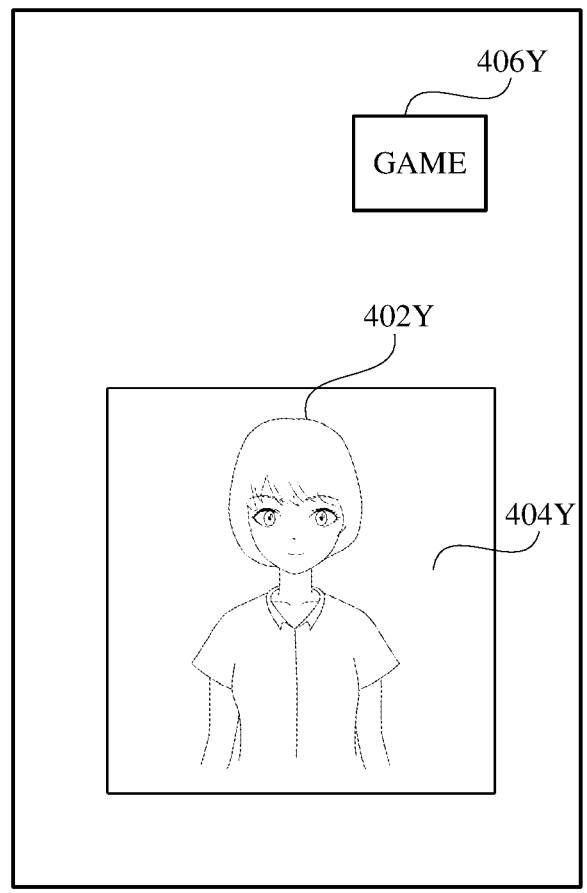
FIG. 21 is a view showing an example of the first video displayed on the terminal device 10 used in the video distribution system 1 shown in FIG. 17.

Next, in ST304Y, the terminal device 10A generates the first video including an animation of an avatar of the distributor A on the basis of the motion data regarding the motion of the distributor A. Thus, as illustrated in FIG. 21, a first video 404Y including an animation of an avatar 402Y of the distributor A is displayed on the display unit 150Y of the terminal device 10 A.

Returning to FIG. 20A, the terminal device 10A transmits the generated first video 404Y to the distribution server device 2000a of the distribution server system 20A. From the terminal device 10 of each viewer having accessed the distribution server device 2000a by executing the video viewing application, the distribution server device 2000a can receive a request signal for requesting the first video 404Y distributed by the terminal device 10A of the distributor A (the terminal device 10 of each viewer can also transmit the request signal by selecting the distribution of the distributor A via the screen illustrated in FIG. 26 as an example). In response to this request signal, the distribution server device 40a can distribute, to the terminal device 10 of each viewer executing the video viewing application, the first video 404Y received from the terminal device 10A. Thus, the (object data management unit 230Y of the) distribution server device 2000a can manage the date, time, and the like of the first video 404Y being distributed (and/or previously distributed) by the distributor A was viewed by each viewer. In this manner, the first video 404Y as illustrated in FIG. 21 is displayed also on the display unit 150Y of the terminal device 10 of each viewer.

Next, in ST306Y, the distributor A taps or the like an icon 406Y of "Game" (see FIG. 21) displayed on the display unit 150Y of the terminal device 10A. In response to this, the terminal device 10A executes the browser function equipped on the video distribution application. Thus, in ST308Y, the terminal device 10A can access the web server device 20B in a state of having executed the video distribution application (e.g., having distributed the first video 404Y to the terminal device 10 of each viewer). Therefore, the terminal device 10A can receive, from the web server device 20B, the HTML5 document in which the game program is incorporated.

Figure 22:
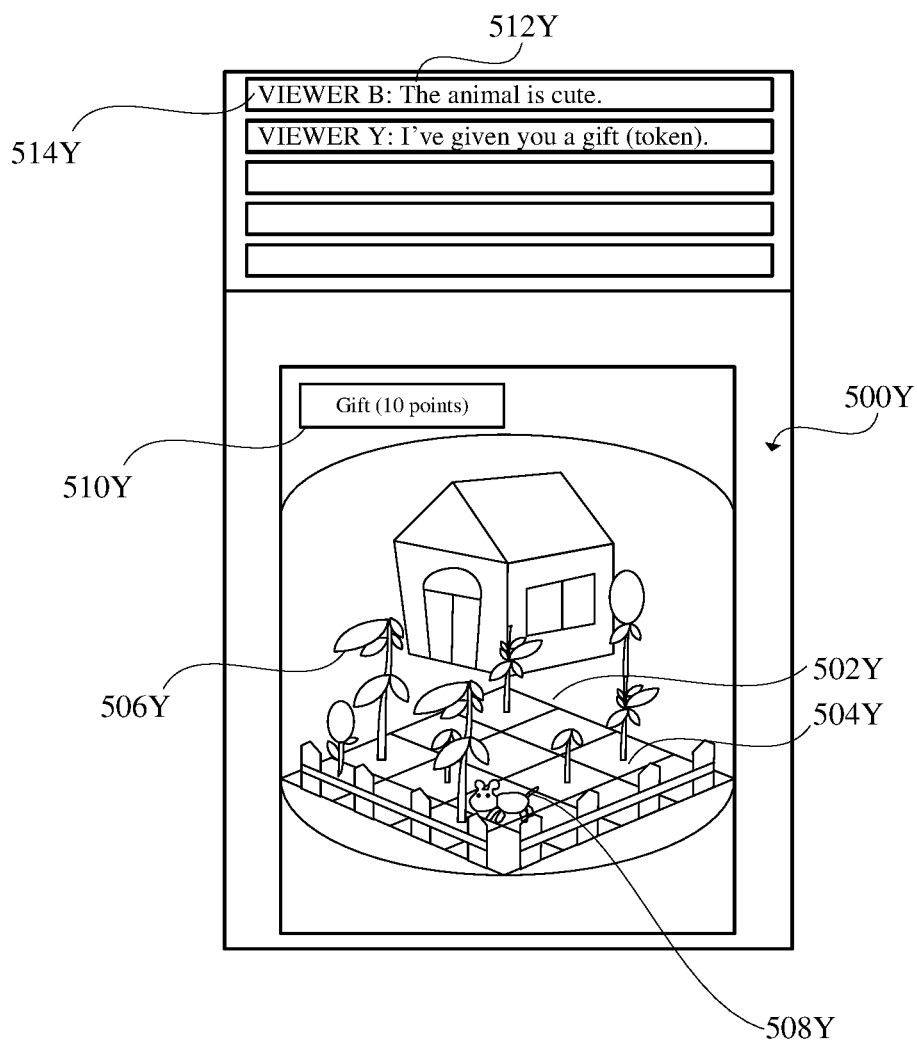
FIG. 22 is a view showing an example of the second video displayed on the terminal device 10 used in the video distribution system 1 shown in FIG. 17.

Next, in ST310Y, the terminal device 10A can generate a video (second video) regarding the game by executing the game program incorporated in the received HTML5 document. FIG. 22 shows an example of a second video 500Y thus generated by the terminal device 10A.

FIG. 22 is a view showing an example of the second video displayed on the terminal device 10 used in the video distribution system 1 shown in FIG. 17. FIG. 22 shows, as an example, the second video 500Y regarding a plant growing game for growing plants in a garden that is played by the distributor A.

In this game, the distributor A can grow and harvest a plant (e.g., plant 506Y) by seeding in a plurality of places 504Y (as an example, 16 places in FIG. 22) provided in his garden 502Y.

As growing a plurality of plants, an animal (e.g., animal 508Y) appears and lives in the garden 502Y of the distributor A. The game object corresponding to the thus living animal can be stored (registered) in association with the distributor A in the storage unit 160Y (and/or storage unit 210Y) as a game object owned by the distributor A.

Next, returning to FIG. 20A, in ST312Y, the terminal device 10A transmits the second video (game screen) 500Y generated in ST310Y to the distribution server device 2000a of the distribution server system 20A (Additionally, during transmitting the second video 500Y to the distribution server device 2000a of the distribution server system 20A, the terminal device 10A may stop transmitting the first video 404Y or may transmit the first video 404Y). The distribution server device 2000a distributes the second video received from the terminal device 10A to the terminal device 10 of each viewer executing the video viewing application and receiving the first video 404Y (in a case of receiving not only the second video 500Y but also the first video 404Y from the terminal device 10A, the distribution server device 2000a may transmit only the second video 500Y or both the second video 500Y and the first video 404Y to the terminal device 10 of each viewer). Thus, the (object data management unit 230Y of the) distribution server device 2000a can manage the date, total time, and the like of the second video being distributed (and/or previously distributed) by the distributor A was viewed by each viewer. Thus, the second video 500Y can be displayed also on the display unit 150Y of the terminal device 10 of each viewer (for example, in a state of being covered on the first video 404Y as illustrated in FIG. 21 and hiding the first video 404Y).

Next, in ST314Y, a case is assumed in which the viewer (here, the user B) viewing the second video 500Y transmitted by the terminal device 10A gives a token (token G1 as an example here) to the distributor A. By operating the terminal device 10B, the viewer B can select the token G1 from a plurality of prepared tokens and can select a command for giving the token G1 to the distributor A. The selection of such a command can be executed via a user interface (not illustrated) displayed on the terminal device 10B. Thus, the terminal device 10B can transmit, to the distribution server device 2000a of the distribution server system 20A, token data indicative of giving the token G1 to the distributor A. This token data can include, for example, recipient identification data for identifying the recipient (distributor A) of the token, token identification data for identifying the token (token G1), and sender identification data for identifying the sender (viewer B) of the token.

By operating the terminal device 10B, the viewer B can also transmit a comment to the distributor A. In this case, the terminal device 10B can transmit the comment data to the distribution server device 2000a. The comment data can include recipient identification data for identifying the recipient (distributor A) of the comment, comment content data storing the content of the comment, and sender identification data for identifying the sender (viewer B) of the comment.

ST316Y to ST324Y explained below are related to the procedure in which the token data transmitted by the terminal device 10 of each viewer is received by the terminal device 10 of the distributor A. However, by applying the same procedure to comment data, the comment data transmitted by the terminal device 10 of each viewer can be received by the terminal device 10 of the distributor A. In this case, in ST316Y to ST324Y explained below, "token identification data" and "token data" can be read and understood as "comment content data" and "comment data", respectively.

In ST316Y, the distribution server device 2000a can store the token data received from the terminal device 10B in the DB server device 2000b. For example, the DB server device 2000b can store, as token data, number identification data for identifying what number a token was given, the token identification data, and the sender identification data in association with the recipient identification data.

In ST318Y, the terminal device 10A of the distributor A can make an inquiry with the game API server device 2000c whether or not new token data has come to the distributor A at each predetermined cycle during execution of the game. For example, if having received one piece of token data from the game API server device 2000c so far since starting the game, the terminal device 10A can make an inquiry with the game API server device 2000c for the presence/absence of the second and subsequent pieces of token data.

In ST320Y, in response to an inquiry from the terminal device 10A, the game API server device 2000c can request the DB server device 2000b for the second and subsequent pieces of token data regarding the distributor A. In a case of having successfully searched the second and subsequent pieces of number identification data as the number identification data stored in association with the distributor A (recipient identification data), the DB server device 2000b can transmit, to the game API server device 2000c as the second piece of token data, the token identification data and the sender identification data corresponding to each of the second and subsequent pieces of number identification data. Here, a case is assumed in which the DB server device 2000b has successfully searched only the second piece of number identification data. In this case, the DB server device 2000b can transmit, to the game API server device 2000c as the second piece of token data, the token identification data and the sender identification data corresponding to the second piece of number identification data. In response to this, the game API server device 2000c can transmit the second piece of token data to the terminal device 10A of the distributor A.

Next, referring to FIG. 20B, in ST322Y, the terminal device 10A having received the second piece of token data can execute the game on the basis of the second piece of token data. The terminal device 10A can execute the game on the basis of at least one piece of the following data, for example.

Token uniquely identified by the token identification data included in the token data (token G1, here)
Sender identified by the sender identification data included in the token data (viewer B, here)
Comment content data included in the comment data
Sender identified by the sender identification data included in the comment data (viewer B, here)

Thus, the terminal device 10A generates the second video 500Y including at least one game object generated on the basis of the token data and/or the comment data. For example, as shown in FIG. 22, on the basis of the token data received from the terminal device 10 of the viewer D, information 510Y indicating that a token of "10 points" has been given to the distributor A can be displayed in the second video 500Y. Information (comment data) indicating that a token corresponding to this "10 points" has been given from the viewer D to the distributor A can be transmitted from the distribution server system 20A to the terminal device 10 of the distributor A. This information (comment data) may be displayed in a region (window or the like) visible only to the distributor A by the terminal device 10A, or may be displayed in a region visible to both the distributor A and each viewer. On the basis of the comment data received from the terminal device 10B of the viewer B, a comment content 512Y of "the animal is cute" can be displayed together with information 514Y for identifying the viewer B in the second video 500Y.

Additionally, the terminal device 10A has received so far two pieces of token data from the game API server device 2000c (the terminal device 10A identifies how many pieces of token data have been received so far during the execution of the game). Thus, in the next cycle, the terminal device 10A can make an inquiry with the game API server device 2000c for the presence/absence of the third and subsequent pieces of token data.

Next, returning to FIG. 20B, in ST324Y, the terminal device 10A can distribute the thus generated second video 500Y the terminal device 10 of each viewer via the distribution server system 20A in the same manner as in ST312Y.

Next, in ST326Y, the (object data management unit 230Y and the communication unit 200Y of the) distribution server device 2000a of the distribution server system 20A can generate object data and can transmit it to the terminal device 10A of the distributor A and/or the terminal device 10 of each viewer. As explained in "3-1. (2)" above, when each viewer views the second video distributed by the distributor A, the object data can include data regarding a game object (acquired game object) usable in a specific game given to the distributor A and/or the viewer of the distributor A.

The (object data management unit 230Y of the) distribution server device 2000a can select an acquired game object to be given to each viewer from among a plurality of game objects. As an example, the (object data management unit 230Y of the) distribution server device 2000a can also select a predetermined game object from among a plurality of game objects, or can also select an acquired game object in accordance with various elements. For example, the (object data management unit 230Y of the) distribution server device 2000a can select an acquired game object having a high value proportional to the ranking of the distributor, the total distribution time of the distributor, the total number of viewers, the total viewing time of the viewers, and/or the like from among a plurality of game objects. Alternatively, the (object data management unit 230Y of the) distribution server device 2000a can select a game object designated by the distributor A from among a plurality of game objects (this aspect is described in "5." below).

The plurality of game objects can include items, equipment, points, rewards, coins, cards, and/or characters without being limited to them.

Figure 23:
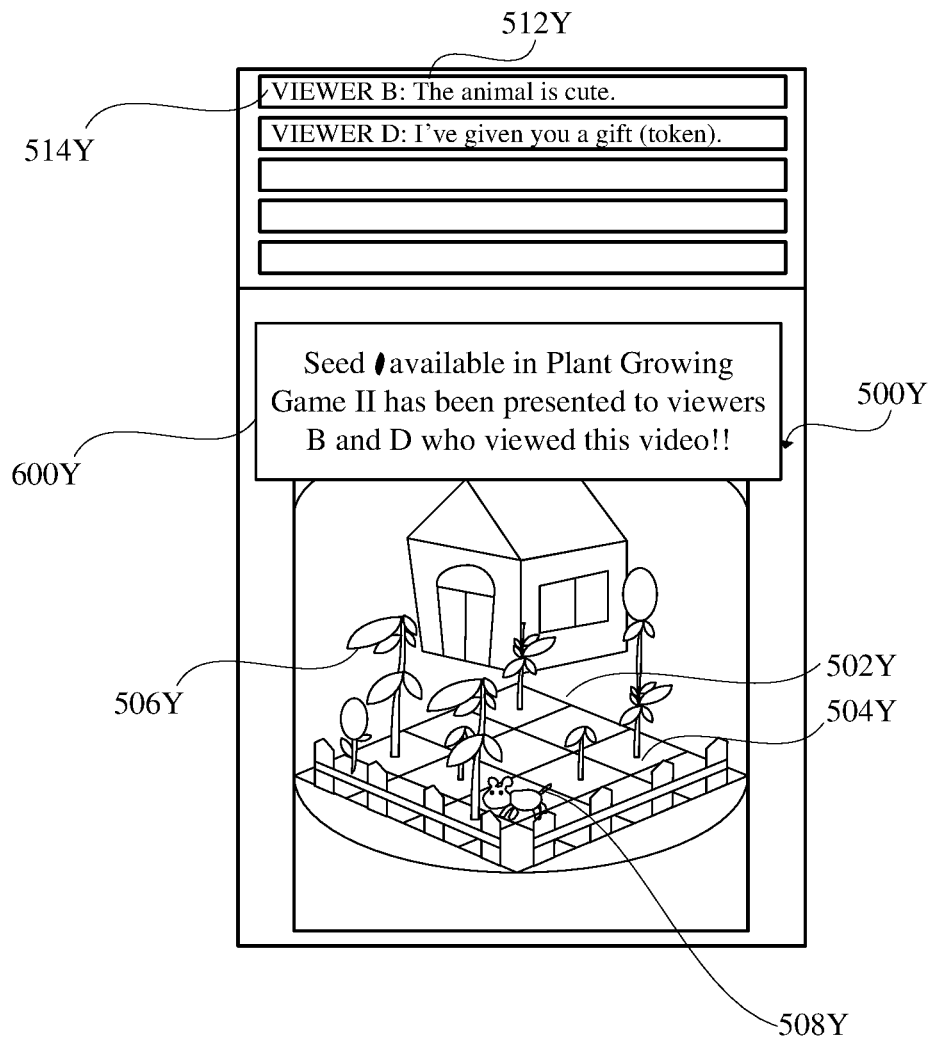
FIG. 23 is a view showing another example of the second video displayed on the terminal device 10 used in the video distribution system 1 shown in FIG. 17.

The terminal device 10A of the distributor A having received the object data can recognize that the game object usable in a specific game has been given to the distributor A and each viewer. Thus, for example, as illustrated in FIG. 23, the terminal device 10A of the distributor A can display, on the second video 500Y, information 600Y indicating that a seed that is one of the game objects usable in a specific game (e.g., "plant growing game II") has been given to the viewer B and the viewer D (and the distributor A) having viewed the second video. This second video 500Y can be displayed on the display unit of the terminal device 10 of the distributor A and each viewer (e.g., viewer B and viewer D, here). Therefore, the distributor A and each viewer can recognize that the presented seed can be used in a specific game (here, "plant growing game II") to be executed later.

In ST328Y, the terminal device 10 of each viewer having received the object data also can recognize that the game object usable in a specific game has been given to each viewer. Specifically, with the terminal device 10B of the viewer B as an example, the terminal device 10B can first determine whether or not the object data has been received. If the terminal device 10B determines that the object data has been received (since the terminal device 10B has actually received the object data in ST326Y, it can determine that the object data has been received), the terminal device 10B can display, on the display unit 150Y, that the given game object (acquired game object) can be used in a specific game, by using this object data.

Figure 24:
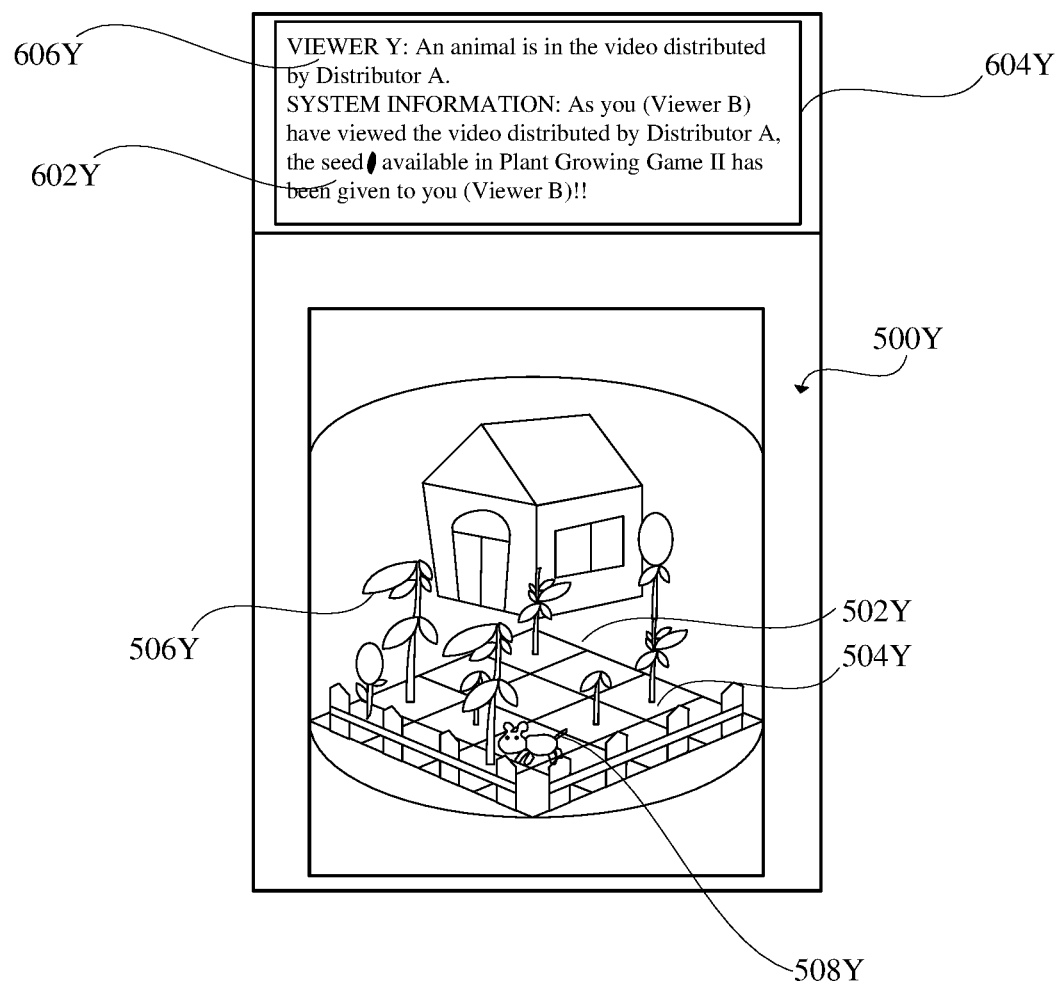
FIG. 24 is a view showing an example of a screen shown in the terminal device of viewer B used in the video distribution system 1 shown in FIG. 17.

For example, as illustrated in FIG. 24, the terminal device 10B of the viewer B can display, on the display unit 150Y, information 602Y that a seed that is one of the game objects useable in a specific game (here, "plant growing game II") has been given to the viewer B having viewed the second video, as information unique to the viewer (here, viewer B). The processing described in relation to ST328Y can be similarly executed not only in the terminal device 10B of the viewer B but also in the terminal device 10 of each viewer having received the object data.

Next, returning to FIG. 20B, in ST330Y, if continuing the game, the terminal device 10A can repeat the processes in and after ST308Y. On the other hand, if the terminal device 10A does not continue the game, the processing ends.

Thereafter, the user who has been the viewer of the second video 500Y can become the distributor (subsequent distributor) to play a specific game identified by the object data, and can use the acquired object in this specific game. Hereinafter, a case where the viewer B of the viewers of the second video 500Y becomes the subsequent distributor will be described.

In ST332Y, in response to the operation of the subsequent distributor B, the terminal device 10B starts and executes the video distribution application.

Next, in ST334Y, the terminal device 10B of the viewer B can first determine whether or not the object data has been received. If the terminal device 10B determines that the object data has been received (since the terminal device 10B has actually received the object data in ST326Y, it can determine that the object data has been received), the terminal device 10B can display, on the display unit 150Y, that the given game object (acquired game object) can be used in a specific game, by using this object data. The aspect of the display is discretionary and can be the aspect described with reference to FIG. 24, for example. Thus, by viewing the information displayed on the display unit 150Y on the basis of the object data, the subsequent distributor B can recognize for the first time or again that the acquired object can be used in this game in a case where the specific game (e.g., "plant growing game II") is executed.

Hereinafter, since the operation performed in the video distribution system 1 in ST336Y can be basically the same as those in ST304Y to ST330Y described above, detailed description thereof will be omitted. The difference is that not the distributor A but the subsequent distributor B distributes a new first video and a new second video to each viewer. The new first video and the new second video distributed by the subsequent distributor can be referred to as a third video and a fourth video, respectively, in order to distinguish them from the first video and the second video distributed by the distributor A.

Figure 25:
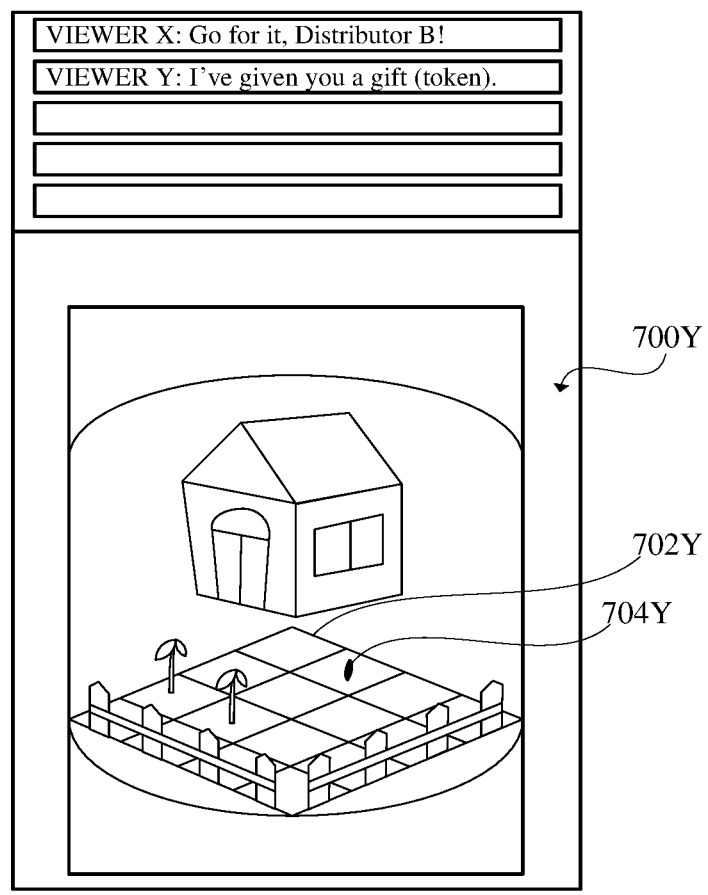
FIG. 25 is a view showing an example of the fourth video shown in the terminal device of each viewer used in the video distribution system 1 shown in FIG. 17.

FIG. 25 is a view showing an example of the fourth video displayed on the terminal device 10 of each viewer used in the video distribution system 1 shown in FIG. 17. Here, a case in which the game executed by the distributor A and distributed as the second video and the game executed by the subsequent distributor B and distributed as the fourth video are identical ("plant growing game II") will be described. However, they may be identical or not. In particular, if the both are different games from each other, they may be games belonging to different genres.

As illustrated in FIG. 25, in the plant growing game II, the subsequent distributor B can sow and grow a seed 704Y, which is an acquired object, in his own garden 702Y.

The scene is distributed by the terminal device 10B to the terminal device 10 of each viewer as a fourth video 700Y. The terminal device 10B can recognize, by the object data processing unit 130Y of the terminal device 10B, that the seed 704Y can be used in the plant growing game II, or can recognized the same by receiving a notice to that effect from the object data management unit 230Y of the distribution server device 2000a and/or the web server device 20 (sharing data managed by the object data management unit 230Y).

5. Variations

In the various embodiments described above, a case in which the acquired game object usable in a specific game when the second video 500Y distributed by the distributor is viewed (received) by the viewer is given to "both" of the viewer and the distributor has been described. Thus, since the viewer can acquire a game object usable in the specific game to be executed later by the viewer as a subsequent distributor, the viewer can be encouraged to actively view the second video 500Y distributed by the distributor. On the other hand, since the distributor can acquire a game object usable in the specific game to be executed later by the distributor himself when the distributor's own second video 500Y is viewed by any viewer, the distributor can be encouraged to give a notice about the distribution of the second video 500Y via SNS, website, mail, telephone, and/or the like prior to the distribution of the second video 500Y so that any viewer views the second video 500Y to be distributed by the distributor.

However, in another embodiment, the acquired game object usable in a specific game when the second video 500Y distributed by the distributor is viewed (received) by the viewer may be given to "only" the viewer.

In the various embodiments described above, a case in which the identical game object is given to the distributor and each viewer when game object is given to both the distributor and each viewer. However, the game object given to the distributor and the game object given to each viewer may be identical or not.

The game object given to a viewer when the second video distributed by a certain distributor (e.g., first distributor) is viewed (received) by the viewer may be identical to or different from the game object given to a viewer when the second video distributed by another distributor (e.g., second distributor) is viewed (received) by the viewer. If the both game objects are different, each viewer is encouraged to view cross between the second videos distributed by a plurality of distributors in order to acquire the game object desired or satisfied by the viewer himself. This is expected to increase the total number of viewers viewing the second video and/or the total viewing time in the entire video distribution system 1.

Additionally, attention is paid to the case where the game object given to a viewer when the second video distributed by the first distributor is viewed (received) by the viewer is different from the game object given to a viewer when the second video distributed by the second distributor is viewed (received) by the viewer. The game object to be given to each viewer when the second video of the first distributor is viewed may be determined by the first distributor himself, or may be determined by the (object data management unit 230Y of the) server device on the basis of data managed by the (object data management unit 230Y of the) server device. The game object selected by the first distributor himself or the operator of the video distribution system 1 from the game object group held by the first distributor may be given to each viewer. Alternatively, the game object selected by the first distributor himself or the operator of the video distribution system 1 from the game object group held by each viewer may be given to the first distributor. The above matters applicable to the first distributor are similarly applicable to the second distributor.

A method in which the first distributor himself (or the second distributor himself) selects a game object given to each viewer when each viewer views the second video of the first distributor (or the second distributor) will be described later.

When the (object data management unit 230Y of the) server device gives a game object (acquired game object) to a viewer viewing the second video distributed by the distributor, at least one acquired game object can be selected (and/or set) from among a plurality of game objects on the basis of the degree of involvement of the viewer in viewing the second video. Specifically, at least one acquired game object can be selected and/or set, for example, on the basis of any of the following.

(a) Timing (date, time, and the like) at which the viewer viewed the second video (b) Total length of time in which the viewer viewed the second video (c) Token data, comment data, and/or evaluation-related data (in particular, the total number of these pieces of data and the like) transmitted to the distributor while the viewer is viewing the second video Regarding (a) above, for example, if the viewer views the second video during a time slot when the total number of viewers of the second video is small in general (early in the morning, late at night, and the like), a better acquired game object (e.g., one that can plays the specific game advantageously when used in the specific game) can be selected, and furthermore, the parameters of the acquired game object can be set better (e.g., so as to be capable of playing the specific game advantageously when used in the specific game). Thus, the use of the video distribution service provided by the video distribution system 1 is prevented from being concentrated in a specific time.

Alternatively, if the viewer views the second video during a promotion period, a better acquired game object can be selected, and the parameters of the acquired game object can be set better.

Regarding (b) above, if the viewer views the second video for a longer period of time, a better acquired game object can be selected, and the parameters of the acquired game object can be set better (e.g., so as to be capable of playing the specific game advantageously when used in the specific game).

Regarding (c) above, the larger the total number of pieces of token data, comment data, and/or evaluation-related data transmitted to the distributor while the viewer is viewing the second video, the better acquired game object can be selected, and furthermore, the better the parameters of the acquired game object can be set (e.g., so as to be capable of playing the specific game advantageously when used in the specific game).

In any of the above (a) to (c), the selection of a better acquired game object means that the acquired game object (more powerful/convenient/expensive item/equipment/point/character, and the like) is selected so that the viewer can advantageously play the particular game when using the acquired game object in the particular game as a subsequent distributor. The better setting of the parameters of the acquired game object means that the parameters of the acquired game object are set (e.g., the value/price/attack power/defense power/physical strength, and the like of items/equipment/points/characters and the like are set high) so as to be capable of advantageously playing the specific game when the viewer uses the acquired game object in the specific game as a subsequent distributor.

In the various embodiments described above, a case where the distribution server device 2000a transmits object data to the terminal device 10 of each viewer in ST326Y shown in FIG. 20B (e.g., case where the game object of each viewer is given) has been described. However, the distribution server device 2000a can transmit the object data separately for each viewer at any of the timings presented below.

Timing when the distribution server device 2000a "starts" the distribution of the second video to the terminal device 10 of the viewer Timing when the distribution server device 2000a "completes" the distribution of the second video to the terminal device 10 of the viewer Timing when the viewer "performs a predetermined motion" with respect to viewing the second video while the distribution server device 2000a is distributing the second video to the terminal device 10 of the viewer Here, "performing a predetermined motion" can be regarded as performing at least one of the following motions.

(x) The viewer viewed the second video at a predetermined timing (date, time, and the like)

(y) Total length of time in which the viewer viewed the second video having exceeded the threshold (z) The total number of pieces of token data, comment data, and/or evaluation-related data transmitted to the distributor while the viewer is viewing the second video has exceeded the threshold The transmission of object data to the viewer may be performed from the (distribution server device 2000a of the) distribution server system 20 to the terminal device 10 of the viewer via a function (chat function or the like) that enables the communication of a message between the (distribution server device 2000a of the) distribution server system 20 and the terminal device 10 of the viewer. An example of this chat function is shown in FIG. 24 referred earlier. When the object data is transmitted to the terminal device 10 of the viewer via such chat function, the terminal device 10 can display the information 602Y in a chat window 604Y as shown in FIG. 24 using the received object data. Use of this chat function enables the terminal device 10 to transmit/ receive a message 606Y to/from another viewer (here, viewer Y) and/or a distributor (here, distributor A).

Alternatively, the object data may be transmitted to the terminal device 10 of the viewer as data included in the second video, data included in the first video, and/or data included in the motion data. Here, the "motion data" can be transmitted from the terminal device 10 of the distributor to the terminal device 10 of the viewer via the distribution server system 20. The terminal device 10 of the viewer having received the "motion data" can generate the first video by using this "motion data" in accordance with a method (see 3-1. (1) above) similar to the one with which the terminal device 10 of the distributor generates the first video.

In the various embodiments described above, the case in which in order to generate a video (second video) regarding the game, the terminal device 10 of the distributor receives, from the web server device 20B, an HTML (HTML5, in particular) document in which a game program is incorporated has been described. However, instead of the configuration of receiving, from the web server device 20B, an HTML document in which a game program is incorporated, the terminal device 10 of the distributor can also generate the second video including a screen regarding the game by executing the installed video distribution application and receiving appropriate data from a data server device not illustrated (or a certain server device not illustrated included in the distribution server system 20A).

In the various embodiments described above, the terminal device 10 of the distributor may be a smartphone or the like used by a general user, or may be a dedicated terminal device installed in a studio or the like. In this case, at least one server device of the distribution server device 2000a, the DB server device 2000b, and the game API server device 2000c that are included in the distribution server system 20A (as well as the web server device 20B) may be provided together with the dedicated terminal device in the studio or the like.

In the various embodiments described above, the case in which, on the basis of motion data regarding the motion of the distributor and voice data regarding the voice of the distributor, the terminal device 10 of the distributor generates the first video including the animation including the avatar of this distributor, and transmits the first video to the server device 20 has been described. However, the terminal device 10 of the distributor may transmit the motion data regarding the motion of the distributor and the voice data regarding the voice of the distributor to the server device 20, and the server device 20 may generate a video on the basis of the motion data and the voice data and distribute the video to the terminal device 10 of each viewer. This can reduce the amount of data transmitted from the terminal device 10 of the distributor to the distribution server system 20A.

Alternatively, the terminal device 10 of the distributor may transmit the motion data regarding the motion of the distributor and the voice data regarding the voice of the distributor to a separately provided server device, this separate server device may generate a video on the basis of the motion data and the voice data and return it to the terminal device 10 of the distributor, and the terminal device 10 of the distributor may transmit the received video to the server device 20. This can reduce the amount of data transmitted from the terminal device 10 of the distributor to the separately provided server device 20.

Furthermore, the terminal device 10 of the distributor may transmit the motion data regarding the motion of the distributor and the voice data regarding the voice of the distributor to the terminal device 10 of each viewer via the server device 20 or the separately provided server device, and the terminal device 10 of each viewer may generate (render) and display a video on the basis of the received motion data and voice data (this technique is sometimes referred to as "client rendering"). This can reduce the amount of data transmitted from the server device 20 or the separately provided server device to the terminal device 10 of each viewer.

In any of the above cases, the generation of a video on the basis of the motion data and the voice data transmitted by the terminal device 10 of the distributor may be shared by at least two devices from among the server device 20, the separate server device, and the terminal device 10 of each viewer. In either case, the device responsible for generation of the video can receive, from, for example, the server device 20 or the like, and store data (image and the like) regarding the avatar to be operated.

Furthermore, in any case, the token data, comment data, and/or evaluation-related data transmitted by the terminal device 10 of each viewer can be transmitted by a discretionary method to a device responsible for generation of a video from among the server device 20, the separate server device, and the terminal device 10 of each viewer. Thus, the device generating the video can execute processing on the basis of received token data (e.g., displaying the token object in the video), execute processing on the basis of received comment data (e.g., displaying the comment in the video), and/or execute processing on the basis of received evaluation-related data (e.g., displaying the evaluation in the video). In either case, the device responsible for generation of the video can receive, from, for example, the server device 20 or the like, and store data (image and the like) corresponding to various tokens to be used.

In the various embodiments described above, the motion of each of the terminal devices 10 described above can be executed similarly by the studio unit 30 having a similar configuration to that of the terminal device 10. In this case, the studio unit 30A illustrated in FIG. 17 can have a similar function to that of the terminal device 10 for distributing a video. Similarly, the studio unit 30B illustrated in FIG. 17 can have a similar function to that of the terminal device 10 for viewing a video. The motion of each of the server devices 20 described above can be executed also by the studio unit 30 having the similar configuration to that of the server device 20.

In general, if a game program has been installed in the terminal device 10, or if a game program has been incorporated in a video distribution application installed in the terminal device 10, execution of a new game requires the terminal device 10 to have a new game program or video distribution application incorporating the new game program installed. In this case, from the point of view of the creator of the game program, it is necessary to prepare a game program corresponding to each of a plurality of operating systems, and thus there is a problem of an increase in the man-hour used for the creation of the game program. On the other hand, from the point of view of the user, it is necessary to download a new game program and/or to update an existing game program in order to obtain a new game, and thus there is a problem of requiring communication load, communication cost, time, and labor.

On the other hand, according to the technology disclosed in the present application, in order to execute the game, the terminal device 10A of the distributor can call the browser function incorporated in the video distribution application, instead of executing the game program installed in this terminal device 10A, can receive a web page (HTML document, particularly HTML5 document) from the web server device 20B by using this browser function, and can execute the game program incorporated in the web page. This allows the terminal device 10A of the distributor to easily execute the new game. Therefore, when providing a new game, the creator of the game program only has to incorporate the new game program into the web page (HTML document, particularly HTML5 document) transmitted by the web server device 20B, and it is hence possible to reduce the number of man-hours used for creation of the new game program. Furthermore, since the user does not need to download a new game program or the like in order to be provided with the new game, it is possible to suppress communication load, communication cost, time, and labor.

In the above-described various embodiments, when executing the video distribution application, communicating with the distribution server system 20A, and distributing the first video, the terminal device 10A of the distributor A executes the browser function incorporated in this video distribution application, whereby the terminal device 10A of the distributor A executes the program included in the web page received from the web server device 20B, and distributes the second video to the terminal device 10 of each viewer via the distribution server system 20A. However, such configuration is merely an example.

For example, the terminal device 10A of the distributor A can also distribute the second video without distributing the first video. Specifically, in the first example, by executing the video distribution application and executing the browser function incorporated in the video distribution application, the terminal device 10A of the distributor A can execute a program included in the web page received from the web server device 20B (without distributing the first video by using the video distribution application), and distribute the second video to the terminal device 10 of each viewer via the distribution server system 20A. In this configuration, the distributor A does not distribute the first video on the basis of the performance of the distributor himself but can distribute only the second video showing the situation of the game that the distributor himself executes.

In the second example, by executing an installed game application and accessing the distribution server system 20A, which also functions as a game server device, the terminal device 10A of the distributor A can distribute the screen of the game being executed to the terminal device 10 of each viewer via the distribution server system 20A. Also in these first and second examples, as in the various embodiments described above, the terminal device 10A of the distributor A can generate the second video by using the token data, the comment data, and/or the like received from the distribution server system 20A.

In the third example, in the first example or the second example, the terminal device 10A of the distributor A can transmit operation data of the distributor A to the web server device 20B or the distribution server system 20A without generating a game screen. In this case, the web server device 20B or the distribution server system 20A can generate a game screen by using the operation data, and the distribution server system 20A can distribute the second video including the generated game screen to the terminal device 10 of each viewer. In this third example, when generating a game screen, the web server device 20B can use the token data, comment data, and/or the like received from the distribution server system 20A. When the distribution server system 20A generates a game screen, the distribution server system 20A can use token data and/or comment data managed by the distribution server system 20A itself.

In the various embodiments described above, in relation to ST326Y, a case has been explained in which if each viewer views the second video distributed by the distributor A, the (object data management unit 230Y of the) distribution server device 2000a can select, as an acquired game object to be given to each viewer, a game object designated by the distributor A himself from among the plurality of game objects. In this regard, for example, the terminal device 10 of the distributor A and the (object data management unit 230Y of the) distribution server device 2000a can execute processing in accordance with the following procedure.

(1) First, using the terminal device 10A, the distributor A can access the (object data management unit 230Y of the) distribution server device 2000a of the distribution server system 20A before, during, or after the distribution of the second video.

(2) The (object data management unit 230Y of the) distribution server device 2000a can transmit, to the terminal device 10A of the distributor A, data regarding the distributable game object group set by the management side of the video distribution system 1 and/or the game object group held by the distributor A. The "game object group" as used herein can include items, equipment, points, rewards, coins, cards, and/or characters without being limited to them.

(3) By using the terminal device 10A, the distributor A can select a game object he desires to distribute to each viewer from the game object group displayed on the terminal device 10A in accordance with the received data. Thus, the terminal device 10A can transmit data regarding the game object selected by the distributor A to the (object data management unit 230Y of the) distribution server device 2000a.

(4) In accordance with the received data, the (object data management unit 230Y of the) distribution server device 2000a can transmit, to the terminal device 10 of the distributor A, data (e.g., whether consideration is necessary, or the amount of consideration) regarding the consideration for distributing the game object selected by the distributor A.

(5) After confirming the information displayed by the terminal device 10A in accordance with the received data, the distributor A can pay the consideration by using the terminal device 10A by a method such as coin settlement, point settlement, credit card settlement, and/or prepaid card settlement, if the consideration is necessary.

Focusing on the coin settlement, each user including the distributor A can purchase coins (no limitation in this name) via the video distribution system 1 in advance by using the terminal device 10. By using the terminal device 10A, the distributor A can pay the consideration by selecting consuming the coins corresponding to the consideration.

Focusing on the point settlement, each user including the distributor A can obtain points (no limitation in this name) free of charge by, via the video distribution system 1, viewing a video distributed by another distributor and/or distributing the video by himself. By using the terminal device 10A, the distributor A can pay the consideration by selecting consuming the points corresponding to the consideration.

In the various embodiments described above, in the above-described ST326Y, the case where the distribution server device 2000a of the distribution server system 20A transmits object data to the terminal device 10A of the distributor and/or the terminal device 10 of each viewer has been described. However, in another embodiment, by an operator on the management side of the video distribution system 1 and/or the distributor A himself, the (object data management unit 230Y of the) distribution server device 2000*a* may switch, via a user interface, for example, whether to actually distribute (distribute ON) or not (distribute OFF), to the terminal device 10 of each viewer, each of the one or a plurality of acquired game objects set by the management side of the video distribution system 1 and/or the distributor A himself. In this case, in ST326Y, the (object data management unit 230Y of the) distribution server device 2000*a* can transmit, to the terminal device 10A of the distributor and/or the terminal device 10 of each viewer, only one or more acquired game objects set as distribution ON from among the plurality of acquired game objects.

As will be readily understood to a person of ordinary skill in the art having the benefit of the present disclosure, the various examples described above can be used in various suitable combinations with each other as long as they do not cause inconsistencies.

As described above, according to the technique disclosed in the present application, when the viewer views (receives) the second video distributed by the distributor, the viewer is given a game object that can be used when executing a specific game as a subsequent distributor. Therefore, the viewer can be encouraged to view the second video. The viewer is given a better game object by taking a more active motion when viewing the second video. Therefore, the viewer can be encouraged to view more actively the second video. As a result, it is possible to promote the use of the video distribution system by the viewer.

Thus, the technology disclosed in the present application can provide a computer program, a method, and a server device that can encourage viewers to view videos distributed by distributors.

6. Various Aspects.

A computer program according to a first aspect of the disclosed technology can be "a computer program configured to, when executed by at least one processor mounted on a terminal device of a viewer, cause the at least one processor to: receive a first video including an animation of an avatar of a distributor generated on the basis of motion data related to motion of the distributor, or the motion data, via a communication line; receive a second video related to a game generated by a terminal device of the distributor on the basis of operation data related to operation of the distributor using a received web page; determine if the terminal device of the viewer has received object information regarding an acquired game object available in a selected game by the viewer as a subsequent distributor, the acquired game object being given to the viewer having received the second video; and display that the acquired game object is available in the selected game if the terminal device of the viewer is determined to have received the object information."

In the computer program according to a second aspect of the disclosed technology, "the computer program is configured to cause the at least one processor to: distribute a third video including an animation of an avatar of the subsequent distributor generated on the basis of motion data related to motion of the subsequent distributor or the motion data, toward terminal devices of a plurality of viewers via the communication line; distribute a fourth video related to the selected game generated on the basis of operation data related to operation of the subsequent distributor using a received web page; and display the acquired game object in the selected game on the basis of the object information" in the first aspect.

In the computer program according to a third aspect of the disclosed technology, "the computer program is configured to cause the at least one processor to receive the object information through a function enabling message communication between the terminal device of the viewer and a server device configured to receive the second video from the terminal device of the distributor and distribute the second video to the terminal device of the viewer" in one of the preceding aspects.

In the computer program according to a fourth aspect of the disclosed technology, "the acquired game object includes an item, equipment, a point, a reward, a coin, a card, and/or, a character" in one of the preceding aspects.

In the computer program according to a fifth aspect of the disclosed technology, "the acquired game object is selected out of a plurality of game objects by the distributor or a server device configured to receive the second video from the terminal device of the distributor and distribute the second video to the terminal device of the viewer" in one of the preceding aspects.

In the computer program according to a sixth aspect of the disclosed technology, "the selected game is the same as or is different from the game played by the distributor" in one of the preceding aspects.

In the computer program according to a seventh aspect of the disclosed technology, "the acquired game object is set on the basis of a degree of involvement of the viewer in viewing the second video" in one of the preceding aspects.

In the computer program according to an eighth aspect of the disclosed technology, "the acquired game object is set on the basis of at least one of a timing on which the viewer has viewed the second video; a total time that the viewer has viewed the second video; and giving information indicative of giving a gift, a comment, and/or, an evaluation to the distributor, the giving information having been sent from the terminal device of the viewer to the terminal device of the distributor" in the seventh aspect.

In the computer program according to a ninth aspect of the disclosed technology, "the acquired game object is the same as an acquired game object available for the distributor in the selected game, the acquired game object available for the distributor being given to the distributor having executed the game to be displayed in the second video" in one of the preceding aspects.

In the computer program according to a tenth aspect of the disclosed technology, "the acquired game object given to the viewer having received the second video distributed by the distributor is the same as or is different from the acquired game object given to the viewer having received the second video distributed by another distributor other than the distributor" in one of the preceding aspects.

In the computer program according to an eleventh aspect of the disclosed technology, "the communication line includes the Internet" in one of the preceding aspects.

In the computer program according to a twelfth aspect of the disclosed technology, "the at least one processor includes a central processing unit (CPU), a microprocessor, and/or, a graphics processing unit (GPU)" in one of the preceding aspects.

A method according to a thirteenth aspect of the disclosed technology can be "a method executed by at least one processor mounted on a terminal device of a viewer executing computer-readable instructions, including: with the at least one processor executing the instructions, receiving a first video including an animation of an avatar of a distributor generated on the basis of motion data related to motion of the distributor, or the motion data, via a communication line; receiving a second video related to a game generated by a terminal device of the distributor on the basis of operation data related to operation of the distributor using a received web page; determining if the terminal device of the viewer has received object information regarding an acquired game object available in a selected game by the viewer as a subsequent distributor, the acquired game object being given to the viewer having received the second video; and displaying that the acquired game object is available in the selected game if the terminal device of the viewer is determined to have received the object information."

In the computer program according to a fourteenth aspect of the disclosed technology, "the communication line includes the Internet" in the thirteenth aspect.

In the computer program according to a fifteenth aspect of the disclosed technology, "the at least one processor includes a central processing unit (CPU), a microprocessor, and/or, a graphics processing unit (GPU)" in one of the preceding aspects.

A server device according to a sixteenth aspect of the disclosed technology can be "a server device comprising at least one processor, wherein the at least one processor is configured to: distribute a first video including an animation of an avatar of a distributor generated on the basis of motion data related to motion of the distributor or the motion data, toward a terminal device of a viewer via a communication line; distribute a second video related to a game generated on the basis of operation data related to operation of the distributor by a terminal device of the distributor using a received web page, toward the terminal device of the viewer via the communication line; and transmit, to the terminal device of the viewer, object information regarding an acquired game object available by the viewer as a subsequent distributor in a selected game, the acquired game object having being given to the viewer having received the second video."

In the server device according to a seventeenth aspect of the disclosed technology, "the at least one processor is configured to give the acquired game object to the viewer in response to: an event that the server device has started distributing the second video to the terminal device of the viewer; an event that the server device has finished distributing the second video to the terminal device of the viewer; or an event that the viewer has done a predetermined action with respect to viewing of the second video during the server device being distributing the second video to the terminal device of the viewer" in the sixteenth aspect.

In the server device according to an eighteenth aspect of the disclosed technology, "the communication line includes the Internet" in one of the preceding aspects.

In the server device according to a nineteenth aspect of the disclosed technology, "the at least one processor includes a central processing unit (CPU), a microprocessor, and/or, a graphics processing unit (GPU)" in one of the preceding aspects.

A server device according to a twentieth aspect of the disclosed technology can be "a server device comprising at least one processor, wherein the at least one processor is configured to transmit a web page including a computer program to a terminal device of a viewer, wherein the terminal device of the viewer is configured to: receive a first video including an animation of an avatar of a distributor generated on the basis of motion date related to motion of the distributor or the motion data, via a communication line; receive a second video related to a game generated by a terminal device of the distributor on the basis of operation data related to operation of the distributor using a received web page, via the communication line; determine if the terminal device of the viewer has received object information regarding an acquired game object available in a selected game by the viewer as a subsequent distributor, the acquired game object being given to the viewer having received the second video; display that the acquired game object is available in the selected game if the terminal device of the viewer is determined to have received the object information; distribute a third video including an animation of an avatar of the subsequent distributor generated on the basis of motion data related to motion of the subsequent distributor, toward terminal devices of a plurality of viewers via the communication line; and distribute a fourth video related to the selected game generated on the basis of operation data related to operation of the subsequent distributor using a received web page, toward the terminal devices of the plurality of viewers via the communication line, wherein the computer program is configured to cause the terminal device of the viewer to display the acquired game object in the selected game on the basis of the object information."

In the server device according to a twenty first aspect of the disclosed technology, "the communication line includes the Internet" in the twentieth aspect.

In the server device according to a twenty second aspect of the disclosed technology, "the at least one processor includes a central processing unit (CPU), a microprocessor, and/or, a graphics processing unit (GPU)" in one of the preceding aspects.

A method according to a twenty third aspect of the disclosed technology can be "a method executed by at least one processor executing computer-readable instructions, including, with the at least one processor executing the instructions, distributing a first video including an animation of an avatar of a distributor generated on the basis of motion data related to motion of the distributor or the motion data, toward a terminal device of a viewer via a communication line; distributing a second video related to a game generated on the basis of operation data related to operation of the distributor by a terminal device of the distributor using a received web page, toward the terminal device of the viewer via the communication line; and transmitting, to the terminal device of the viewer, object information regarding an acquired game object available by the viewer as a subsequent distributor in a selected game, the acquired game object having being given to the viewer having received the second video."

In the method according to a twenty fourth aspect of the disclosed technology, "the method includes transmitting, to the terminal device of the viewer, the object information as one of: information included in the second video; information included in the first video; and information included in the motion data" in the twenty third aspect.

In the method according to a twenty fifth aspect of the disclosed technology, "the communication line includes the Internet" in one of the preceding aspects.

In the method according to a twenty sixth aspect of the disclosed technology, "the at least one processor includes a central processing unit (CPU), a microprocessor, and/or, a graphics processing unit (GPU)" in one of the preceding aspects.

A method according to a twenty seventh aspect of the disclosed technology can be "a method executed by at least one processor executing computer-readable instructions, including, with the at least one processor executing the instructions, transmitting a web page including a computer program to a terminal device of a viewer, wherein the terminal device of the viewer is configured to: receive a first video including an animation of an avatar of a distributor generated on the basis of motion date related to motion of the distributor or the motion data, via a communication line; receive a second video related to a game generated by a terminal device of the distributor on the basis of operation data related to operation of the distributor using a received web page, via the communication line; determine if the terminal device of the viewer has received object information regarding an acquired game object available in a selected game by the viewer as a subsequent distributor, the acquired game object being given to the viewer having received the second video; display that the acquired game object is available in the selected game if the terminal device of the viewer is determined to have received the object information; distribute a third video including an animation of an avatar of the subsequent distributor generated on the basis of motion data related to motion of the subsequent distributor, toward terminal devices of a plurality of viewers via the communication line; and distribute a fourth video related to the selected game generated on the basis of operation data related to operation of the subsequent distributor using a received web page, toward the terminal devices of the plurality of viewers via the communication line, wherein the computer program is configured to cause the terminal device of the viewer to display the acquired game object in the selected game on the basis of the object information."

In the method according to a twenty eighth aspect of the disclosed technology, "the communication line includes the Internet" in the twenty seventh aspect.

In the method according to a twenty ninth aspect of the disclosed technology, "the at least one processor includes a central processing unit (CPU), a microprocessor, and/or, a graphics processing unit (GPU)" in one of the preceding aspects.

IV. Notes

1. Numbers in Front of Two Types of Video

In the present application, the numbers such as "first", "second", "third", "fourth", "fifth", and "sixth", etc. can be used to identify two types of videos distributed by each user. A first type of video is the one which includes an animation of an avatar of a user generated on the basis of the motion data related to the user, whereas a second type of video is the one related to a computer-implemented game generated on the basis of the operation data related to the same user.

Focusing on a case where a first distributor (first user) distributes the two types of videos, the first type of video distributed by the first distributor can be called a "first video", whereas the second type of video distributed by the first distributor can be called a "second video".

Then, focusing on a case where a second distributor (second user) distributes the two types of videos, the first type of video distributed by the second distributor can be called a "third video", whereas the second type of video distributed by the second distributor can be called a "fourth video". The second distributor can be a user who can view at least one of the two types of videos distributed by the first distributor.

Also, focusing on a case where a third distributor (third user) distributes the two types of videos, the first type of video distributed by the third distributor can be called a "fifth video", whereas the second type of video distributed by the third distributor can be called a "sixth video". The third distributor can be a user who can view at least one of the two types of videos distributed by the first distributor and/or the second distributor.

In this connection, the numbers such as "first", "second", "third", "fourth", "fifth", and "sixth", etc. are just examples. The other numbers and/or letters can be used to identify the two types of videos distributed by each user.

2. Numbers in Front of "Motion Data" and "Operation Data"

In the present application, the numbers such as "first", "second", and "third", etc. can be used to identify the motion data/operation data generated with respect to each user.

Focusing on a case where the first distributor (first user) distributes the two types of videos, the motion data used to generate the first type of video distributed by the first distributor can be called "first motion data", whereas the operation data used to generate the second type of video distributed by the first distributor can be called "first operation data".

Then, focusing on a case where the second distributor (second user) distributes the two types of videos, the motion data used to generate the first type of video distributed by the second distributor can be called "second motion data", whereas the operation data used to generate the second type of video distributed by the second distributor can be called "second operation data".

Also, focusing on a case where the third distributor (third user) distributes the two types of videos, the motion data used to generate the first type of video distributed by the third distributor can be called "third motion data", whereas the operation data used to generate the second type of video distributed by the third distributor can be called "third operation data".

In this connection, the numbers such as "first", "second", and "third", etc. are just examples. The other numbers and/or letters can be used to identify the motion data/operation data generated with respect to each user.

3. Combination of First and Second Embodiments

The above-mentioned first and second embodiments can be combined with one another. In this case, for example, as the "viewer data regarding at least one viewer" described in the first embodiment, the "viewing data regarding viewing of the at least one viewer" described in the second embodiment can be used. Any examples included in the first and second embodiments can be combined with one another.

4. Combination of First and Third Embodiments

The above-mentioned first and third embodiments can be combined with one another. In this case, for example, any distributor in the first embodiment can then be any viewer (subsequent distributor) described in the third embodiment.

In addition or alternatively, the terminal device of any viewer described in the third embodiment can view the video related to the game distributed by any distributor described in the first embodiment to receive object data (acquire a selected game object).

In addition or alternatively, the terminal device of any distributor described in the first embodiment can receive viewer data regarding at least one viewer described in the third embodiment.

Any other examples included in the first and third embodiments can be combined with one another.

5. Combination of Second and Third Embodiments

The above-mentioned second and third embodiments can be combined with one another. In this case, for example, any distributor in the second embodiment can then be any viewer (subsequent distributor) described in the third embodiment.

In addition or alternatively, the terminal device of any viewer described in the third embodiment can view the video related to the game distributed by any distributor described in the second embodiment to receive object data (acquire a selected game object).

In addition or alternatively, the terminal device of any distributor described in the second embodiment can receive viewer data regarding at least one viewer described in the third embodiment.

Any other examples included in the second and third embodiments can be combined with one another.

6. Combination of First, Second, and Third Embodiments

From Section IV, 3-5 above, a person having ordinary skill in the art would understand that the above-mentioned first, second, and third embodiments can be combined with one another. Any other examples included in the above-mentioned first, second and third embodiments can be combined with one another.

Figure 27:
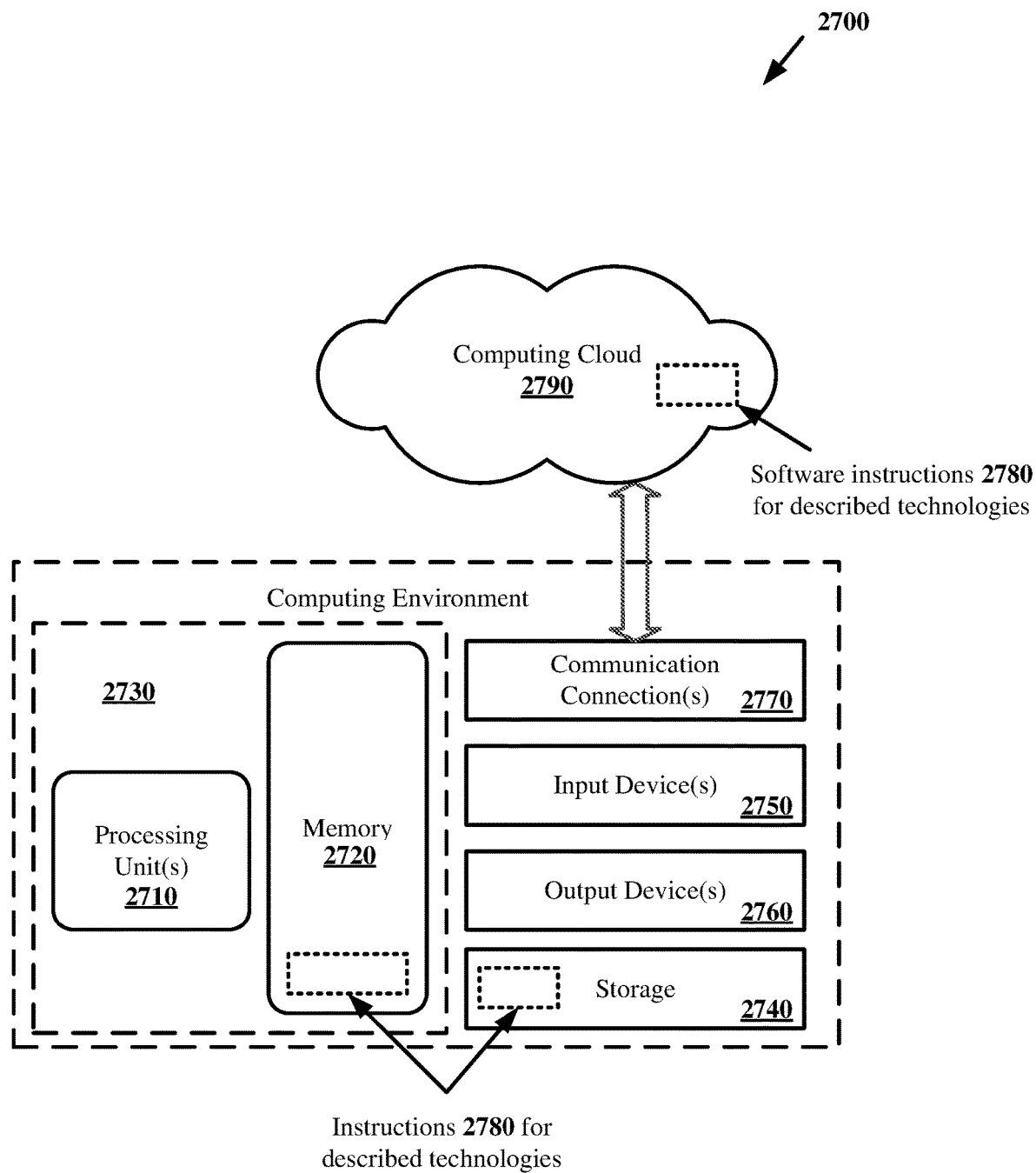
FIG. 27 illustrates a generalized example of a suitable computing environment in which described embodiments, techniques, and technologies can be implemented.

FIG. 27 illustrates a generalized example of a suitable computing environment 2700 in which described embodiments, techniques, and technologies can be implemented. For example, the computing environment 2700 can implement any of the terminal devices or servers, as described herein.

The computing environment 2700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 27, the computing environment 2700 includes at least one processing unit 2710 and memory 2720. In FIG. 27, this most basic configuration 2730 is included within a dashed line. The processing unit 2710 executes computer-executable instructions and may be a real or a virtual processor. The processing unit 2710 can be a general purpose central processing unit, a graphics processing unit or other specialized processing unit, or a combination of general purpose and specialized processing units. In a multi-processing system, multiple processing units execute computer-executable instructions to increase processing power and as such, multiple processors can be running simultaneously. The memory 2720 may be volatile memory (e.g., registers, cache, RAM), non-volatile memory (e.g., ROM, EEPROM, flash memory, etc.), or some combination of the two. The memory 2720 stores software 2780, images, and video that can, for example, implement the technologies described herein. A computing environment may have additional features. For example, the computing environment 2700 includes storage 2740, one or more input devices 2750, one or more output devices 2760, and one or more communication connections 2770. An interconnection mechanism (not shown) such as a bus, a controller, or a network, interconnects the components of the computing environment 2700. Typically, operating system software (not shown) provides an operating environment for other software executing in the computing environment 2700, and coordinates activities of the components of the computing environment 2700.

The storage 2740 may be removable or non-removable, and includes magnetic disks, magnetic tapes or cassettes, CD-ROMs, CD-RWs, DVDs, or any other medium which can be used to store information and that can be accessed within the computing environment 2700. The storage 2740 stores instructions for the software 2780, plugin data, and messages, which can be used to implement technologies described herein.

The input device(s) 2750 may be a touch input device, such as a keyboard, keypad, mouse, touch screen display, pen, or trackball, a voice input device, a camera, an image sensor, a scanning device, or another device, that provides input to the computing environment 2700. For audio, the input device(s) 2750 may be a sound card or similar device that accepts audio input in analog or digital form, or a CD-ROM reader that provides audio samples to the computing environment 2700. The output device(s) 2760 may be a display, printer, speaker, CD-writer, or another device that provides output from the computing environment 2700.

The communication connection(s) 2770 enable communication over a communication medium (e.g., a connecting network) to another computing entity. The communication medium conveys information such as computer-executable instructions, compressed graphics information, video, or other data in a modulated data signal. The communication connection(s) 2770 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed terminal devices and servers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 2790. For example, terminal servers can be processing motion data and video in the computing environment while web pages and operation data processing can be performed on servers located in the computing cloud 2790.

Computer-readable media are any available media that can be accessed within a computing environment 2700. By way of example, and not limitation, with the computing environment 2700, computer-readable media include memory 2720 and/or storage 2740. As should be readily understood, the term computer-readable storage media includes the media for data storage such as memory 2720 and storage 2740, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Computer-readable storage media storing computer-readable instructions, which when executed by a computer having at least one processor, cause the computer to:

generate first motion data related to a body of a first distributor, the first motion data being generated with a sensor or image capture device;

distribute, toward terminal devices of a plurality of viewers via a communication line, the first motion data or a first video including an animation of an avatar of the first distributor generated on the basis of the first motion data;

receive a web page via the communication line;

receive first operation data from a user interface;

generate a second video related to a computer-implemented game on the basis of the first operation data by using the received web page;

distribute the second video toward the terminal devices of the plurality of viewer via the communication line;

receive, via the communication line, viewer data regarding at least one viewer of the plurality of viewers;

extract a selected game object out of a plurality of game objects to be used in the game;

calculate a control parameter related to the selected game object on the basis of the viewer data;

generate the second video including the selected game object; and distribute, via the communication line, the second video toward the terminal devices of the plurality of viewers.

2. The computer-readable storage media according to claim 1, wherein the at least one viewer of the plurality of viewers each is able to become a second distributor different from the first distributor;

wherein the second distributor is able to distribute, toward the terminal devices of the plurality of viewers via the communication line, second motion data or a third video including an animation of an avatar of the second distributor generated on the basis of the second motion data, and/or, a fourth video regarding a computer-implemented game generated on the basis of second operation data by using a received web page; and wherein the viewer data include data regarding the second distributor who has distributed the second motion data or the third video, and/or, the fourth video.

3. The computer-readable storage media according to claim 2, wherein the data regarding the second distributor include avatar data regarding the avatar of the second distributor, and/or, game data regarding the game played by the second distributor.

4. The computer-readable storage media according to claim 3, wherein the avatar data include data regarding an attribute of the avatar of the second distributor or an item attached or given to the avatar.

5. The computer-readable storage media according to claim 3, wherein the game data include progress data indicating progress of the game played by the second distributor.

6. The computer-readable storage media according to claim 1, wherein the selected game object is a game object acquired or operated by the first distributor in the game played by the first distributor.

7. The computer-readable storage media according to claim 6, wherein the selected game object includes an item, equipment, a point, a reward, a coin, a card, a character, and/or an avatar.

8. The computer-readable storage media according to claim 1, wherein the viewer data include at least one viewing parameter regarding viewing of the at least one viewer, and wherein the instructions further cause the computer to:

calculate a control parameter related to the selected game object on the basis of the at least one viewing parameter;

generate the second video including the selected game object; and distribute, via the communication line, the second video toward the terminal devices of the plurality of viewers.

9. The computer-readable storage media according to claim 1, wherein the at least one viewing parameter includes a total number of the plurality of viewers, viewing time of the at least one viewer, or a frequency with which the at least one viewer viewed the second video distributed by the first distributor.

10. The computer-readable storage media according to claim 9, wherein:

the at least one viewing parameter is the total number of the plurality of viewers; and the instructions further cause the computer to calculate a control parameter related to the game object acquired or operated by the first distributor on the basis of the total number to:

reduce a difficulty level of the game played by the first distributor, allow the first distributor to acquire a more game object, or allow the first distributor to acquire a more valuable game object.

11. The computer-readable storage media according to claim 8, wherein the instructions further cause the computer to:

receive giving data indicative of giving a token, a comment, or an evaluation to the first distributor transmitted by a terminal device of any viewer out of the plurality of viewers; and calculate, on the basis of the giving data, a control parameter related to the game object to be used in the game played by the first distributor.

12. The computer-readable storage media according to claim 8, wherein the instructions further cause the computer to:

obtain a total number of the plurality of viewers for each unit time from a server device distributing the second video to the plurality of viewers and update the total number; and display, in the game played by the first distributor, the updated total number or a game object set on the basis of the updated total number.

13. The computer-readable storage media according to claim 1, wherein the instructions further cause the computer to:

receive, from a terminal device of a third distributor via the communication line, third motion data or a fifth video including an animation of an avatar of the third distributor generated on the basis of the third motion data;

receive, via the communication line, a sixth video related to a computer-implemented game generated by the terminal device of the third distributor on the basis of third operation data by using a received web page;

determine if the computer has received object data regarding an acquired game object available by the first distributor in a selected computer-implemented game, the acquired game object being able to be given to the first distributor having received the sixth video; and display a fact that the acquired game object is available in the selected game for the first distributor if the computer decides that the computer has received the object data.

14. The computer-readable storage media according to claim 13, wherein the instructions further cause the computer to:
  generate the second video related to the selected game on the basis of the first operation data by using the received web page;
  display the acquired game object in the selected game on the basis of the object data; and
  distribute the second video toward the terminal devices of the plurality of viewer via the communication line.

15. The computer-readable storage media according to claim 13, wherein the instructions further cause the computer to receive the object data through a function enabling message communication between the computer and a server device configured to receive the sixth video from the terminal device of the third distributor and distribute the sixth video to the terminal devices of the plurality of viewers.

16. The computer-readable storage media according to claim 13, wherein the acquired game object is selected out of a plurality of game objects by the third distributor or a server device configured to receive the sixth video from the terminal device of the third distributor and distribute the sixth video to the terminal devices of the plurality of viewers.

17. The computer-readable storage media according to claim 13, wherein the motion data is generated with an optical motion capture system.

18. A computer-implemented method for automatically generating customized video in an interactive network application, the method comprising: with at least one processor:
  generating first motion data related to a body of a first distributor with a sensor or image capture device;
  distributing, toward terminal devices of a plurality of viewers via a communication line, the first motion data or a first video including an animation of an avatar of the first distributor generated on the basis of the first motion data;
  receiving a web page via the communication line;
  receiving first operation data from a user interface;
  generating a second video related to a computer-implemented game on the basis of the first operation data by using the received web page;
  distributing the second video toward the terminal devices of the plurality of viewer via the communication line;
  receiving, via the communication line, viewer data regarding at least one viewer of the plurality of viewers;
  extracting a selected game object out of a plurality of game objects to be used;
  calculating a control parameter related to the selected game object on the basis of the viewer data;
  generating the second video including the selected game object; and
  distributing, via the communication line, the second video toward the terminal devices of the plurality of viewers.

19. A terminal device, comprising:
at least one processor coupled to a camera and a communication network, wherein the at least one processor is configured to:
  generate first motion data related to a body of a first distributor using the camera, the first motion data being generated with a sensor or image capture device of the camera;
  distribute, toward terminal devices of a plurality of viewers via the communication network, the first motion data or a first video including an animation of an avatar of the first distributor generated on the basis of the first motion data;
  receive a web page via the communication network;
  receive first operation data from a user interface;
  generate a second video related to a computer-implemented game on the basis of first operation data by using the received web page;
  distribute the second video toward the terminal devices of the plurality of viewer via the communication network;
  receive, via the communication network, viewer data regarding at least one viewer of the plurality of viewers;
  extract a selected game object out of a plurality of game objects to be used in the game;
  calculate a control parameter related to the selected game object on the basis of the viewer data;
  generate the second video including the selected game object; and
  distribute, via the communication network, the second video toward the terminal devices of the plurality of viewers.

20. A system, comprising:
the terminal device of claim 19; and
a server device coupled to the terminal device via the communication network, the server device being configured to send the second video to the terminal devices of the plurality of viewers.

* * * * *